(12) United States Patent
Hogan

(10) Patent No.: US 9,732,899 B2
(45) Date of Patent: Aug. 15, 2017

(54) MODULAR ANNULAR DISPLAY ASSEMBLY WITH COMPARTMENTS

(71) Applicant: James Hogan, Jacksonville, FL (US)

(72) Inventor: James Hogan, Jacksonville, FL (US)

( * ) Notice: Subject to any disclaimer, the term of this patent is extended or adjusted under 35 U.S.C. 154(b) by 467 days.

(21) Appl. No.: 14/274,653

(22) Filed: May 9, 2014

(65) Prior Publication Data

US 2014/0318007 A1   Oct. 30, 2014

Related U.S. Application Data

(63) Continuation-in-part of application No. 12/164,075, filed on Jun. 29, 2008, now Pat. No. 8,720,836, which is a continuation-in-part of application No. 11/868,534, filed on Oct. 8, 2007, now Pat. No. 7,770,324, and a continuation-in-part of application No. 12/026,553, filed on Feb. 5, 2008, now Pat. No. 8,136,296, which is a continuation-in-part of application No. 11/868,534.

(60) Provisional application No. 60/867,108, filed on Nov. 22, 2006.

(51) Int. Cl.
*A01G 9/02* (2006.01)
*F16M 11/18* (2006.01)
*A01K 1/00* (2006.01)
*A01K 5/00* (2006.01)
*A47G 7/04* (2006.01)

(52) U.S. Cl.
CPC .............. *F16M 11/18* (2013.01); *A01G 9/022* (2013.01); *A01K 1/00* (2013.01); *A01K 5/00* (2013.01); *A47G 7/041* (2013.01); *A47G 7/044* (2013.01)

(58) Field of Classification Search
CPC .......... A01G 9/02; A01G 9/022; A01G 9/028; A01G 9/104; A01G 9/1066; A47G 7/04; A47G 7/041; A47G 7/044
USPC ................. 47/39, 65.7, 66.1, 66.5, 66.6, 67; 211/85.23, 85.26, 88.03; 248/76, 124.2, 248/161, 404; 362/431; 40/601, 616.14
See application file for complete search history.

(56) References Cited

U.S. PATENT DOCUMENTS

| 3,332,652 | A | * | 7/1967 | Oaks | A01G 5/04 248/146 |
|---|---|---|---|---|---|
| 4,117,629 | A | * | 10/1978 | Ekdahl | A01G 9/02 211/107 |
| 4,757,641 | A | * | 7/1988 | Penrod | A47G 7/044 248/27.8 |
| 6,513,284 | B1 | * | 2/2003 | Sandlin | A01G 9/022 232/39 |
| 6,752,279 | B1 | * | 6/2004 | Dwyer | A47G 7/044 211/107 |
| 2005/0061945 | A1 | * | 3/2005 | Phaneuf | A47G 7/044 248/538 |

(Continued)

*Primary Examiner* — David Parsley
*Assistant Examiner* — Danielle Clerkley
(74) *Attorney, Agent, or Firm* — Mark Young, P.A.

(57) ABSTRACT

A system for raising and lowering objects includes a carriage subsystem with a tubular body having an interior central channel an inner diameter greater than the outer diameter of an elongated tubular support structure. A plurality of guides facilitate linear translation of the carriage on the vertical structure without marring. At least one hook on the carriage pivots to engage a slot on the support structure for locking the carriage in a raised position. Objects are attached to a flange on the carriage. A winch and cable control motion of the carriage.

22 Claims, 60 Drawing Sheets

(56) References Cited

U.S. PATENT DOCUMENTS

| | | | | |
|---|---|---|---|---|
| 2005/0166452 A1* | 8/2005 | Felknor | ............... | A01G 9/102 47/67 |
| 2008/0078121 A1* | 4/2008 | Stanio | ............... | A01G 9/02 47/67 |
| 2009/0235565 A1* | 9/2009 | Waas | ............... | G09F 15/0081 40/541 |

* cited by examiner

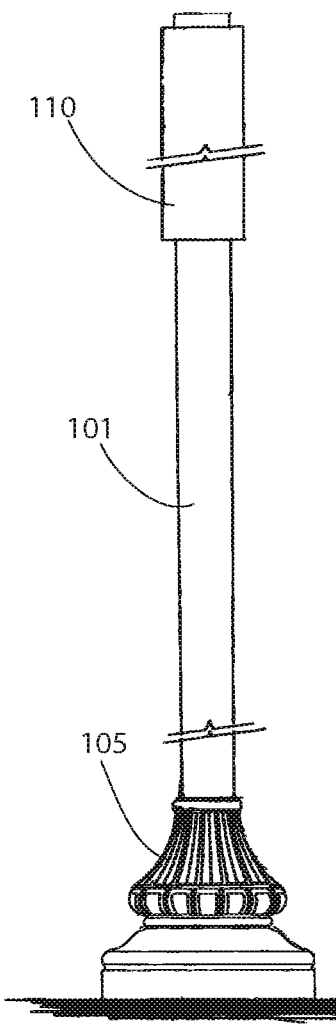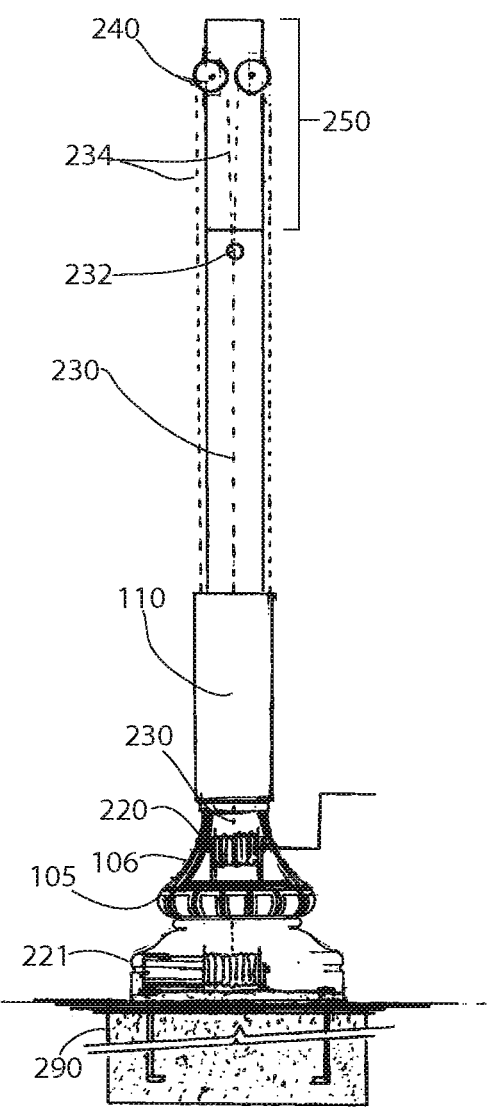
FIGURE 1
FIGURE 2

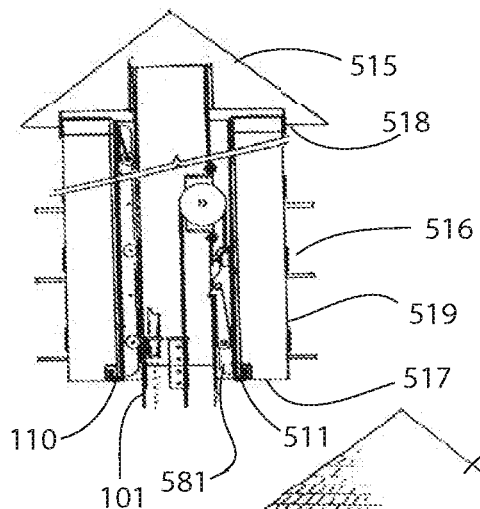
FIGURE 5
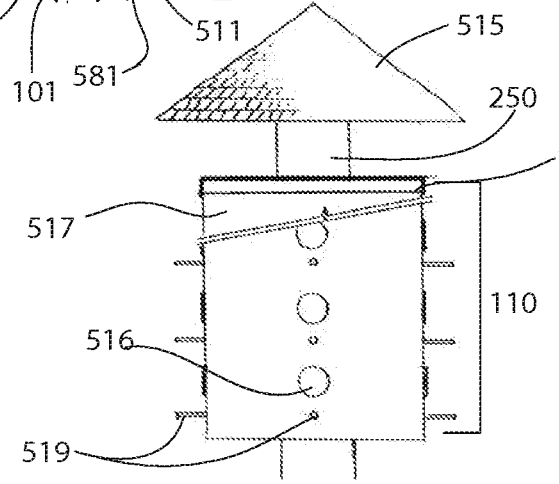
FIGURE 6
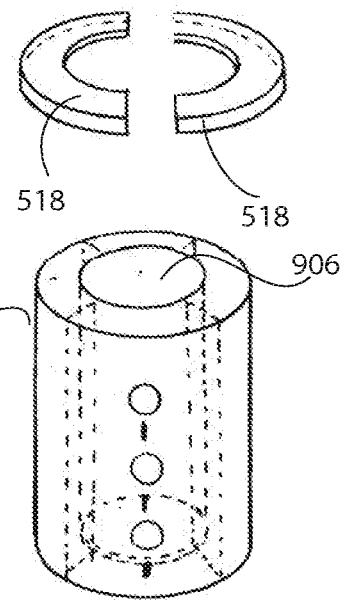
FIGURE 8
FIGURE 7
FIGURE 9

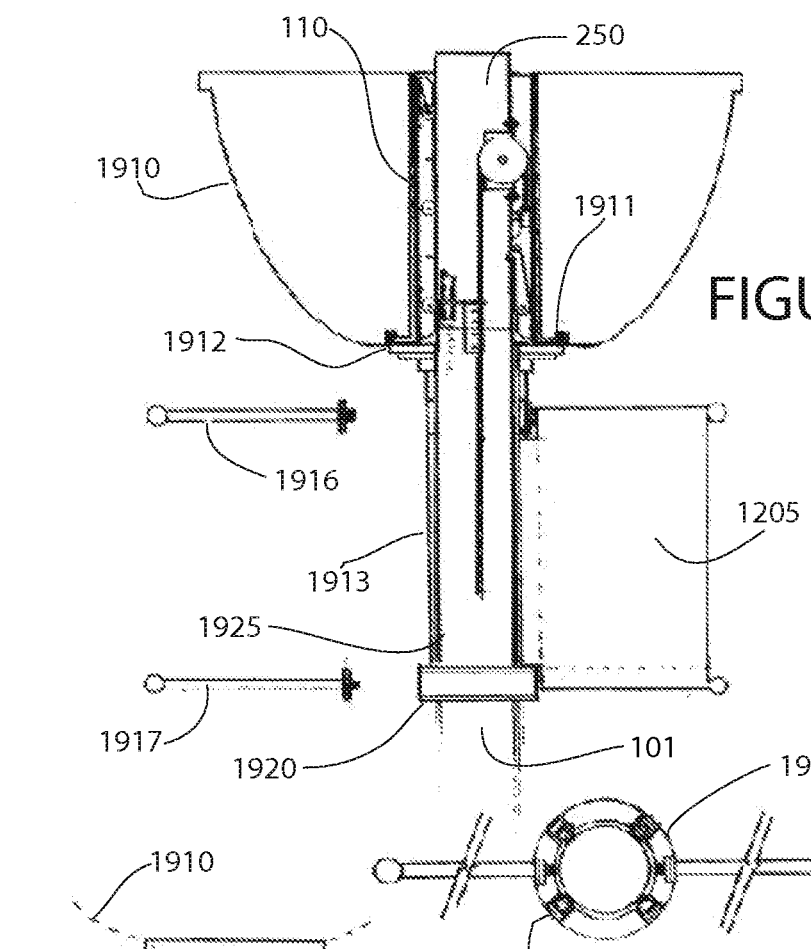
FIGURE 19
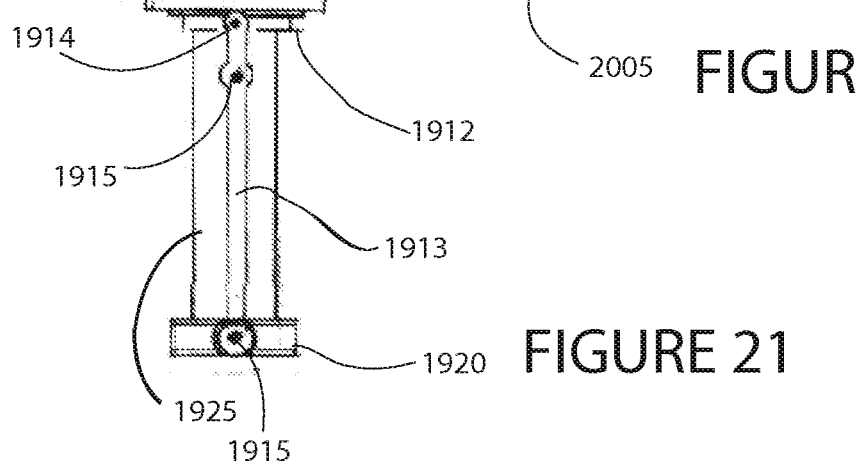
FIGURE 20
FIGURE 21

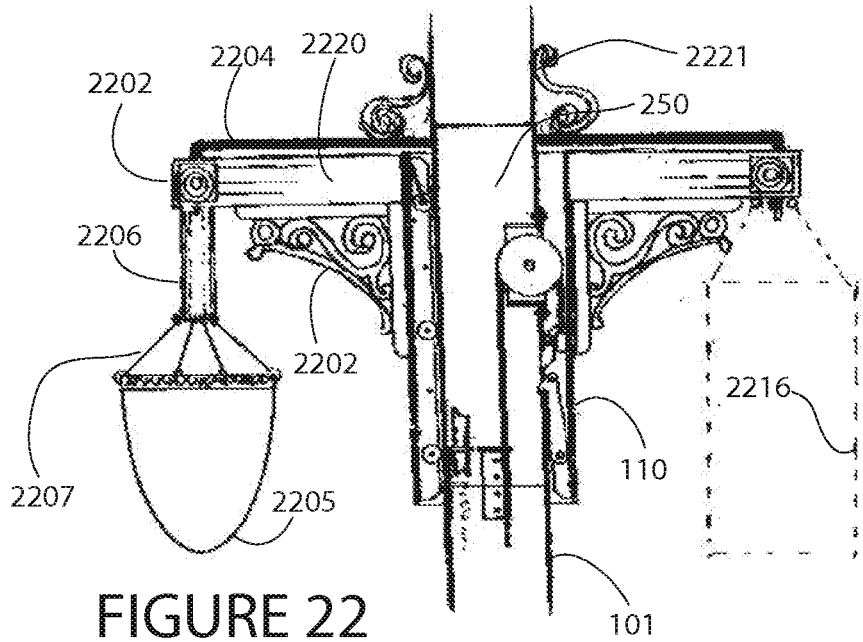
FIGURE 22
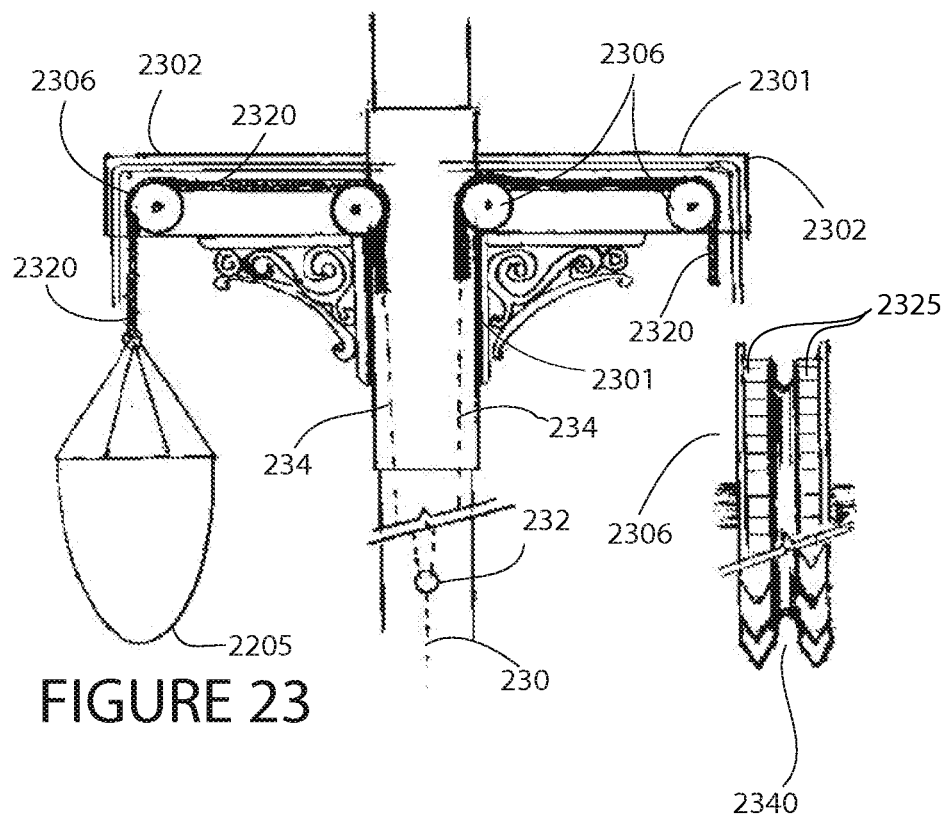
FIGURE 23
FIGURE 24

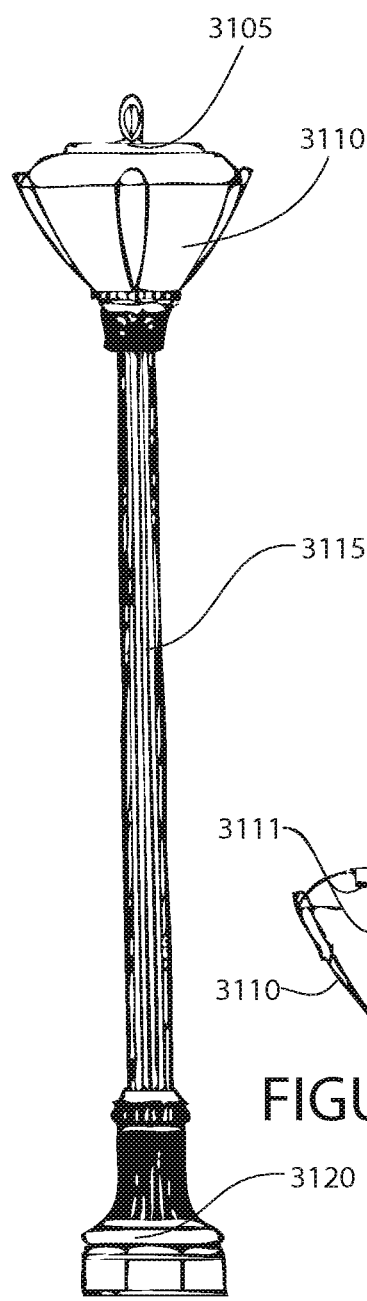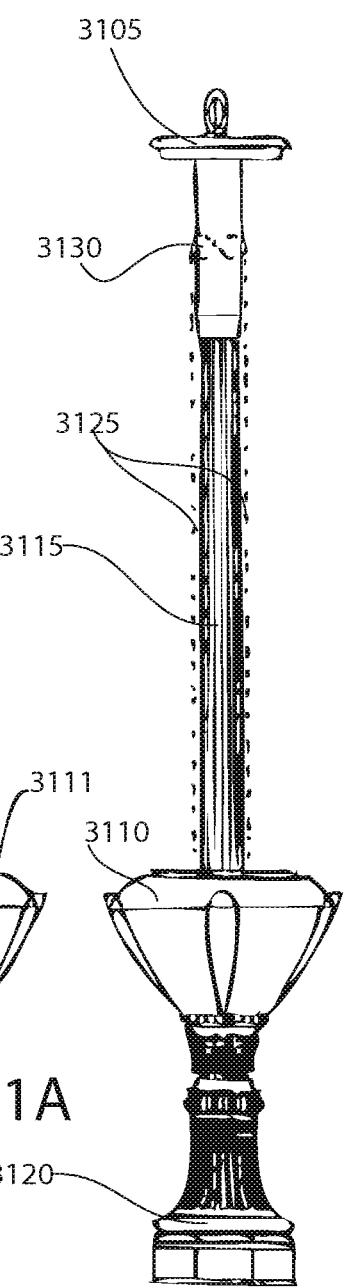
FIGURE 31　　FIGURE 31A　　FIGURE 32

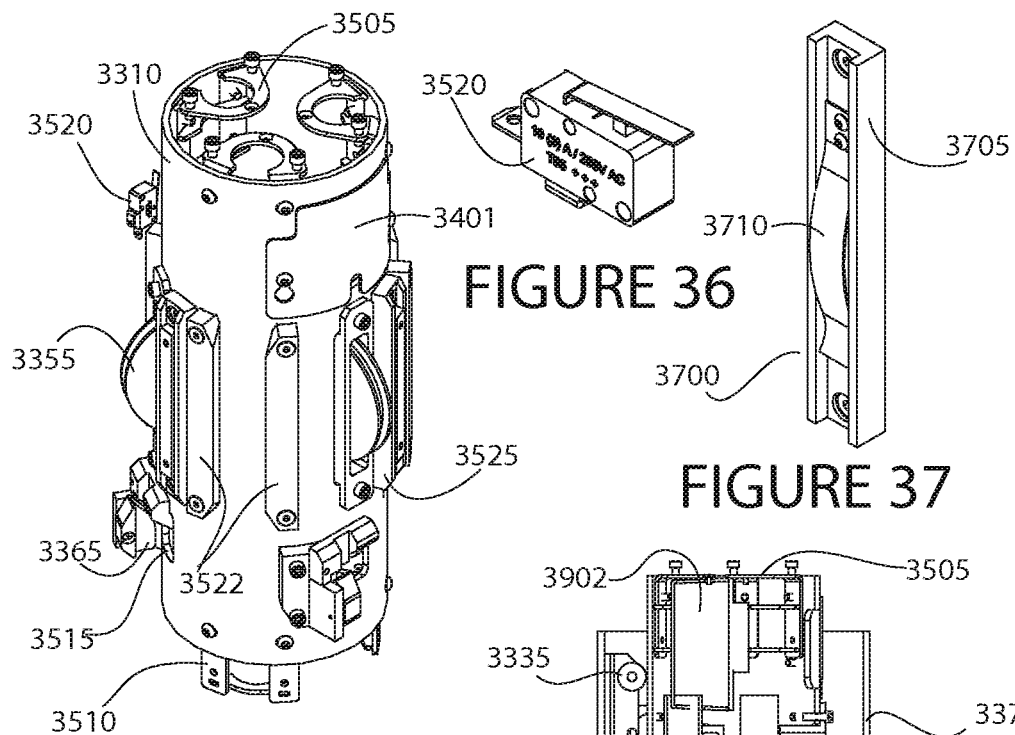
FIGURE 35
FIGURE 36
FIGURE 37
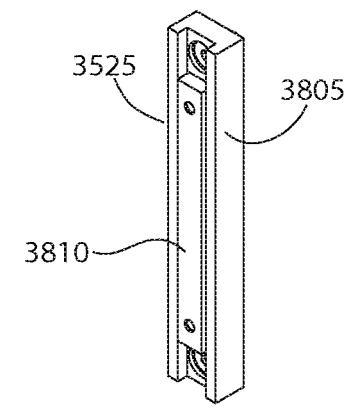
FIGURE 38
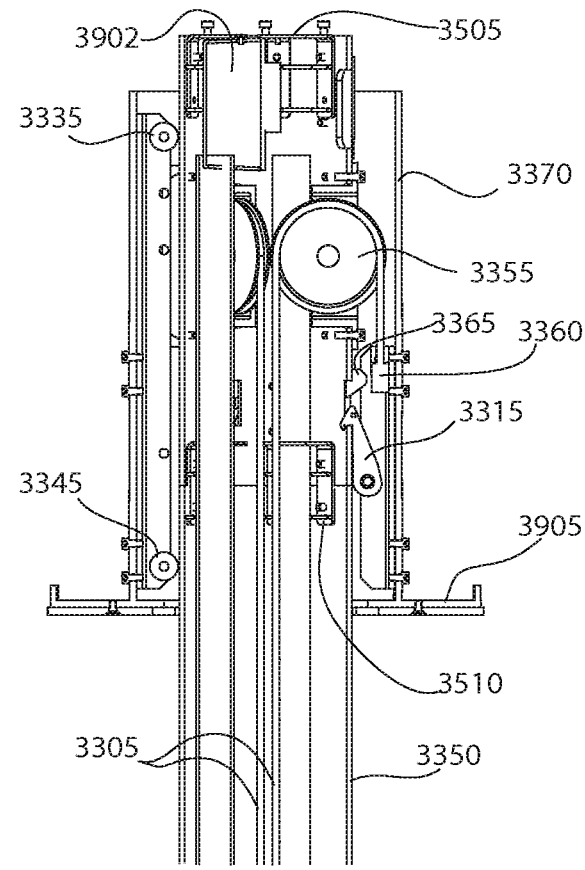
FIGURE 39

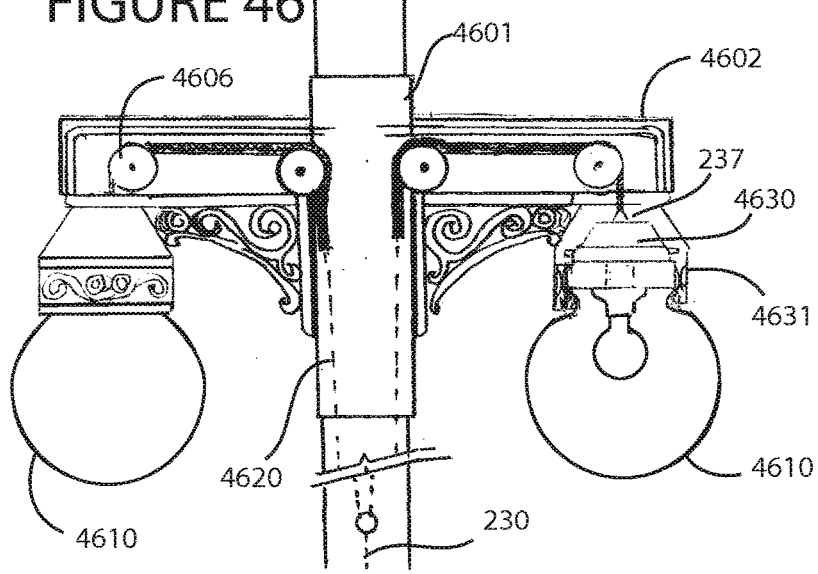
FIGURE 46
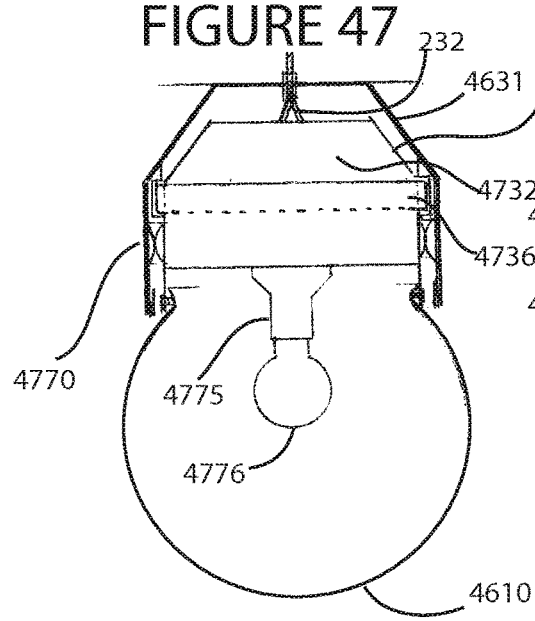
FIGURE 47
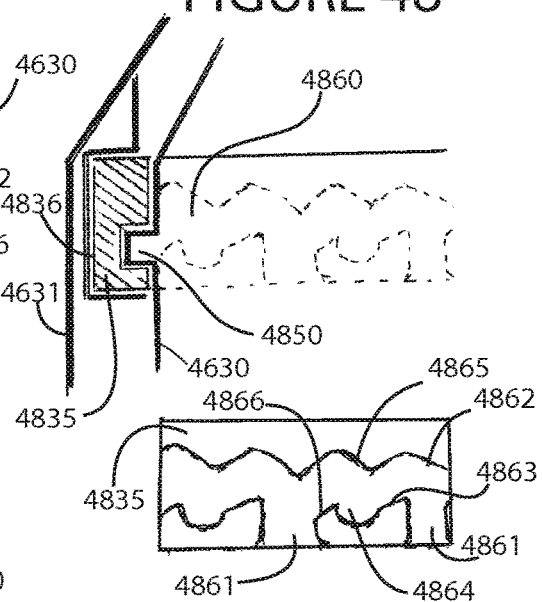
FIGURE 48
FIGURE 49

FIGURE 50
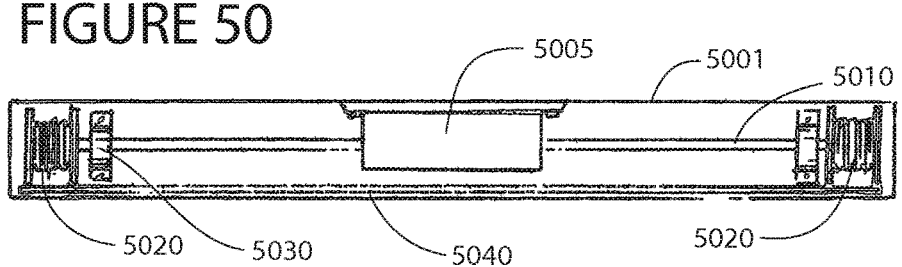
FIGURE 51
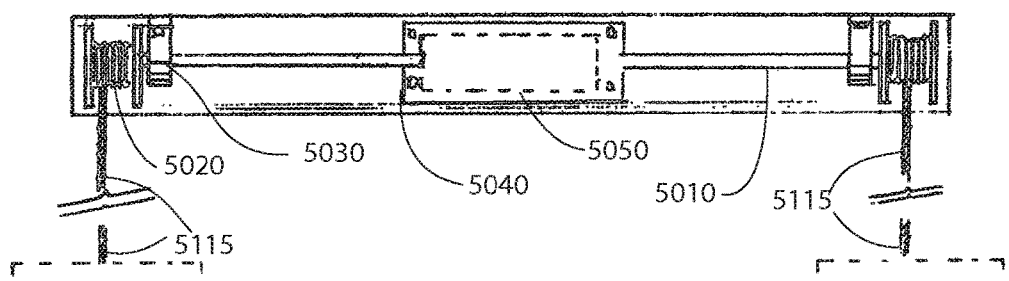
FIGURE 52
FIGURE 53
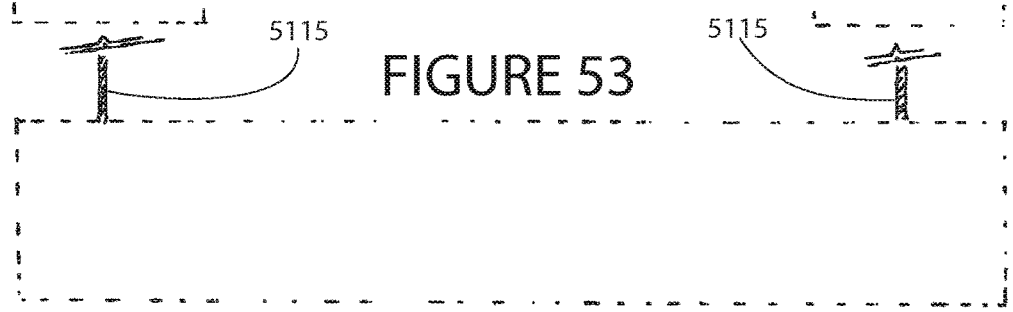

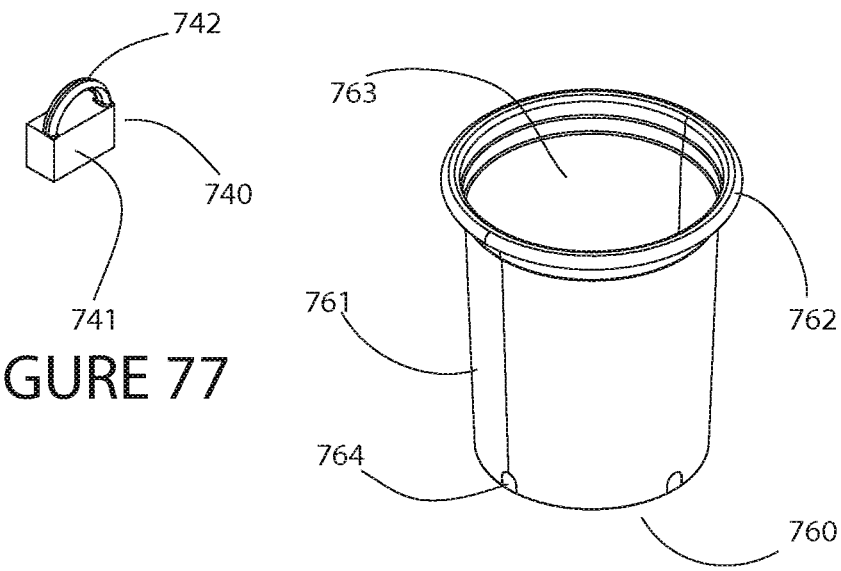
FIGURE 77
FIGURE 78
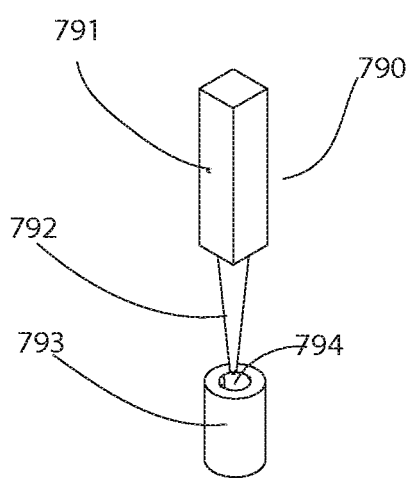
FIGURE 79
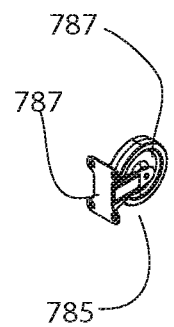
FIGURE 80

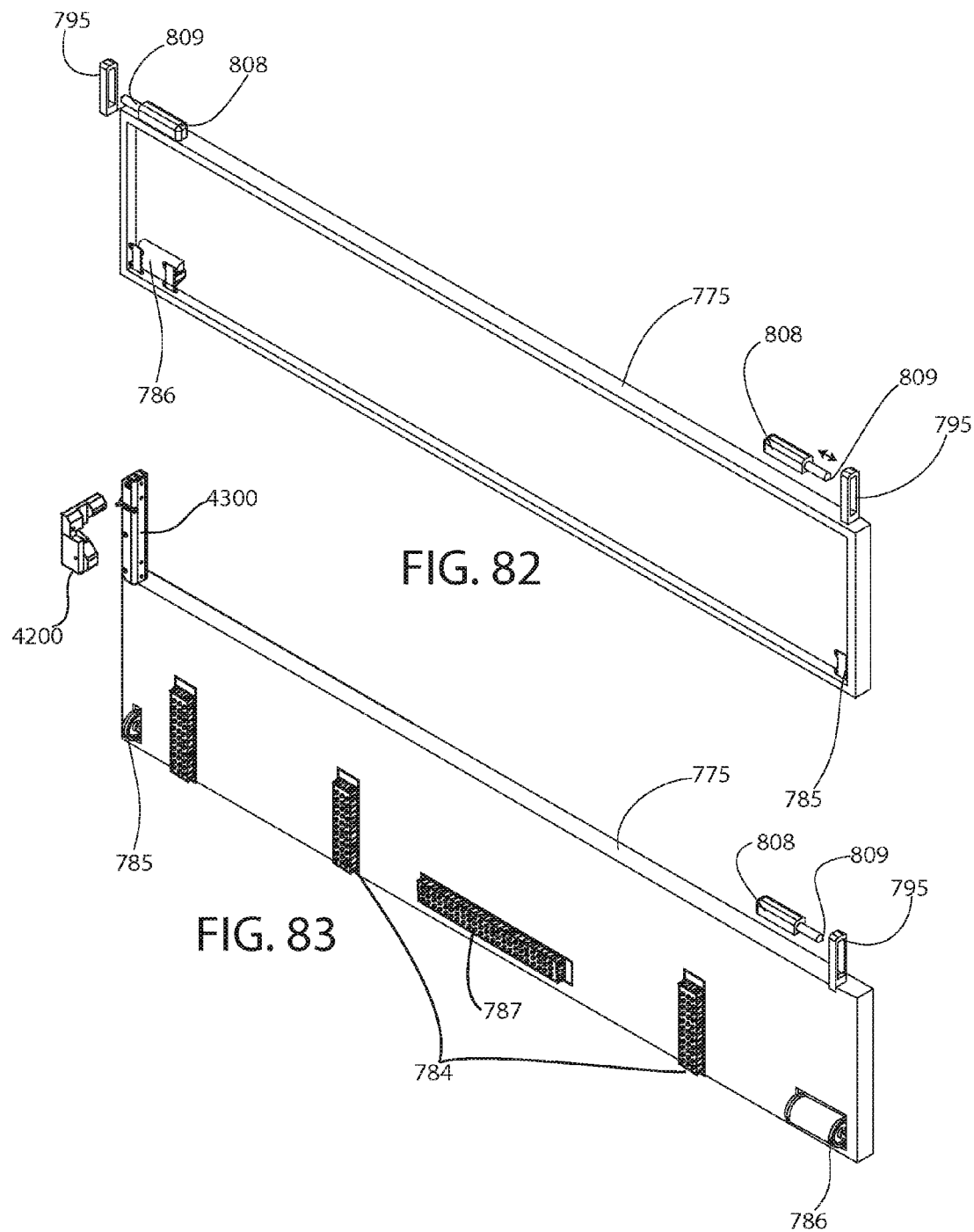

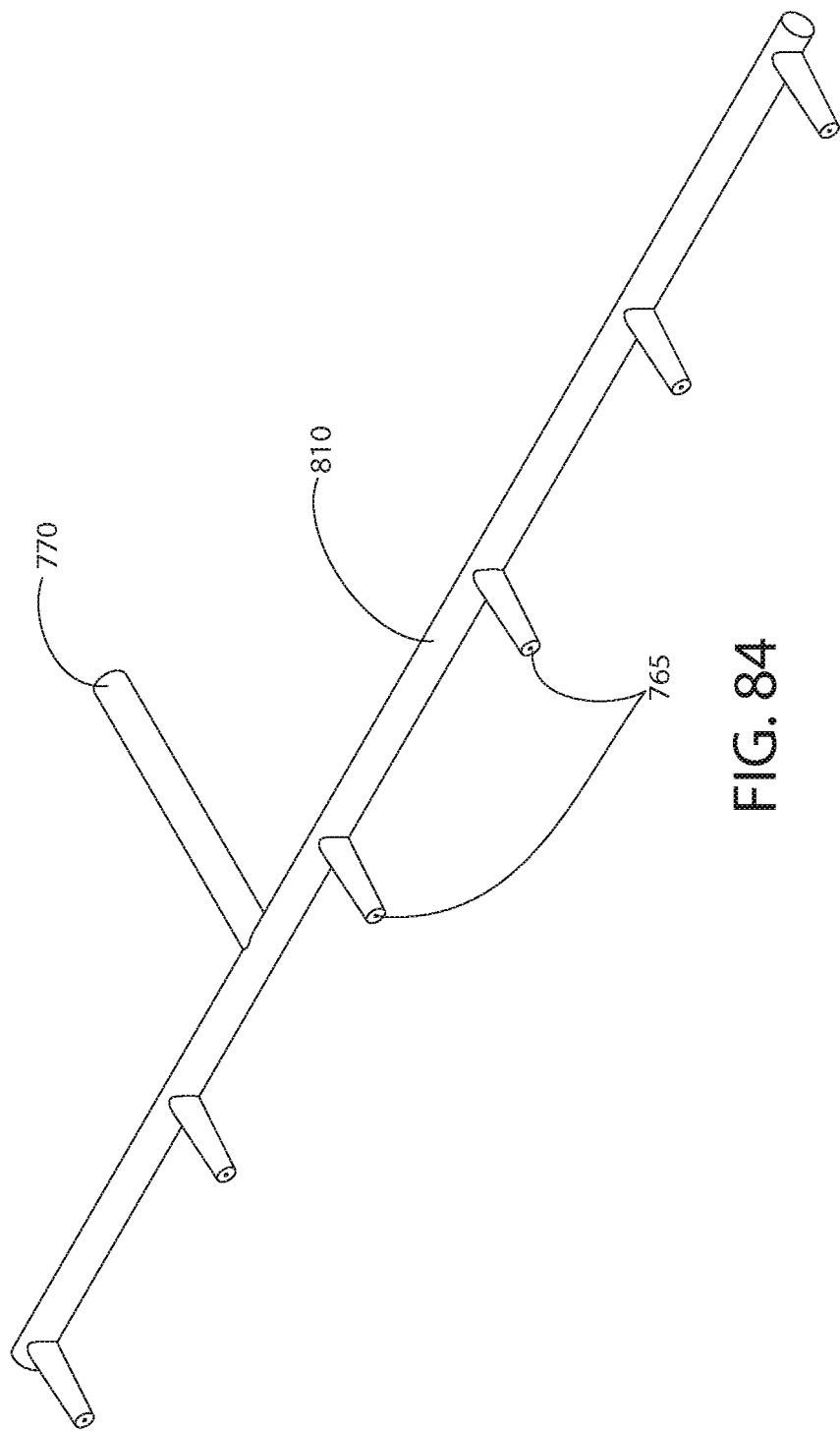

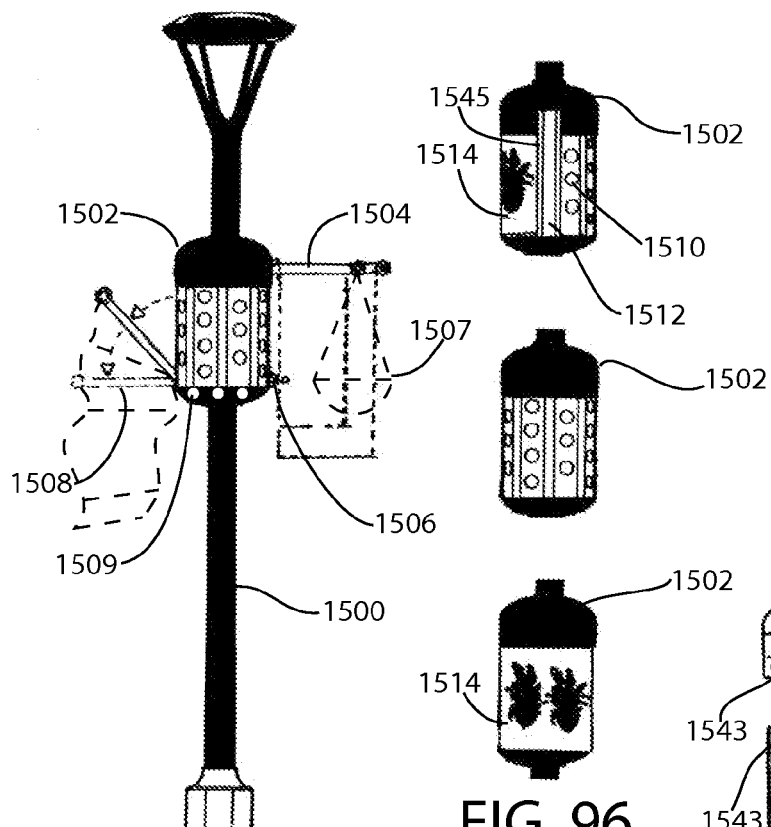
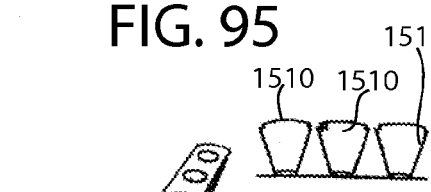
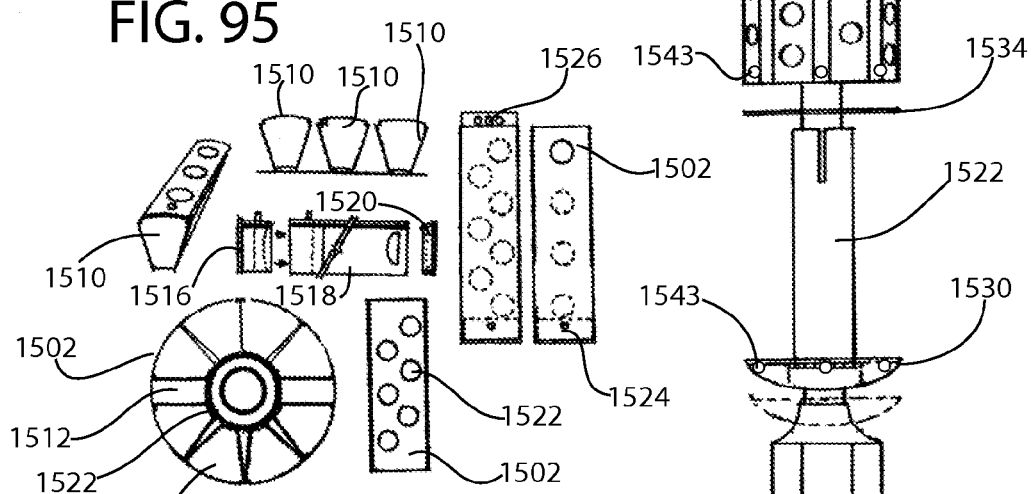
FIG. 95
FIG. 96
FIG. 97
FIG. 98

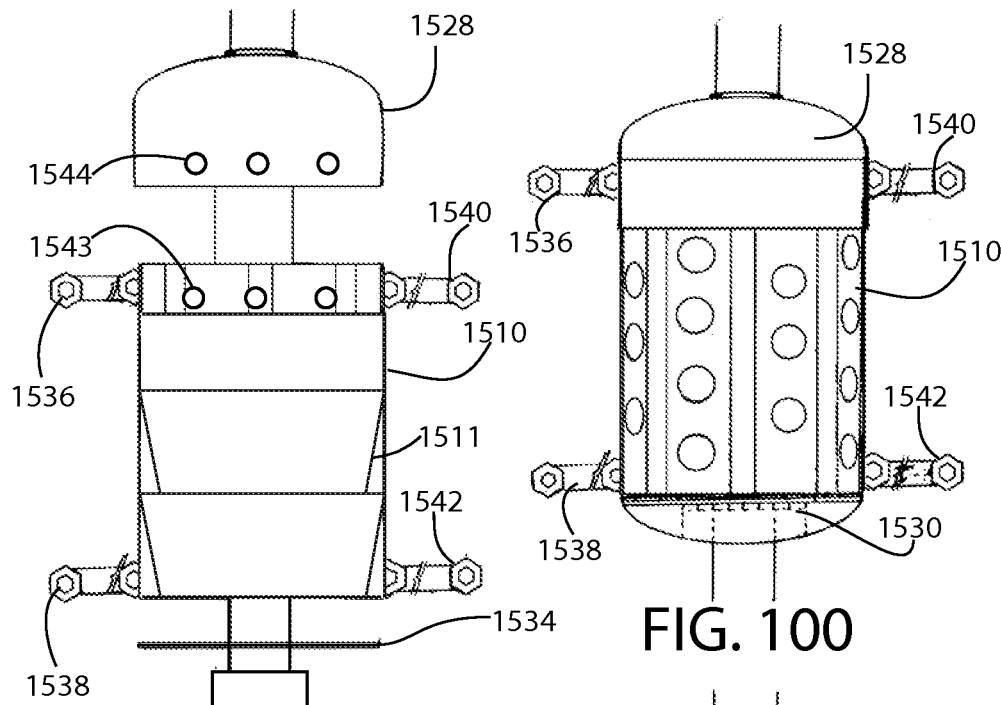
FIG. 100
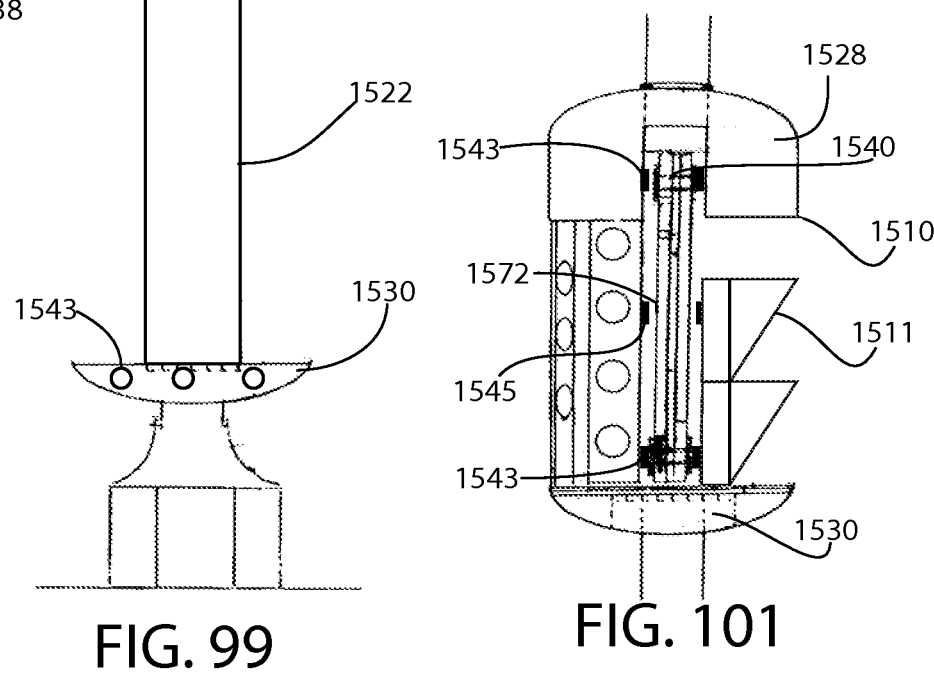
FIG. 99
FIG. 101

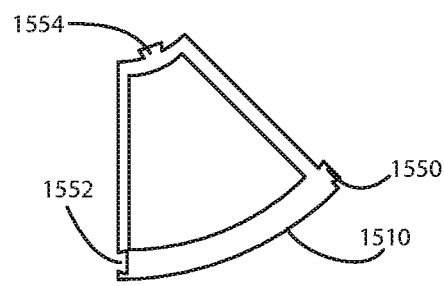
FIG. 102
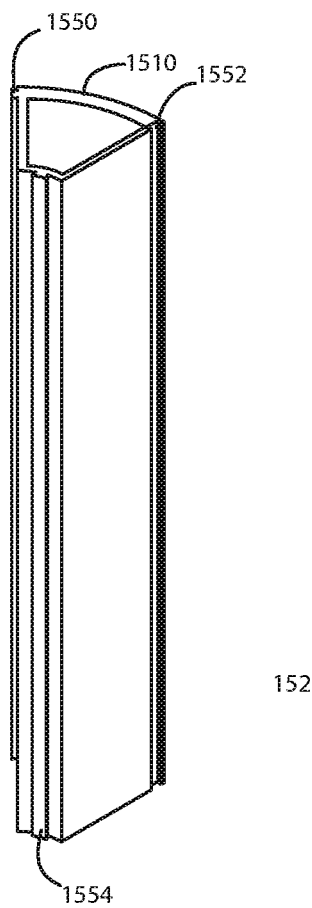 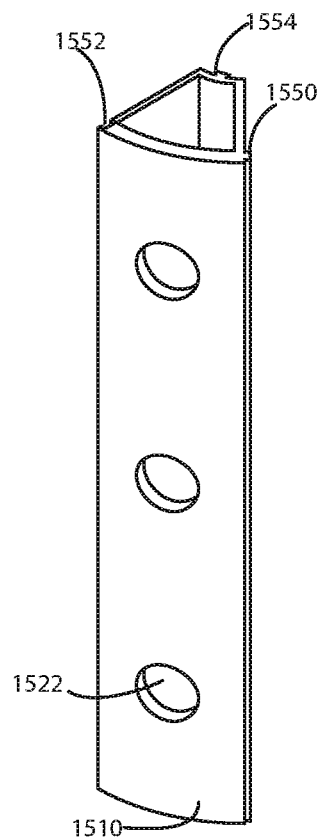 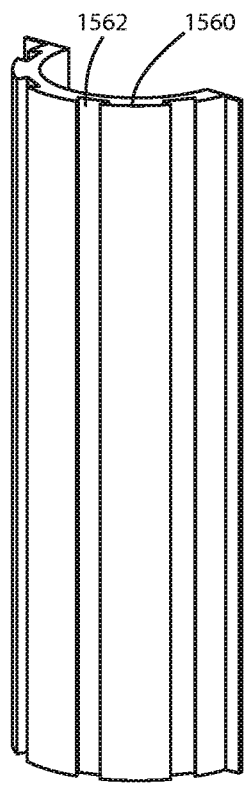
FIG. 103  FIG. 104  FIG. 105

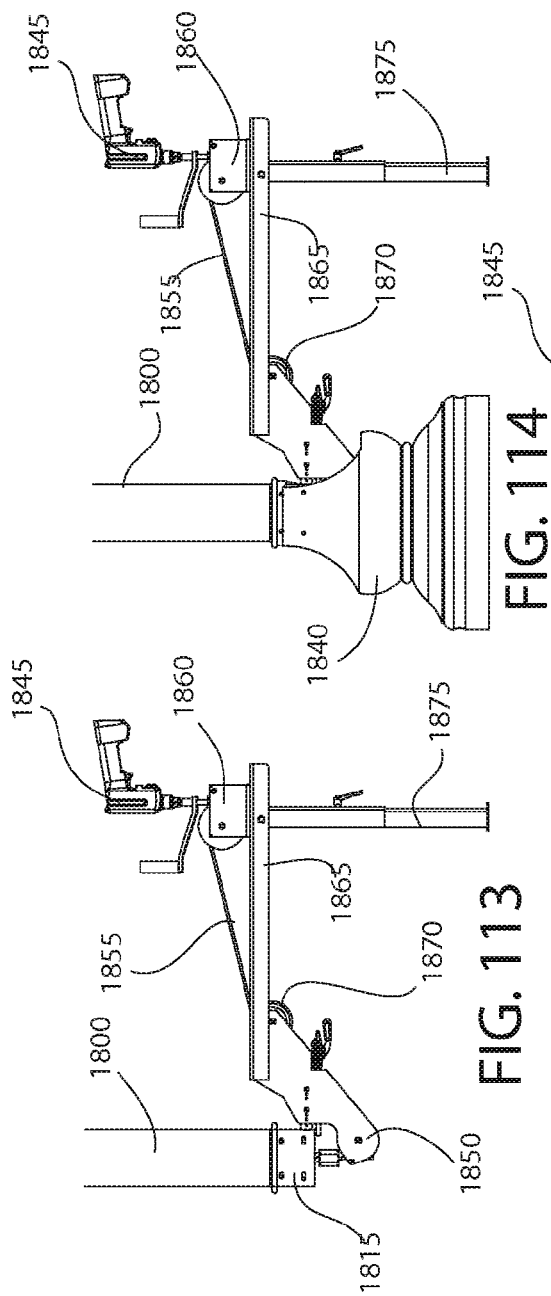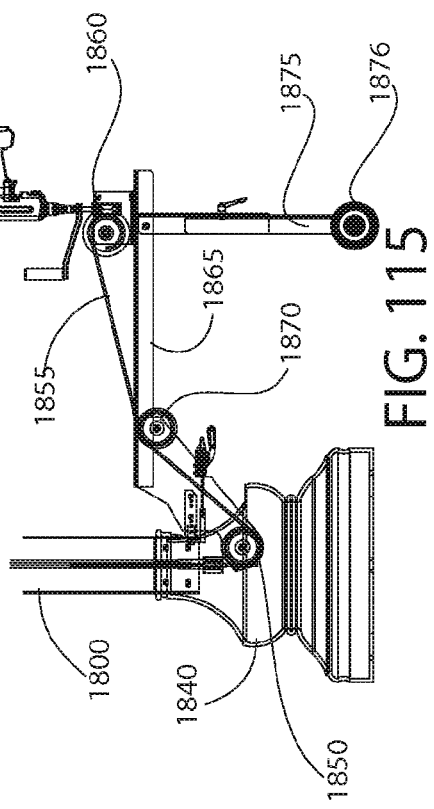

MODULAR ANNULAR DISPLAY ASSEMBLY WITH COMPARTMENTS

RELATED APPLICATION

This application is a continuation in part and claims the benefit of priority of U.S. Nonprovisional application Ser. No. 12/164,075 filed Jun. 29, 2008, which is a continuation in part and claims the benefit of priority of U.S. Nonprovisional application Ser. No. 11/868,534, filed Oct. 8, 2007, issued as U.S. Pat. No. 7,770,324 on Aug. 10, 2010, the entire contents of which are incorporated herein by this reference, and a continuation in part and claims the benefit of priority of U.S. Nonprovisional application Ser. No. 12/026,553 filed Feb. 2, 2008, issued as U.S. Pat. No. 8,136,296 on Mar. 20, 2012, the entire contents of which are incorporated herein by this reference.

FIELD OF THE INVENTION

This invention generally relates to ornamental and utility poles, and, more particularly, to variable controlled carriages allowing for the raising, lowering, holding, locking and releasing of ornamental and utilitarian objects on poles or other elongated structures.

BACKGROUND

Utility and ornamental poles are well known in the art. Some poles are used to display signs, flags, banners, bird houses, nests, feeders and/or plants. Others are used to support communication systems, lights and security cameras. Unfortunately, such poles typically do not provide means for raising, lowering and easily removing the supported object. Thus, installation and maintenance requires the use of a ladder, crane or other personnel lifting device, which is inconvenient, costly and conducive to injury.

There is an absence of versatile carriage systems that can lift, lock in place, and lower a wide array of light, medium or heavy objects on tall elongated structures, such as poles. Specialty mast systems, as described in U.S. Pat. No. 4,429,355 to Garchinsky and U.S. Pat. No. 3,696,241 to Meyer et al. are known in the art for raising and lowering light assemblies on highway light poles. While such systems are useful for raising and lowering suspended lighting assemblies and their associated electrical wiring, such systems are not useful for plants that require irrigation. Also, when lowered, the carried assemblies are not readily removable from the mast. Furthermore, such systems typically require raising and lowering of high voltage electrical lines, which tend to wear and bind after repeated raising, lowering and long term all-weather storage, and pose serious electrocution risks. The extra wiring, which must be fed out and retracted, also adds considerably to the expense and complexity of the system.

As populations of many animal species are becoming threatened because of ecological pressures, the provision of appropriate animal houses and feeders can help support locally important populations. The environmental and aesthetic benefits of animal houses and feeders, such as nest boxes and bird feeders, including birdhouses, are well known. Animals such as birds add beauty to a yard, and along with bats, can help control pest (e.g., mosquito) populations. To be effective, such houses and feeders must be installed in a quiet place, out of the reach of predators and scavengers such as cats and raccoons, generally between about five meters above ground. Too often, people with good intentions will install a house or feeder, but then forget about it. It is important to clean out a house and feeder periodically to prevent accumulation of debris and parasite infestation. Additionally, fresh hay or wood shavings may be added to a house periodically to make the house suitable for use as a winter roost. Of course, a food must be replenished regularly in a feeder. Unfortunately, means for elevating, lowering and easily removing houses and feeders has not heretofore been provided.

As another example, pole mounted planters have been devised to beautify landscapes and architecture. Unfortunately, heretofore known pole planters cannot be easily adjusted, i.e., raised and/or lowered and rotated repeatedly, through a continuum of positions. Instead, they remain fixed at a certain elevation and angular orientation. Irrigation is equally problematic. Watering an elevated planter and caring for the plant requires use of a ladder or other tools or removal of the planter and reinstallation after the task is completed. Evenly distributing sunlight entails removal and repositioning the planter.

As yet another example, municipalities frequently displays flags and banners on sign and light posts to promote and commemorate special events and achievements. Installing, maintaining (e.g., cleaning) and removing such items requires the use of a ladder, crane or other personnel lifting device, which is inconvenient, costly and conducive to injury. When vehicles with cranes are used, they are parked alongside the pole, which contributes to traffic congestion.

What is needed is a variable controlled carriage adapted for raising, lowering, holding, locking and releasing a wide array of ornamental and utilitarian objects on poles or other elongated vertically oriented structures. The invention is directed to overcoming one or more of the problems and solving one or more of the needs as set forth above.

SUMMARY OF THE INVENTION

To solve one or more of the problems set forth above, in an exemplary implementation of the invention, a variably controlled carriages allowing for the raising, lowering, holding, locking and releasing of objects on poles or other structures is provided.

Optional features which can be included with the objects are but not limited to waterfalls, irrigation of the objects or surrounding area, or other uses of water. Objects are unlimited and not limited to such features, designs or products as planter containers, banner arms, banners, signs, (cameras, communications systems, security systems, lighting) bird and animal houses, nests and feeders. Structures are unlimited and not limited to poles of any size, shape, form, use or material, buildings, walls and/or other structures. A carriage by definition can be a wheeled vehicle, structure or support for moving, carrying or shifting another part, a heavy weight, or other objects. The carriages involved with the field of the invention are carriages that move up and down the structures as well as but not limited to fixed carriages that raise and lower objects up and down structures.

In one aspect of an exemplary embodiment of the invention, a system for raising and lowering a wide range of objects on an elongated tubular structure is disclosed. The tubular structure has a length, a base, a top opposite the base, a central channel, an inner diameter and an outer diameter. The system includes a carriage subsystem. The carriage subsystem includes a tubular body with an interior central channel an inner diameter greater than the outer diameter of the elongated tubular structure. A plurality of rollers is attached to the tubular body in the interior central channel, disposed between the tubular body and elongated tubular structure, and configured to facilitate linear translation of the tubular body along the elongated tubular structure. At least one hook is pivotally mounted on the tubular body in the interior central channel, disposed between the tubular body and elongated tubular structure, and configured to controllably engage a means for locking the carriage in a raised position. The carriage subsystem also includes a flange for attaching an object to the carriage subsystem. The flange is attached to the tubular body of the carriage subsystem. A means (e.g., a winch and cable) for controllably moving the carriage system between a lowered position adjacent to the base and a raised position adjacent to the top of the tubular structure is also provided.

In another aspect of an exemplary embodiment of the invention, a collar is attached to the top of the tubular structure. The collar includes a tubular body with an outer diameter less than the inner diameter of the tubular body of the carriage subsystem. At least one slot is formed in the tubular body of the collar and configured for engagement by the hook pivotally mounted on the tubular body in the interior central channel of the carriage subsystem. At least one pulley is rotatably mounted to the tubular body of the collar and configured for guiding a lanyard attached to the carriage subsystem at one end of the lanyard.

In another aspect of an exemplary embodiment of the invention, the system also includes a means for controllably causing the hook pivotally mounted on the tubular body in the interior central channel of the carriage subsystem to pivot towards and engage the slot formed in the tubular body of the collar and to pivot away from and disengage the slot formed in the tubular body of the collar when the hook is above the slot. A kick rod attached to the collar may be used to controllably cause the hook pivotally mounted on the tubular body in the interior central channel of the carriage subsystem to pivot towards and engage the slot formed in the tubular body of the collar when the hook is raised towards the slot. A pusher bracket with a slanted planar surface controllably causes the hook pivotally mounted on the tubular body in the interior central channel of the carriage subsystem to pivot away from and disengage the slot formed in the tubular body of the collar when the hook is above the slot. The hook may have a tip with a roller or low friction pad attached to the tip.

In another aspect of an exemplary embodiment of the invention, supported objects may include any objects suitable for support by the carriage. Such objects may include an animal house, including but not limited to a Bundt-style (i.e., having a central passage, ringed shape) animal house and a Bundt-style modular animal house. Supported objects may also include a plurality of banner arms attached to the carriage subsystem, including but not limited to a banner arm comprising an elongated coil spring. Supported objects may also include an animal feeder, including but not limited to a Bundt-style animal feeder and a Bundt-style modular animal feeder. Supported objects may also include a planter container, including but not limited to a Bundt-style planter container and a Bundt-style modular planter container.

In another aspect of an exemplary embodiment of the invention, an irrigation subsystem may be provided. An exemplary irrigation subsystem includes a water supply line extending through the elongated tubular structure and an irrigation outlet fluidly coupled to the water supply line and mounted to the collar. The irrigation outlet supplies water to a planter container. Additional irrigation such as sprinklers and microirrigation components may be included in the irrigation subsystem to controllably water planters and/or surrounding terrain.

In another aspect of an exemplary embodiment of the invention, an electrical subsystem may also be provided. A plurality of electrode assemblies may be attached to the tubular body of the collar. Each electrode assembly includes an electrically conductive contact attached to an insulating body. The plurality of electrode assemblies is configured to electrically engage similar electrode assemblies on the carriage when the carriage is raised towards the slot. Each electrode assembly attached to the carriage may be electrically coupled to an electrical load attached supported by the carriage. Electrode assemblies attached to the tubular body of the collar are electrically coupled to electric supply lines extending through the elongated tubular structure. The electrical load may be any device that requires electric power to operate, including, but not limited to a light or camera.

BRIEF DESCRIPTION OF THE DRAWINGS

The foregoing and other aspects, objects, features and advantages of the invention will become better understood with reference to the following description, appended claims, and accompanying drawings, where:

FIG. 1 provides a profile view of an exemplary pole structure with an ornamental base and a carriage in a fully elevated position in accordance with principles of the invention; and FIG. 2 provides a profile view of an exemplary pole structure with an ornamental base and a carriage in a lowered position according to principles of the invention; FIG. 5 provides a side cut-away view of an exemplary carriage with a bird feeder according to principles of the invention; and FIG. 6 provides a side view of an exemplary carriage with a bird feeder with the roof connected to the pole and the bird feeder attached to the carriage becoming separated as it is lowered according to principles of the invention; and FIG. 7 provides a top view of the exemplary bird feeder and carriage shown in FIGS. 5 and 6 without the roof according to principles of the invention; and FIG. 8 provides a perspective view of the exemplary bird feeder top which closes the seed storage compartment according to principles of the invention; and FIG. 9 provides a perspective view of the exemplary bird or animal feeder which sets on the carriage according to principles of the invention; FIG. 19 provides a side cut-away view of an exemplary carriage with a Bundt-style planter container on the carriage and with an attached removable pair of banner arms according to principles of the inventions; and FIG. 20 provides a top cut-away view of an exemplary bottom banner arm section of an exemplary carriage according to principles of the invention; and FIG. 21 provides a side view of an exemplary bottom banner arm section of an exemplary carriage according to principles of the invention; and FIG. 22 provides a side cut-away view of an exemplary movable carriage with planter containers or other objects on mounting arms according to principles of the invention; and FIG. 23 provides a side view of an exemplary fixed position carriage with suspended planter containers according to principles of the invention; and FIG. 24 provides an end or edge view of an exemplary pulley for a fixed position carriage according to principles of the invention; FIG. 31 provides a side view of an exemplary lighting pole with a movable carriage for a lighting fixture in a raised position according to principles of the invention; and FIG. 32 provides a side view of an exemplary lighting pole with a movable carriage for a lighting fixture in a lowered position according to principles of the invention; FIG. 35 provides a perspective view of an exemplary carriage collar for a pole according to principles of the invention; and FIG. 36 provides a perspective view of an exemplary electric power supply switch for a movable carriage according to principles of the invention; and FIG. 37 provides a perspective view of an exemplary electrode for a movable carriage according to principles of the invention; and FIG. 38 provides a perspective view of an exemplary electrode for a carriage collar according to principles of the invention; and FIG. 39 provides a side section view of an exemplary carriage and collar assembly according to principles of the invention; FIG. 46 provides a side view of an exemplary fixed position carriage with suspended light fixtures according to principles of the invention; and FIG. 47 provides an enlarged side cutaway view of the light fixture according to principles of the invention; and FIG. 48 provides an enlarged section view of the light fixture with a cutaway view of a catch-hook-release free floating ring according to principles of the invention; and FIG. 49 provides an enlarged section view of a portion of the catch-hook-release free floating ring track pattern according to principles of the invention; and FIG. 50 provides a top view of a raceway fixed carriage and shaft with two winches according to principles of the invention; and FIG. 51 provides a side view of a raceway fixed carriage with according to principles of the invention; and FIG. 52 provides a side view of two objects that can be raised simultaneously using the raceway fixed carriage and shaft according to principles of the invention; and FIG. 53 provides a side view of a single elongated object that can be raised and lowered using the raceway fixed carriage and shaft according to principles of the invention; FIG. 77 provides a perspective view of an exemplary Dee-ring for attaching cable to a raceway planter assembly according to principles of the invention; and FIG. 78 provides a perspective view of an exemplary raceway planter container for a planter assembly according to principles of the invention; and FIG. 79 provides a perspective view of an exemplary male and female registration guide assembly according to principles of the invention; and FIG. 80 provides a perspective view of an exemplary roller assembly for a raceway planter system according to principles of the invention; FIG. 82 provides a perspective view of an exemplary back panel for a raceway planter system according to principles of the invention; and FIG. 83 provides another perspective view of an exemplary back panel for a raceway planter system according to principles of the invention; and FIG. 84 provides a perspective view of an irrigation assembly for a raceway planter system according to principles of the invention; FIG. 95 provides a side view of an exemplary pole-mounted modular planter assembly that includes compartments for deployable support arms and a periphery configured for use as a display surface, to the extent not being used to grow plants, according to principles of the invention; and FIG. 96 provides a sequence of side views of an exemplary modular planter assembly that includes compartments for deployable support arms and a periphery configured for use as a display surface, to the extent not being used to grow plants, according to principles of the invention; and FIG. 97 provides views of components of an exemplary modular planter assembly that includes compartments for deployable support arms and a periphery configured for use as a display surface, to the extent not being used to grow plants, according to principles of the invention; and FIG. 98 provides a side view of an exemplary pole-mounted partially unassembled modular planter assembly that includes compartments for deployable support arms and a periphery configured for use as a display surface, to the extent not being used to grow plants, according to principles of the invention; and FIG. 99 provides another side view of an exemplary pole-mounted partially unassembled modular planter assembly that includes compartments for deployable support arms and a periphery configured for use as a display surface, to the extent not being used to grow plants, according to principles of the invention; and FIG. 100 provides a side view of an exemplary pole-mounted modular planter assembly that includes compartments for deployable support arms and a periphery configured for use as a display surface, to the extent not being used to grow plants, according to principles of the invention; and FIG. 101 provides another side view of an exemplary pole-mounted modular planter assembly that includes compartments for deployable support arms and a periphery configured for use as a display surface, to the extent not being used to grow plants, according to principles of the invention; and FIG. 102 provides a plan view of an exemplary planter module for a modular planter assembly according to principles of the invention; and FIG. 103 provides a perspective view of an exemplary planter module for a modular planter assembly according to principles of the invention; and FIG. 104 provides another perspective view of an exemplary planter module for a modular planter assembly according to principles of the invention; and FIG. 105 provides a perspective view of a portion of an exemplary mounting sleeve for a planter module for a modular planter assembly according to principles of the invention; FIG. 113 provides a side view of components of an external mobile drill or crank-powered mechanical winch assembly for a planter assembly according to principles of the invention; and FIG. 114 provides a perspective view of an external mobile drill or crank-powered mechanical winch assembly partially concealed by a base for a planter assembly according to principles of the invention; and FIG. 115 provides a wireframe view of an external mobile drill or crank-powered mechanical winch assembly for a planter assembly according to principles of the invention.

Figure 3:
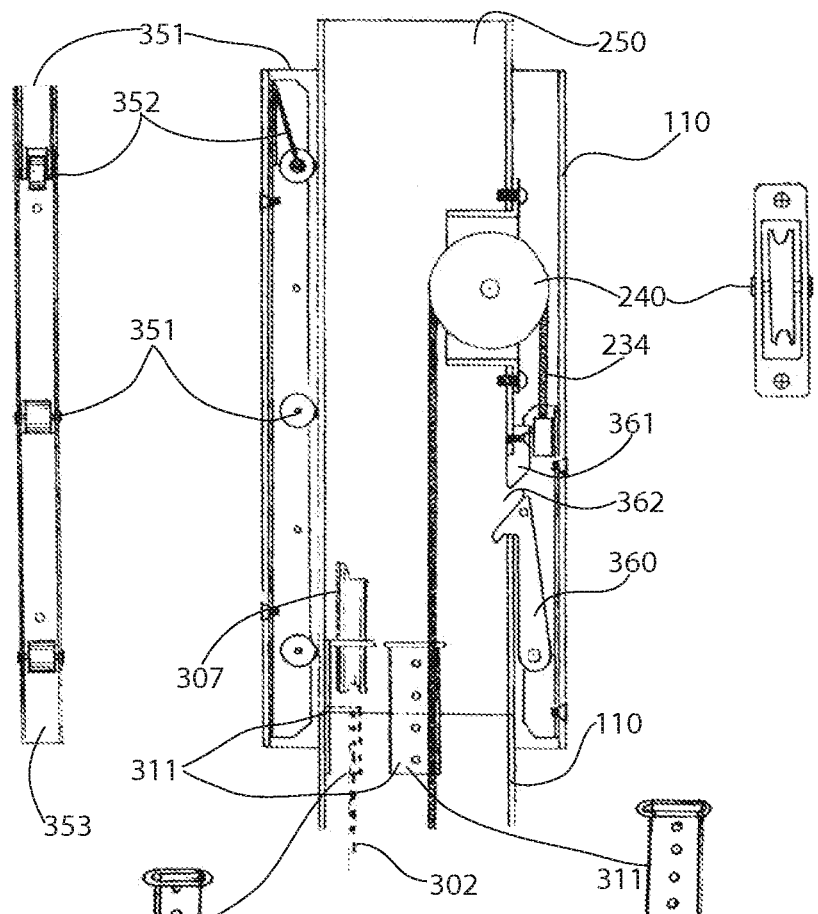
FIG. 3 provides a side cut-away view of an exemplary carriage assembly and a carriage collar, with pulleys, rollers, irrigation pipe, electrical conduit, catch-hook-release mechanism, lanyard according to principles of the invention.

Those skilled in the art will appreciate that the figures are not intended to be drawn to any particular scale; nor are the figures intended to illustrate every embodiment of the invention. The invention is not limited to the exemplary embodiments depicted in the figures or the shapes, relative sizes, ornamental aspects or proportions shown in the figures.

DETAILED DESCRIPTION

With reference to the Figures and the description provided below, an exemplary variable controlled carriage allowing for the raising, lowering, holding, locking and releasing of ornamental and utilitarian objects on poles or other elongated or elevated structures according to principles of the invention includes an adjustable height carriage, a vertical support having a top end and a bottom end, and means for controllably adjusting the height of the carriage relative to the support along a continuum of positions, from a lowest position to a highest position. In one embodiment, the means for controllably adjusting the height includes at least one pulley, which may define the highest position, and a tether guided by the pulley. In another embodiment, the means for controllably adjusting the height includes a winch (or windlass) operably coupled to the tether and adapted to retract (i.e., wind) and extend (i.e., unwind) the tether. The winch includes a control means, such as a handle or crank or electrical or electromechanical controller, accessible outside the support. In yet another embodiment, the means for controllably adjusting the height includes a rotatable shaft operably coupled to the tether, the rotatable shaft is adapted to retract and extend the tether. The rotatable shaft includes a control means, such as a crank and gear train, with the crank accessible outside the support pole. In yet another embodiment, the means for controllably adjusting the height includes a continuous pulley driven belt operably coupled to the tether. The continuous pulley driven belt is adapted to retract and extend the tether. The pulley driven belt includes a control means accessible outside the support pole. In yet another embodiment, the means for controllably adjusting the height includes a continuous sprocket driven chain operably coupled to the tether. The continuous sprocket driven chain is adapted to retract and extend the tether. The continuous sprocket driven chain includes a control means such as a crank coupled to a gear train accessible from outside the support pole. In yet another embodiment, the means for controllably adjusting the height includes a block and tackle lifting means operably coupled to the tether. The block and tackle lifting means is adapted to retract and extend the tether. The block and tackle lifting means includes a control means such as a crank coupled to a gear train accessible from outside the support pole. In yet another embodiment, the means for controllably adjusting the height includes a ballast operably coupled to the tether. The ballast is adapted to retract and extend the tether. In yet another embodiment, the means for controllably adjusting the height includes a rack and pinion with the rack operably coupled to the tether and adapted to retract and extend the tether when activated from a pinion gear driven by external crank outside the support pole. In yet other embodiments, the means for controllably adjusting the height includes extension springs operably coupled to the tether and adapted to retract or extend the tether from outside the support pole. In yet another embodiment, the means for adjusting the height includes a compression spring, which may be aided by hydraulics, whereby the spring pushes a telescoping pole to the top with the carriage fixed to the last section of structural pole which is refracted by pulling the carriage and planter container down by manual weight outside the supporting pole structure. In yet another embodiment, the means for adjusting the height includes a portable winch or motor attached outside the pole moveable to multiple locations operably attached to the tether and adapted to retract or extend it. In yet other embodiments, the means for adjusting the height includes hydraulic or pneumatic valves, cylinders, motors or aided systems operably adapted or combined with other embodiments to retract and extend the tether when activated from outside the support pole. A variable controlled carriage allowing for the raising, lowering, holding, locking and releasing of ornamental and utilitarian objects on poles or other elongated or elevated structures according to principles of the invention may be provided as a complete system including a pole, carriage, irrigation subsystem, electrical subsystem, and height adjustment subsystem. Alternatively, a variable controlled carriage allowing for the raising, lowering, holding, locking and releasing of ornamental and utilitarian objects on poles or other elongated or elevated structures according to principles of the invention may be provided as a kit or an assembly to retrofit existing support structures, such as signs, light poles, sign poles and walls.

The invention is not limited to a particular raising and lowering means. Any means capable of rotating a plurality of spools to wind or unwind tether therefrom or capable of extending or retracting tethers trained over pulleys may be utilized. For clarity and simplicity, the following description focuses primarily on a winch and pulley system. Persons skilled in the art will appreciate that the invention is not limited to a winch and pulley system. Instead, a means for controllably raising and lowering a carriage over a continuum of positions, may include, by way of example and not limitation, manually or electrically operated winches; a lead screw raising and lowering a threaded yoke to which lanyards are connected, wherein as the lead screw turns, the yoke either ascends or descends, depending upon the direction of rotation; a pulleys on an output shaft driven through a gear box by a manually or electrically rotated input shaft. All such raising and lowering means and others may be utilized and are intended to come within the scope of the invention.

Referring to the Figures, in which like parts are indicated with the same reference numerals, various views of exemplary carriage assemblies and objects supported by exemplary carriage assemblies on poles according to principles of the invention are shown. A carriage collar attached to the top (distal) end of each pole provides pulleys for lanyards used to raise and lower a carriage, slots for engagement by locking hooks pivotally coupled to the carriage, a pusher bracket for guiding the hooks into and out of the slots, and optional electrodes for supplying electrical power to the carriage. A movable carriage supports a utilitarian and/or aesthetic object. The carriage optionally includes a flanged base to support a wide range of objects, rollers to facilitate gliding motion up and down a pole, pivoting hooks for engaging slots in the collar, and optional electrodes to make electrical contact with electrodes on the collar. Various accessories and components such as plumbing for irrigation, electrical supply lines, lanyards and a winch may be provided in the pole.

Referring now to FIG. 1, a pole structure 101 is attached to a standard Washington style lighting pole base 105 with a movable carriage 110 surrounding a portion of the pole, near the top or distal end of the pole, i.e., in the raised position 110. The pole, base or carriage can be of any style, shape, size or height and made of any material. The poles or structures may be attached or mounted to bases or direct imbedded into the ground.

Referring now to FIG. 2, the carriage 110 is shown in a lowered position resting on or near the base 105. A hand cranked winch 220 and/or an alternative electric winch 221 mounted in the base 105 control a cable 230 which in turn controls movement of the carriage up and down the structure. At the end opposite the winch, the cable 230 is attached to a yoke 232. Lanyards 234 attached to the yoke 232 are routed over a plurality of pulleys 240 and attached to the carriage 110. The pulleys 240 may be mounted on the pole, but are preferably mounted on an assembly referred to herein as a collar or collar assembly 250, which is attached to the pole, as described more fully below. The ends of the lanyards are attached to the carriage on the interior. The base 105 may be welded to the pole structure 101. A removable access panel 106 is provided to enable access to the winches for configuration and maintenance. A concrete foundation 290 may be provided to securely anchor the base 105.

The principles of the invention are not limited to a cable and winch raising and lowering mechanism. Other mechanisms for raising and lowering the carriage, such as any of the raising and lowering mechanisms described in copending U.S. Nonprovisional application Ser. No. 11/868,534, which is incorporated herein by this reference, may be utilized in lieu of or in addition to a cable and winch.

Now referring to FIG. 3, a side cut-away view of the carriage 110 and collar assembly 250 are shown. A plurality of rollers 351 spaced around the carriage 110 keep the carriage 110 from scraping against and scratching the pole 101 and facilitate smooth reduced friction travel of the carriage 110 as it is drawn up and down the pole 101. The rollers 351 may be placed in a channel 353 attached inside the carriage 110. Optionally, one or more of the rollers may be a spring biased roller 352 configured to maintain pressure against the pole 101. The spring biased roller 352 may be used when tapered pole structures are used 302. Where the tapered pole structure is smaller in diameter than the collar assembly 250, the spring urges the roller 352 against the tapered pole, keeping the carriage safely away from the pole 101. When the carriage 110 is raised, the spring roller 352 acts as a centering guide.

A plurality of irrigation pipes and/or electrical conduits 307 can be placed inside the structure. Splice joints 311, 312 connect the collar 250 and pole structure 110. The splice joints 311, 312 may also have a ring loop at the top for pipes and conduits to pass through. These splice joints 311, 312 may also be used at the top of the collar 250 to splice it to another structure, such as a continuing pole or a lighting fixture or other such system. Splice joints can optionally be solid collars or any other means suitable for joining tubular sections or a tubular section to another structure.

A catch-hook 360 allows for the carriage 110 to be raised into a locking position. The catch hook 360 is pivotally mounted to the carriage 110. Optionally, the tip of the hook may be fitted with a roller or a low friction material (e.g., a polytetrafluoroethylene pad) to facilitate ascending and descending movement and prevent scratching the finish on the pole 110. A pusher bracket 361 includes a kick rod configured to urge the hook 360 towards a corresponding slot 362 in the collar 250. Other means for urging the hook 360 forward may include a magnet positioned below the slot 362 and configured to attract another magnet on the tip of the hook 360, thereby causing the hook 360 to pivot towards the slot 362 before the slot is reached. Upon reaching the slot 362, the rising pivoted hook 360 pivots further into the slot under the influence of gravity. After the hook 360 pivots into the slot 362, the carriage 110 may be slightly lowered into a safe locking position. When locked, the hooks 360 support the weight of the carriage as well as its components, accessories and carried objects. The hooks 360 thereby relieve the cable 230, yoke 232 and lanyards 234 of substantial tension.

To unlock the carriage 110, the carriage 110 is slightly raised until a slanted plane of the pusher bracket 361 urges the hook 360, causing it to pivot gently away from the slot 362 into a released position leaning against the carriage 110. Thereupon, gravity keeps the hook 360 in the released position as the hook 360 descends with the carriage 110 below the slot 362. If the hook 360 is drawn towards the slot 362 below the slot, such as by a magnet, another means (e.g., a repelling magnet) may be provided below that point to urge the descending hook 360 back against the carriage 110. In doing so, the hook 360 will not scrape against the pole 101 as it descends.

Figure 4:
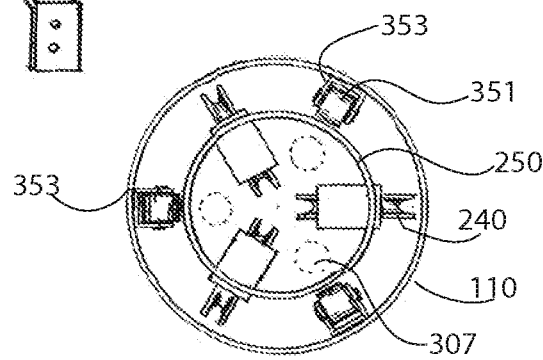
FIG. 4 provides a top cut-away view of an exemplary carriage assembly and a carriage collar, with pulleys, rollers, irrigation pipe, electrical conduit, catch-hook-release mechanism, lanyard according to principles of the invention.

Now referring to FIG. 4, a top view cross section of the carriage 110 and collar assembly 250 is provided. Rollers 351 are shown in channels 353 attached inside the carriage 110. Pulleys 240 are provided on the collar 250 for guiding lanyards 234. Supply lines such as irrigation pipes and/or electrical conduits 307 may extend through the pipe 101 and the collar 250.

Now referring to FIG. 5, a side cut-away view of the carriage 110 featuring a bird feeder 517 is provided. The bird feeder 517, shown in greater detail in FIGS. 6-9, is carried upon the carriage 110. In this embodiment, the collar assembly 250 extends above the carriage and feeder into the roof 515. The roof 515 and collar 250 are attached. In FIG. 6, the bird feeder 517 is shown lowered slightly from the roof 518 revealing the collar 250. FIG. 7 provides a top section cut-away view of the bird feeder 517, carriage 110 and collar 250. The carriage 110 and surrounding feeder 517 are free to travel up and down the pole structure 101 through central cavity 906 (FIG. 9). The bird feeder 517 is supported at the bottom of the carriage 110 by a flange 511. Both the carriage 110 and the feeder 517 extend into a cavity in the roof 515 to seal the top of the feeder from debris and to releasably lock the feeder into place. Seed may be poured into the feeder 517 from the open top which can optionally feature a cap 518, as shown in FIG. 8. A resting or perching rod 519 is located below each feeding hole 516. The feeder may be transparent or include a transparent panel to visibly expose the contents. The feeder can be of any design, style, size, and material that are compatible with the carriage 110. Devices and techniques to prevent intrusion by squirrels or other animals may be utilized.

FIG. 8 shows an optional cap 518 to enclose the top of the feeder 517. If the feeder 517 is made in one piece, the cap 518 is optional. However if the feeder 517 is made in two or more pieces, the cap 518 may be necessary to hold the pieces together in one unit as the feeder 517 ascends and descends the pole 101. The cap 518 made be formed in two pieces to be easily removed and installed.

In FIG. 9, a perspective view of the feeder 517 is shown. The feeder 517 features perches 519, feeder holes 516 and separate feeder sections. The separate sections may be created as permanent multiple sections in one unit or individual sections held together by a ring or cap 518 or other securing means.

Figure 10:
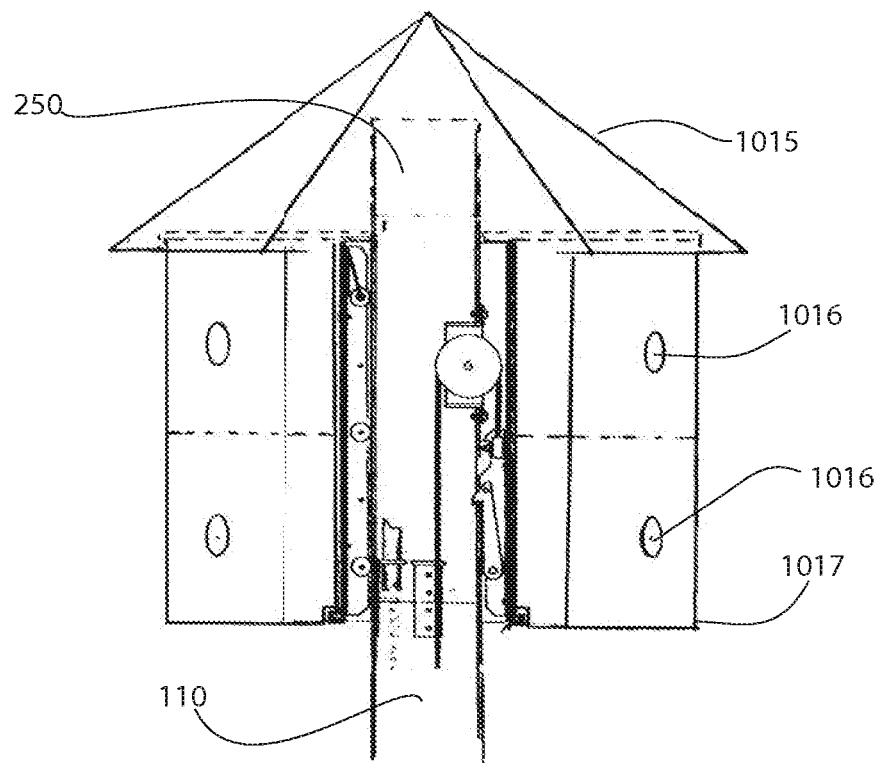
FIG. 10 provides a side partial cut-away view of an exemplary bird or animal house or sanctuary revealing a carriage assembly and pole according to principles of the invention.
Figure 11:
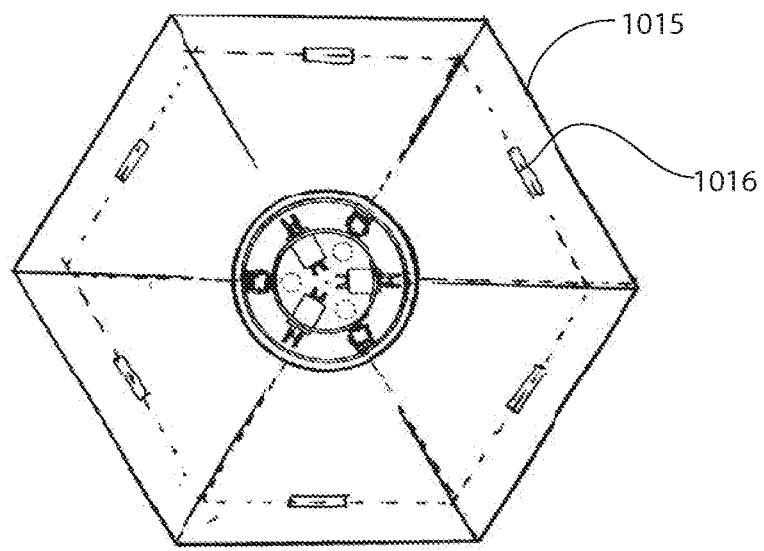
FIG. 11 provides an exemplary top partial cut-away view of an exemplary bird or animal house or sanctuary revealing a carriage assembly and pole according to principles of the invention.

FIGS. 10 and 11 illustrate a bird or animal house 1017 on the carriage 110. The roof 1015 is attached to the collar 250. The house 1017 rests on the flange 511 of the carriage 110. Animal or bird houses may be of a variety of sizes, shapes, designs and materials as well. Bird houses may include nests and roosting materials. Access holes 1016 for animal entry may vary in size, shape and location. FIG. 11 provides a top view of the house and the inner mechanical system. A water and bath system can be provided under the feeder or housing systems. Optionally houses and nests can be open platforms where the carriage flange becomes a large holder of nesting debris as used by eagles, ospreys and other such nesting birds. Conventional methods and product applications to prevent squirrel and other animal access to or up the poles and/or structures can be utilized.

Figure 12:
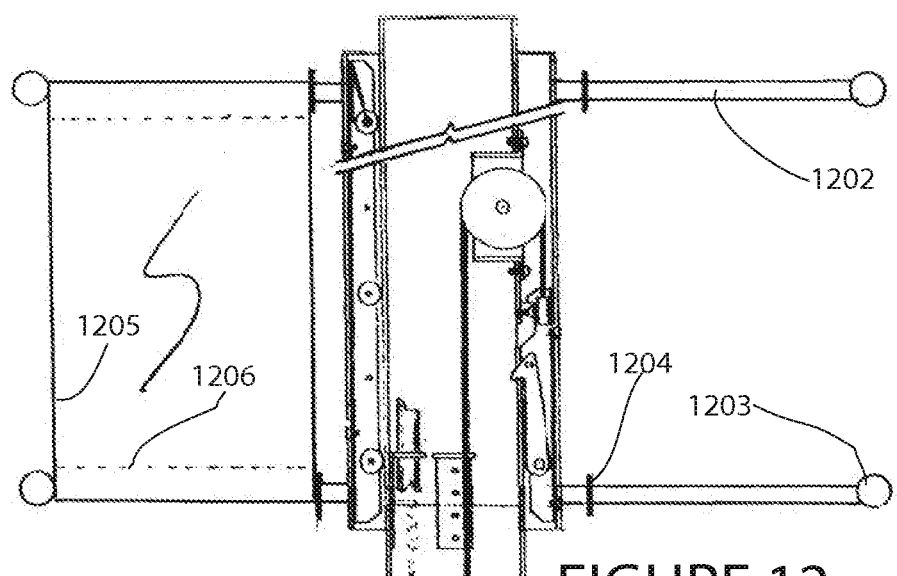
FIG. 12 provides a side cut-away view of an exemplary carriage with attached banner arms according to principles of the invention.

Now referring to FIG. 12, a side section view of the carriage 110 and the collar 250 with banner arms 1202 attached to the carriage. Any type of conventional banner arm 1202 can be attached to the carriage 110 using any means for attachment, such as mechanical couplings and welds. A banner 1205 may be sewn to create a pocket or sleeve 1206. The sleeve 1206 can be slid over the distal knob 1203 against a stop ring 1204. The carriage 110 can be raised and lowered for easy access to and servicing of the banners 1205 from the ground level, without use of a special truck, special equipment, crews or considerable labor.

Figure 13:
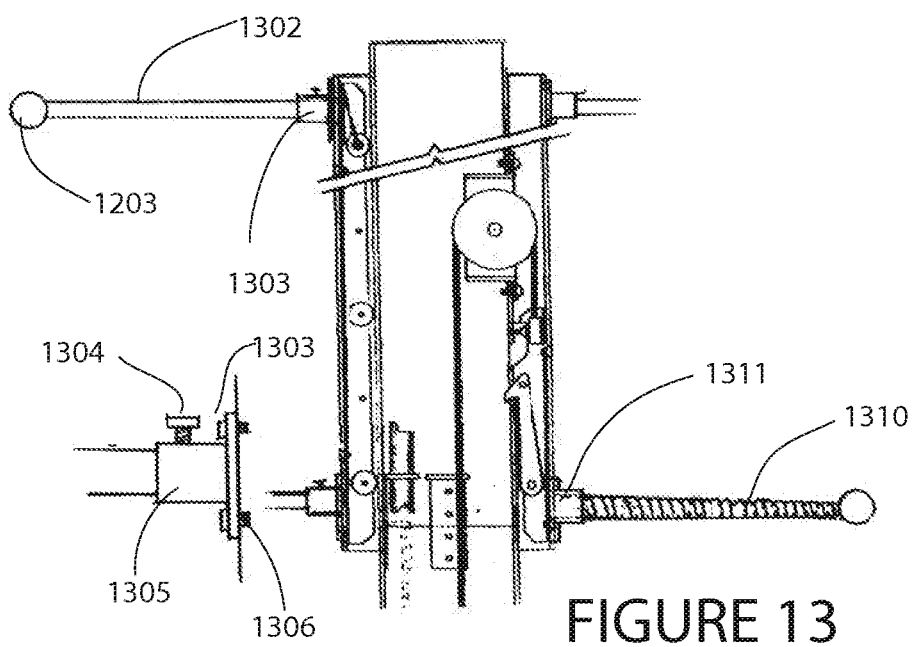
FIG. 13 provides a side cut-away view of an exemplary carriage with two different banner arms according to principles of the invention.

Now referring to FIG. 13, a side section view of the carriage 110 and collar 250 is repeated as in FIG. 12 with two new non conventional banner arms 1302 and 1310. The banner arm 1302 is attached to the carriage 110 with a flanged coupling 1303. The flanged coupling 1303 has an open socket 1305 and a thumb screw 1304. The socket 1305 is configured to receive a portion of the banner arm 1302. The thumb screw 1304 secures the received portion of the banner arm 1302 in the socket 1305. The flange 1306 may be bolted, screwed or welded to the carriage 110. The arm 1302 may be a replaceable and/or disposable component that easily bends when hit by vehicles or can be discarded if damaged by vandalism. Replacement does not require major repair or welding of the arm back to the pole. Optionally an arm 1310 comprising a continuous wound spring may be used. Advantageously, the spring arm 1310 returns to its original unstrained position after it is disturbed, e.g., hit by vehicles or bent by vandals. The spring arm 1310 may be attached to the carriage 110 with a flanged coupling 1303. The arms 1302 or 1310 may include threaded end configured to screw into the sockets 1305.

Figure 14:
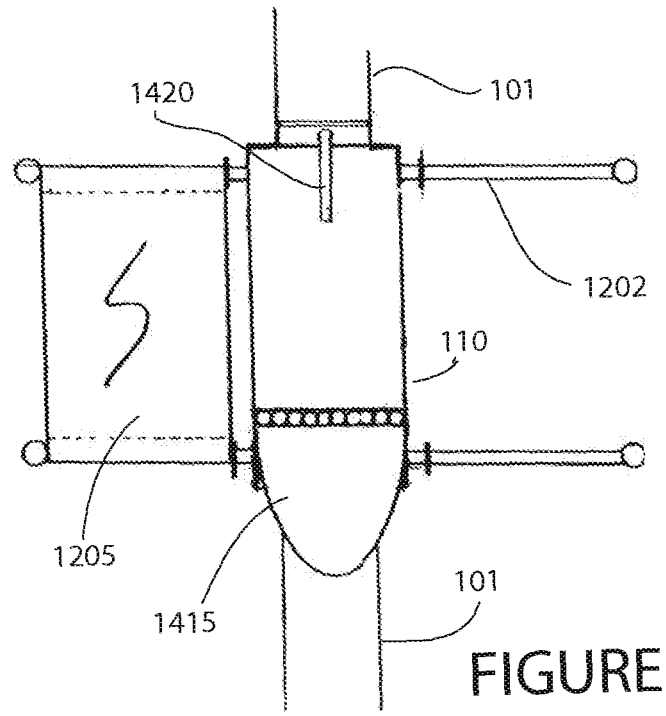
FIG. 14 provides a side view of an exemplary carriage with attached banner arms and a planter container according to principles of the invention.
Figure 15:
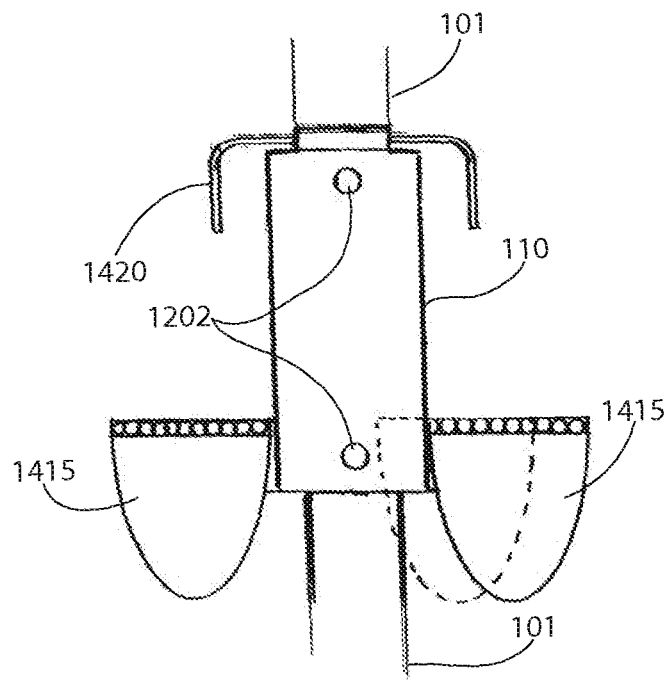
FIG. 15 provides a side view or quarter turn of the exemplary carriage with two banner arms and planter container in FIG. 14 according to principles of the invention.

Now referring to FIGS. 14 and 15, side and front views of a carriage with banner arms, such as arms 1202 (or 1302 or 1310); with the addition of a planting container 1415 are shown. The carriage 110 is configured to travel up and down the pole 101 for accessing and servicing the banners 1205, arms 1202 (or 1302 or 1310) and/or the attached planter container 1415. The planter container 1415 can be of any compatible size. Smaller separate planting pots, referred to as "Mini-Pots", may be contained in a larger planter 1415. The planter may rest on or hook onto the flange 511 of the carriage 110, be releasably integrated with the carriage 110 or be attached to the carriage 110 using any compatible attachment means. The invention therefore provides quick and easy access to carriage mounted planters 1415 for servicing. Furthermore, the planter 1415 may be irrigated through a tube 1320 using standard high pressure or lower pressure micro irrigation systems, timers, muffler emitters supplied with water from one or more pipes 307 running through the pole 101 and collar 250. By way of example and not limitation, the tube 1420 may be a curved tube containing a smaller rubber micro irrigation hose that terminates with a gauged release emitter on the outlet. Any suitable plumbing attachments can be used to couple the pipes 307 to a water supply.

Figure 16:
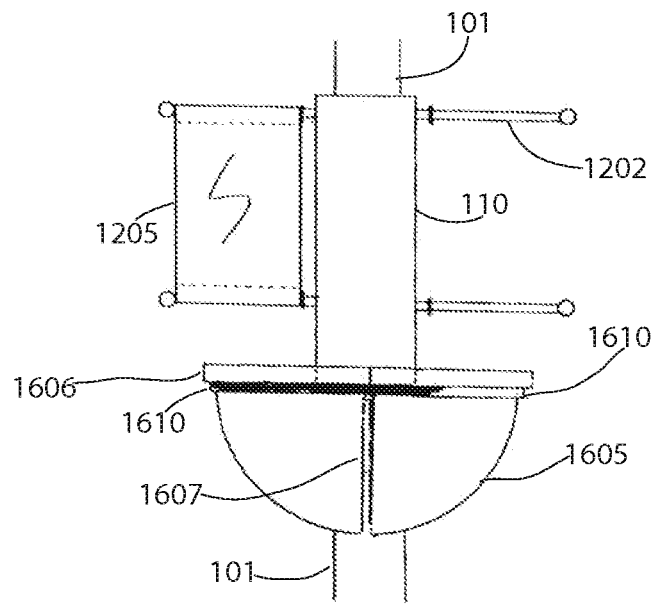
FIG. 16 provides a side view of an exemplary carriage with banner arms and a Bundt-style planter container with removable quarter sections at the bottom according to principles of the invention.
Figure 17:
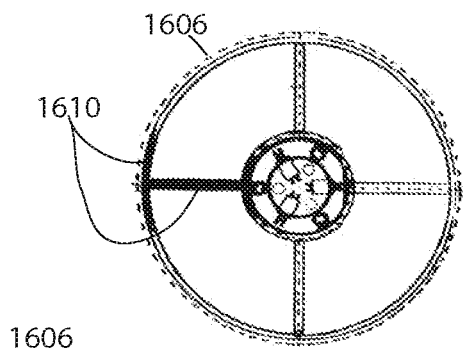
FIG. 17 provides a top view of an exemplary carriage with banner arms and a Bundt-style planter container in removable quarter sections according to principles of the invention.
Figure 18:
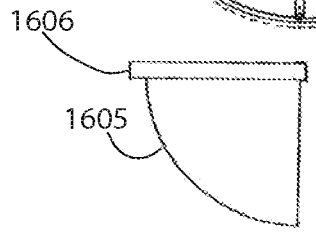
FIG. 18 provides a side view of an exemplary Bundt-style planter container quarter section according to principles of the invention.

Now referring to FIGS. 16, 17 and 18, another planter container 1605 configured for attachment to a carriage 110 according to principles of the invention is shown. The carriage also supports banner arms 1202 with slip-on banners 1205. By way of illustration, an exemplary Bundt-style planter container 1605 with a hole through the center is shown. The Bundt-style planter 1605 allows the planter to surround and travel the pole 101, collar 250 and carriage 110. The Bundt-style planter 1605 may optionally be divided into a plurality (e.g., 2, 3, 4 or more) of planter units which may be held together using a coupling means. By way of example and not limitation, a ring frame 1610 may be attached to the bottom of the carriage 110 and used to hold the planter units 1605 together. As shown in FIG. 18, each unit 1605 may have a top lip feature 1606 around the top outer periphery comprising a ledge for hooking onto and suspending from the ring frame 1610. As shown in the top view of FIG. 17, the dotted line 1606 represents the outer edge of the lip 1606 hooked over or resting upon the ring frame 1610. A gap 1607 may appear in between the separate planter units 1605. Use of the Bundt-style planter comprising a plurality of separable units facilitates retrofitting existing pole structures.

Now referring to FIGS. 19, 20 and 21, various views of an alternative embodiment with a planter 1910 and banner arms 1916 below the planter are provided. The banner arms 1916 are attached to a carriage extension 1925 below the planter 1910. The planter 1910, carriage 110 and extension 1925, banner arms 1916 and banner 1205 can be lowered and raised for service. The Bundt-style planter 1910 surrounds the pole 101, collar 250 and carriage 110, and engages and rests on a flanged bottom 1911 of the carriage 110. For structural enhancement, a reinforcing collar 1912 is attached under the flange 1911.

The carriage extension 1925 provides means for connecting the banner arms 1916 below the 1910 planter. As shown in FIG. 21, a pin 1914 attaches a swinging arm 1913 to the reinforcing collar 1912. Threaded holes 1915 in the swinging arm 1913 and bottom collar 1920 receive an upper banner arm 1916 and lower banner arm 1917, each having a matching thread. A plurality of rollers 2005 in the bottom collar 1920 allows the collar 1920 to travel up and down the pole structure 101 for service. The moving banner arm system can be disassembled at the bottom of the pole 101, as may be needed for the planter container 1910 to be lowered further for better accessibility.

Now referring to FIG. 22, a side section view of an embodiment with a hanging planter suspended from an ornate cantilever arm 2220 of a carriage 110 is shown. An optional decorative gusset 2202 supports the cantilever arm 2220. The planter 2205 hangs from lines 2207 (e.g., rope, chain or wire) connected to a rod or tube 2206 extending downward from the cantilever arm 2220. Optionally, an irrigation line or tube 2204 may be provided to irrigate the planter 2205. The irrigation line or tube 2204 may be fluidly and operably coupled to a micro irrigation system, timer, muffler and emitters. Furthermore, the irrigation line or tube 2204 may be supplied with water from one or more pipes 307 running through the pole 101 and collar 250. A hole in the arm 2220 allows irrigation to pass through and drain or drip into the basket. The irrigation line 2204 may stay in place as the carriage 110 and basket 2205 travel up and down the pole 101. Alternatively, the irrigation line 2204 may be a fluid channel that aligns with a fluid outlet in the collar 250 when the carriage 110 is in a raised position. The cantilever arm 2220 carriage may carry objects other than planters, such as animal or bird houses or feeders, as conceptually illustrated by the dotted outline 2216.

Referring now to FIGS. 23 and 24, side cut-away views show an alternative embodiment and a pulley are provided. Here, a stationary carriage 2301 includes cantilever arms 2302 containing pulleys 2306 over which lanyards 2320 are routed. Planters 2205, baskets, feeders, houses or other utilitarian and/or ornamental objects may be suspended from the lanyards 2320. The arms 2302 may hold pulley sheathes 2306 which the lanyards 234 pass through to the yoke 232 to the cable 230 and to winches. As discussed above, other means for raising and lowering may be utilized.

Optionally, the pulleys 2306 may have a deep groove 2340 for the lanyards 234 to pass through. Optionally, the pulleys 2306 may be belt or chain driven. For example, a drive chain may be attached to the end of the lanyard. The drive chain may mesh with and ride both sides 2325 of the pulley 2306. The lanyards 2320 and chains may be attached by welding or crimping the lanyard to a chain link receptor. The advantage provided by using a chain is that the lanyard ends do not become permanently curved and damaged. Such permanent curvature known as memory inhibits raising and lowering and increases the risk of failure. Optionally, in lieu of a connector joining the chain to a cable, a chain using one set of gear teeth and a pulley can be used. The chain could attach to the yoke 232 and cable 232.

Figures 25, 26:
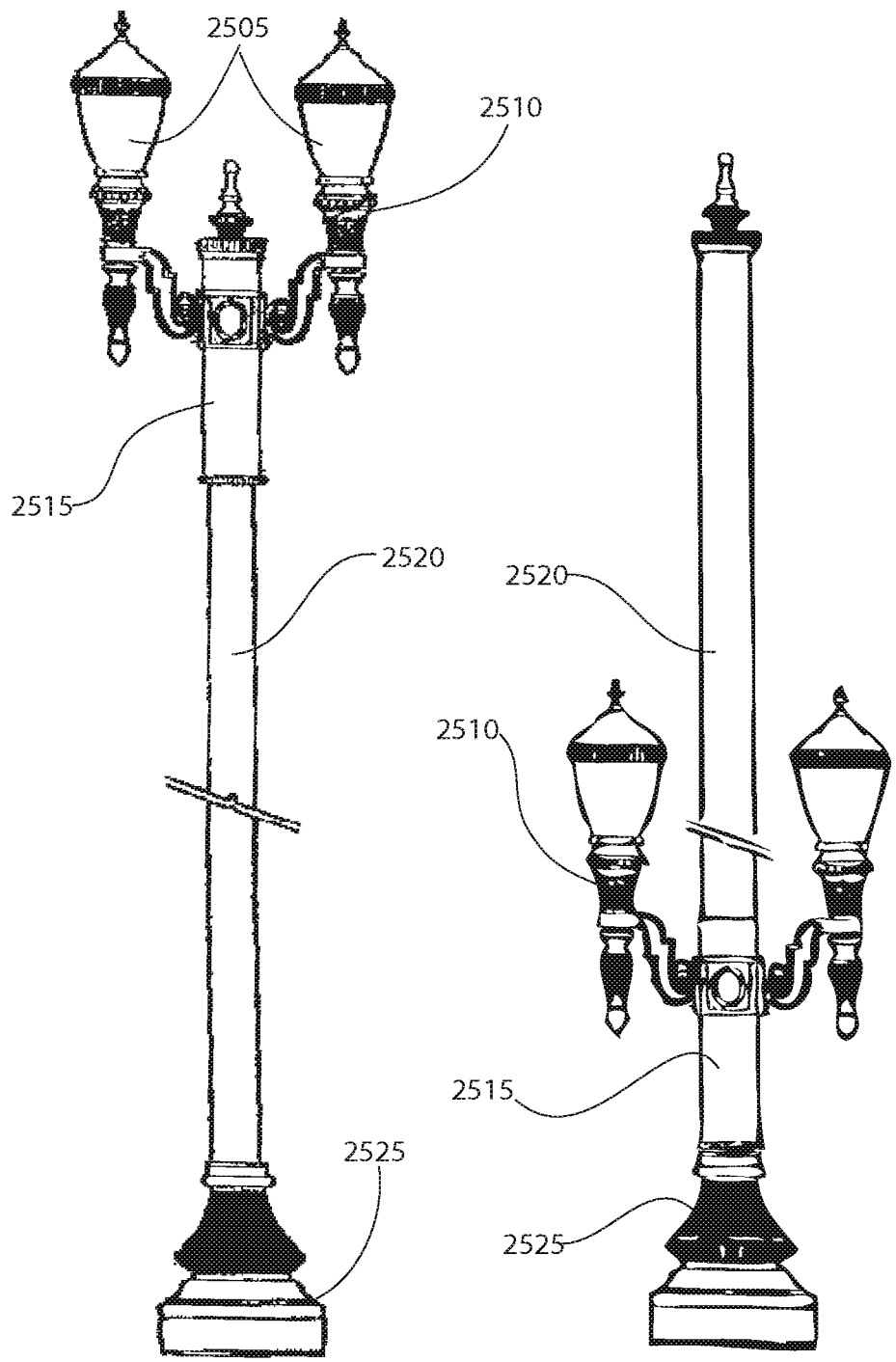
FIG. 25 provides a side view of an exemplary lighting pole with a movable carriage and a multiple lighting globe fixture in a raised position according to principles of the invention.
FIG. 26 provides a side view of an exemplary lighting pole with a movable carriage and a multiple lighting globe fixture in a lowered position according to principles of the invention.

Now referring to FIGS. 25 and 26 a side view of a pole 2520 with a movable carriage 2515 accessorized with a decorative base 2525 and lighting fixtures 2510 having decorative light covers 2505. The carriage 2515 travels up and down the pole 2520 for service and maintenance stopping at the base 2525. As discussed below, this embodiment includes electrical contacts and a switch disposed around the carriage 2515 and collar. The electrical contacts include a pair for the ground, power and neutral. The switch is engaged when the carriage is in the raised and locked position. The switch completes a circuit allowing electricity to flow between corresponding contacts. When the carriage is lowered, the switch is disengaged, the circuit is open and no electricity reaches the exposed contacts. The system has unlimited potential for mechanical and aesthetic variations in design and is not limited to the design or number of lighting fixtures depicted in FIGS. 25 and 26.

Figures 27, 28:
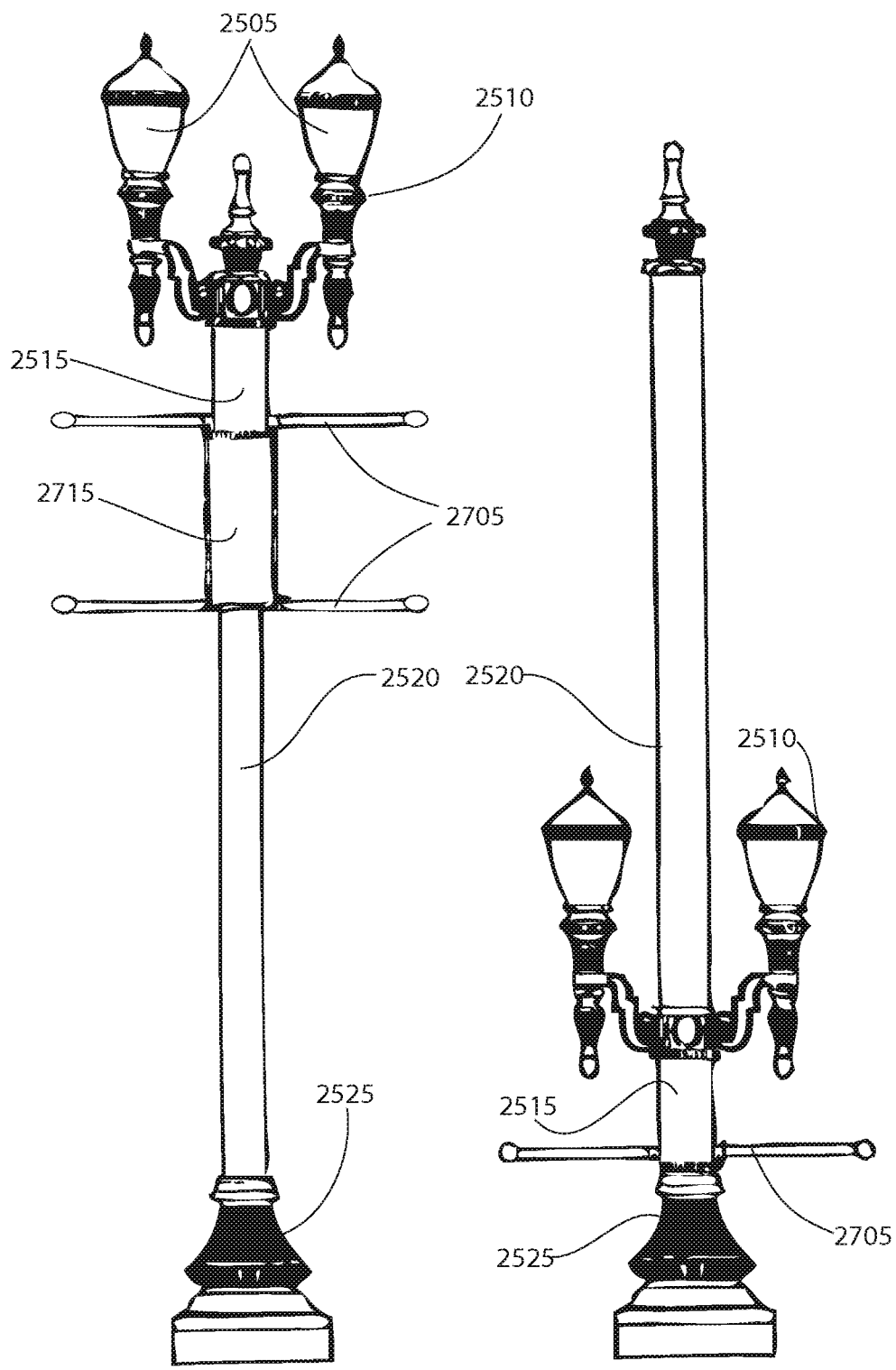
FIG. 27 provides a side view of an exemplary lighting pole with a movable carriage for a multiple lighting globe fixture and banner arms in a raised position according to principles of the invention.
FIG. 28 provides a side view of an exemplary lighting pole with a movable carriage for a multiple lighting globe fixture and banner arms in a lowered position according to principles of the invention.

Now referring to FIGS. 27 and 28 a side view of the pole 2520 with a movable carriage 2515 accessorized with a decorative base 2525 and lighting fixtures 2510 having decorative light covers 2505 are shown. Also shown are banner arms 2705 attached to a carriage extension 2715. The planter lighting fixture 2510, carriage 2515 and extension 2715, and banner arms 2705 can be lowered for service. When lowered, the bottom banner arms and extension 2715 can be removed allowing for access to the lighting fixture at the lowest levels. Construction may vary allowing for removal such as but not limited to the examples in FIGS. 19-21. The carriage 2515 travels up and down the pole 2520 for service and maintenance stopping at the base 2525. As discussed below, this embodiment includes electrical contacts and a switch disposed around the carriage 2515 and collar. The electrical contacts include a pair for the ground, power and neutral. The switch is engaged when the carriage is in the raised and locked position. The switch completes a circuit allowing electricity to flow between corresponding contacts. When the carriage is lowered, the switch is disengaged, the circuit is open and no electricity reaches the exposed contacts. The system has unlimited potential for mechanical and aesthetic variations in design and is not limited to the design or number of lighting fixtures depicted in FIGS. 27 and 28.

Figure 29:
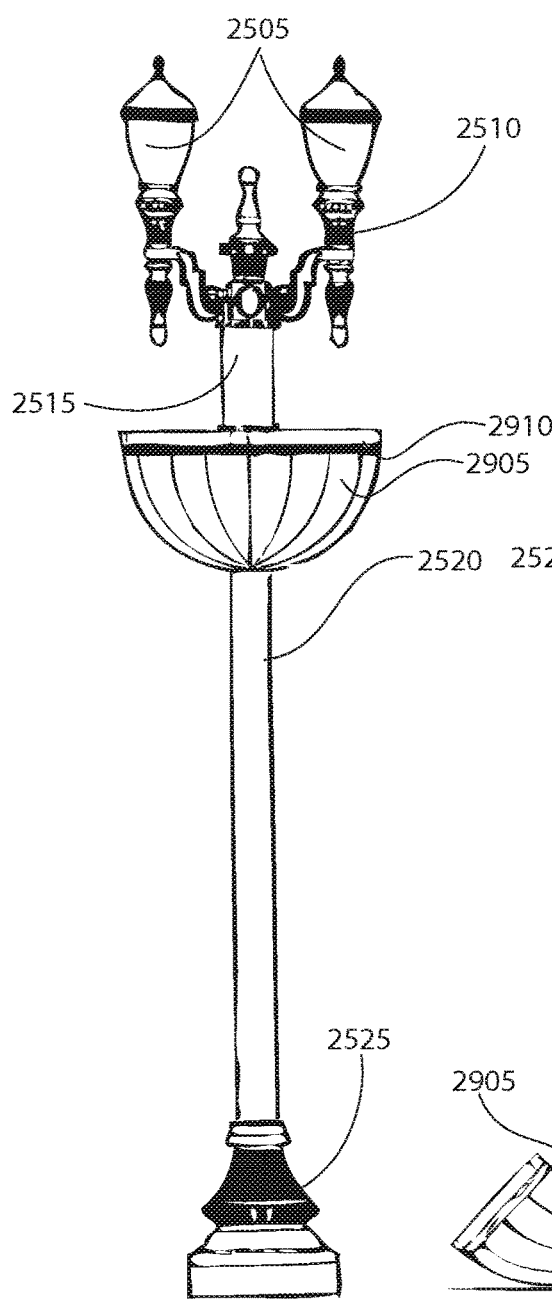
FIG. 29 provides a side view of an exemplary lighting pole with a movable carriage for a multiple lighting globe fixture and a Bundt-style planter in half sections in a raised position according to principles of the invention.
Figure 30:
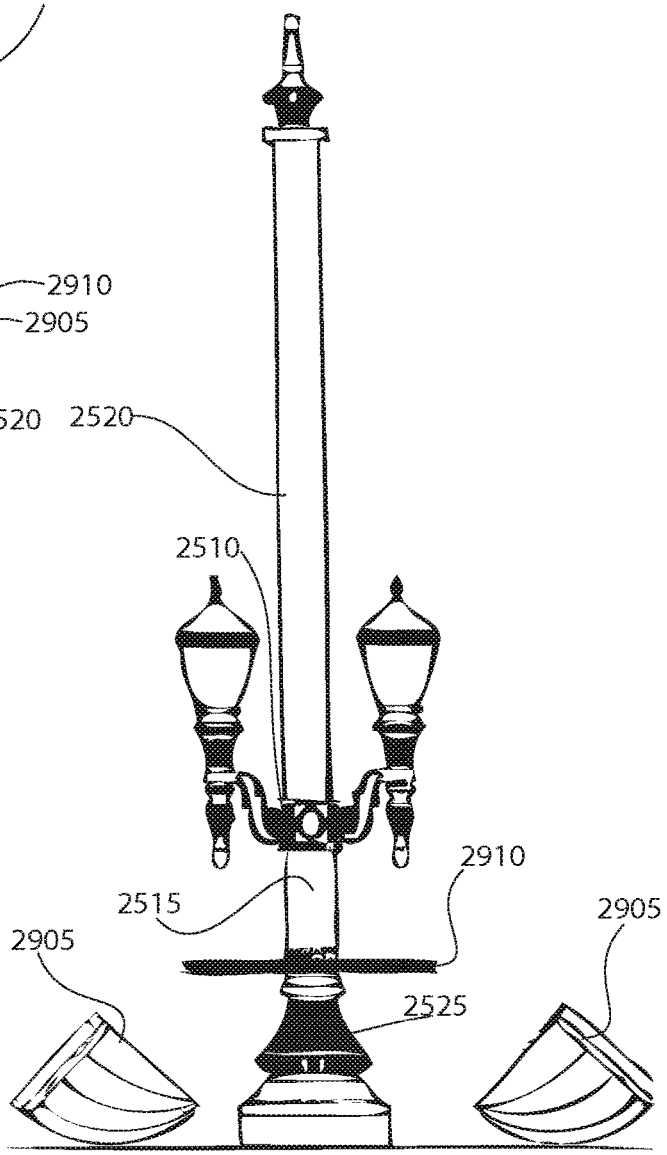
FIG. 30 provides a side view of an exemplary lighting pole with a movable carriage for a multiple lighting globe fixture and a Bundt-style planter with half sections in a lowered and removed position according to principles of the invention.

Now referring to FIGS. 29 and 30 a side view of the pole 2520 with a movable carriage 2515 accessorized with a decorative base 2525 and lighting fixtures 2510 having decorative light covers 2505 are shown. Also shown is a Bundt-style separable planter container 2905 configured for attachment to the carriage 2515. The Bundt-style planter 2905 is divided into a plurality (e.g., 2, 3, 4 or more) of planter units, each of which may be held together using a coupling means. The system is similar to those illustrated in the exemplary embodiments described above and illustrated in FIGS. 16-18. By way of example and not limitation, the coupling means may comprise a ring frame 2910 attached to the bottom of the carriage 2515 and used to hold the planter units 2905 together. The planter lighting fixture 2510, carriage 2515 and extension 2715, and planter 2905 can be lowered for service. When lowered, the planter 2905 can be removed. The carriage 2515 travels up and down the pole 2520 for service and maintenance stopping at the base 2525. As discussed below, this embodiment includes electrical contacts and a switch disposed around the carriage 2515 and collar. The electrical contacts include a pair for the ground, power and neutral. The switch is engaged when the carriage is in the raised and locked position. The switch completes a circuit allowing electricity to flow between corresponding contacts. When the carriage is lowered, the switch is disengaged, the circuit is open and no electricity reaches the exposed contacts. The system has unlimited potential for mechanical and aesthetic variations in design and is not limited to the design or number of lighting fixtures depicted in FIGS. 29 and 30.

Now referring to FIGS. 31, 31A and 32 side views of an embodiment with a single lighting fixture 3110 are shown. The single fixture 3110 is a Bundt-style fixture that surrounds and contains the carriage. The bottom of the pole 3115 is secured in a decorative base 3120. A top cap 3105 covers the collar 3130 and seals the inner components. The collar includes pulleys for guiding lanyards 3125. As discussed below, this embodiment also includes electrical contacts and a switch disposed around the carriage and collar. The electrical contacts include a pair for the ground, power and neutral. The switch is engaged when the carriage is in the raised and locked position. The switch completes a circuit allowing electricity to flow between corresponding contacts. When the carriage is lowered, the switch is disengaged, the circuit is open and no electricity reaches the exposed contacts. The system has unlimited potential for mechanical and aesthetic variations in design and is not limited to the design or number of lighting fixtures depicted in FIGS. 31, 31A and 32. Optional locations for light sockets are 3111.

Figure 33:
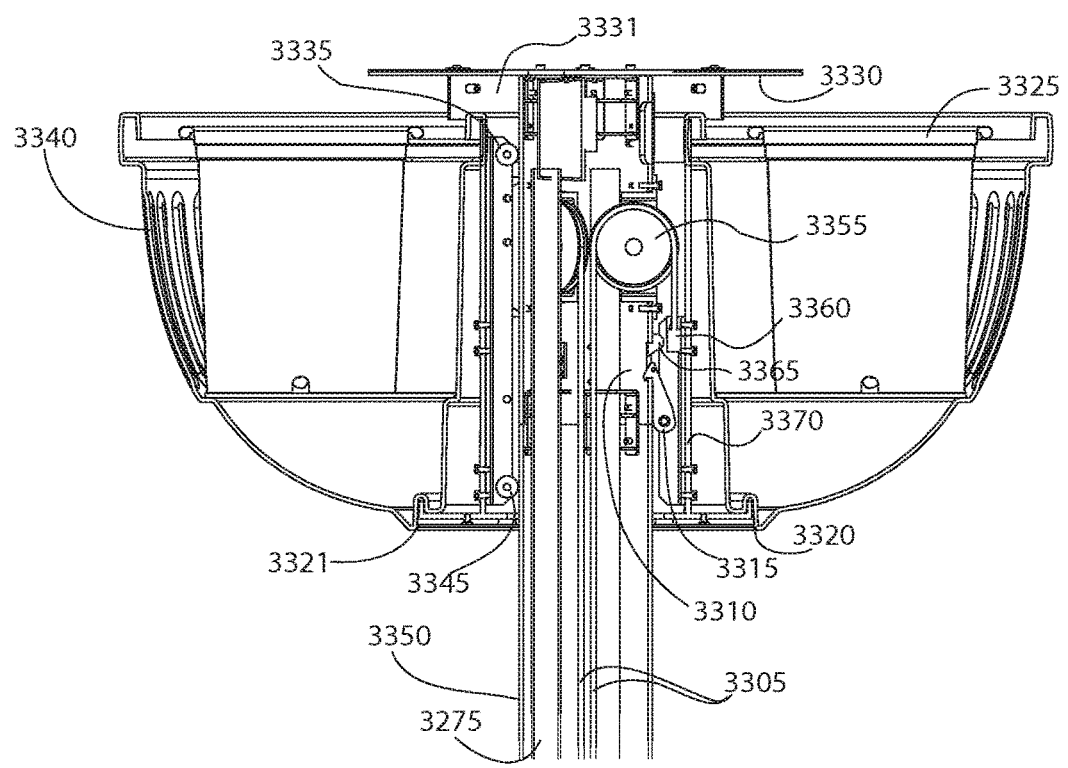
FIG. 33 provides a side section view of an exemplary movable carriage with a planter in a raised position according to principles of the invention.
Figure 34:
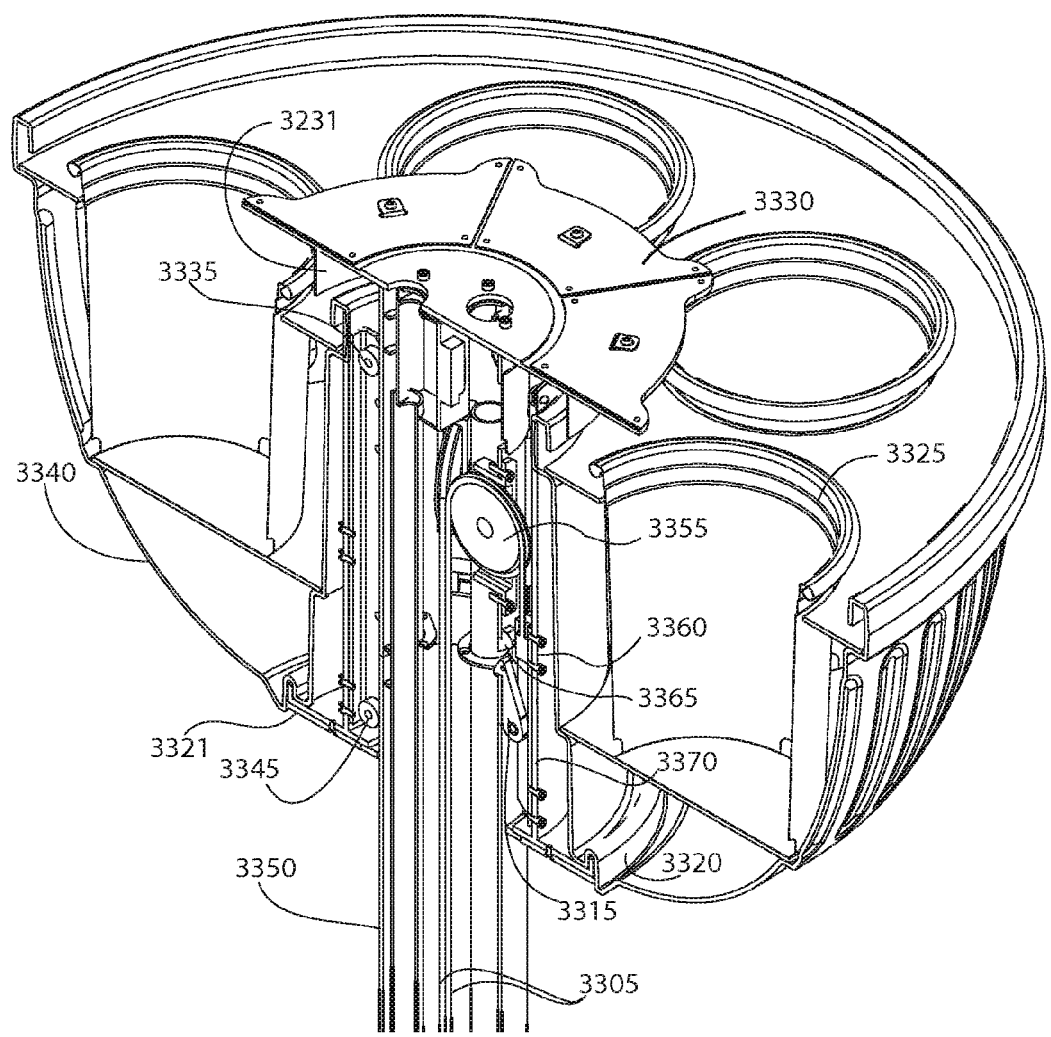
FIG. 34 provides a perspective view of an exemplary movable carriage with a planter in a raised position according to principles of the invention.

Now referring to FIGS. 33 and 34, various views of an alternative embodiment with a planter container 3340 that contains several planters 3325 are provided. The planter 3340, its contents and carriage 3370 can be lowered and raised for service using the lanyards 3305 routed over pulleys 3355 in the collar 3310. Couplings 3360 secure the lanyards 3305 to the carriage 3370. The planter container 3340 is a Bundt-style container that surrounds the pole 3350, collar 3310 and carriage 3370, and, with a bottom lip 3320, engages and rests on a flanged bottom of the carriage 3370. As described above, rollers 3335, 3345 are provided to facilitate motion of the carriage 3370. A plurality of irrigation pipes and/or electrical conduits 3375 extend through the pole 3350 and collar 3310.

A catch-hook 3315 allows for the carriage 3370 to be raised into a locking position. The catch hook 3370 is pivotally mounted to the carriage 3350. Optionally, the tip of the hook may be fitted with a roller or a low friction material (e.g., a polytetrafluoroethylene pad) to facilitate ascending and descending movement and prevent scratching the finish on the pole 3350.

A pusher bracket 3365 includes a kick rod or plane configured to urge the hook 3370 towards a corresponding slot in the collar 3310. Other means for urging the hook 3370 forward may include a magnet positioned below the slot and configured to attract another magnet on the tip of the hook 3370, thereby causing the hook 3370 to pivot towards the slot before the slot is reached.

Upon reaching the slot, the rising pivoted hook 3370 pivots further into the slot under the influence of gravity. After the hook 3370 pivots into the slot, the carriage 3350 may be slightly lowered into a safe locking position. When locked, the hooks 3370 support the weight of the carriage as well as its components, accessories and carried objects. The hooks 3370 thereby relieve the cable, yoke and lanyards 3305 of substantial tension.

To unlock the carriage 3370, the carriage 3370 is slightly raised until a slanted plane of the pusher bracket 3365 urges the hook 3315, causing it to pivot gently away from the slot into a released position leaning against the carriage 3370. Thereupon, gravity keeps the hook 3315 in the released position as the hook 3315 descends with the carriage 3370 below the slot. If the hook 3315 is drawn towards the slot below the slot, such as by a magnet, another means (e.g., a repelling magnet) may be provided below that point to urge the descending hook 3315 back against the carriage 3370. In doing so, the hook 3315 will not scrape against the pole 3350 as it descends. Optionally, a drip plate 3330 is provided to guide small volumes of water for micro-irrigation of the planters 3325.

Referring now to FIGS. 35 through 39, various views of a collar assembly 3310 and components thereof are conceptually illustrated. The collar 3310 may be mounted to a pole 3350, typically at the top of the pole 3350, using attachment tabs 3510. The collar contains components and includes features that functionally cooperate with the carriage. 3370. Among the components in the exemplary embodiment shown in FIG. 35 are pulleys 3355 for guiding lanyards, a pusher bracket 3365 for urging each catch hook pivotally mounted to the carriage into a slot 3515, electrodes 3525 for electrically connecting to corresponding electrodes mounted to the carriage when the carriage is in a raised and locked position, a switch 3520 for interrupting the supply of electricity to the electrodes 3525 when the carriage is not raised and locked into position, and guide brackets 3505 for mounting and guiding components such as utility supply lines and top structures. Roller channel guide bars 3422 align the catch-hook-release system. Rollers of the carriage 3370 travel between the guide bars 3422. The switch 3520 is a leaf spring actuated switch or a similar switch that is actuated when the carriage is raised. The electrode 3525 includes an electrically conductive contact strip 3810 and an insulating body 3805. Corresponding electrodes 3700 are mounted to the carriage 3370 in alignment with the electrodes 3525 on the collar 3310 and configured to electrically engage the electrodes 3525 on the collar 3310 when the carriage is raised and locked. The corresponding electrodes include a conductive leaf spring 3710 and an insulating body 3705. An electrical box 3802, as shown in FIG. 38, inside the collar 3310 is a junction that provides electrical power to the electrodes and an access panel 3401. If the collar is installed at some point in between the base and a lighting fixture, the splice brackets 3405 or 3410, either top or bottom, can be replaced with a solid coupling. On the top, the collar may include a dust or debris shield 3331 as well as a drip plate 3330 with a solid ring splicing collar both above and below it. Alternative methods of construction include using a long one piece splice between the upper and lower sections of the structure similar to FIGS. 44 and 45 with access openings for service. The collar 3310 would be split vertically into three equal sections and attached over the splice. This allows for easy removal access to the interior of the structure as needed. Spacer rings can be provided to adjust the pieces overall diameter to variable vertical structure diameters, while using the same carriage.

Embodiments of the invention that provide electrical circuits extending through the pole 3350 to the carriage 3370 are not limited to electrical subsystems having separable electrodes 3525, 3700. In a hard wired alternative embodiment, one or more wires pass through the pole 3350 and collar 3310 and connect to one or more outlets, jacks or electrical loads on the carriage 3370, i.e., the wires have terminals (ends or connection points) on the carriage 3370. The wires may be extendable and retractable using a spring-biased retractable roller assembly configured to let out as much wire as is needed to reach the carriage, or by containing excess wire in the pole 3350 with a weight or other biasing means configured to draw the excess wire back down into the pole 3350, or by providing rollers and pulleys operably coupled to the winch and configured to extend and retract spooled wires as the carriage 3370 is lowered or raised using the winch, or any other manner that allows an electrical coupling to be maintained between the carriage 3370 and collar 3310 as the carriage 3370 travels through its entire range of motion.

Figure 40:
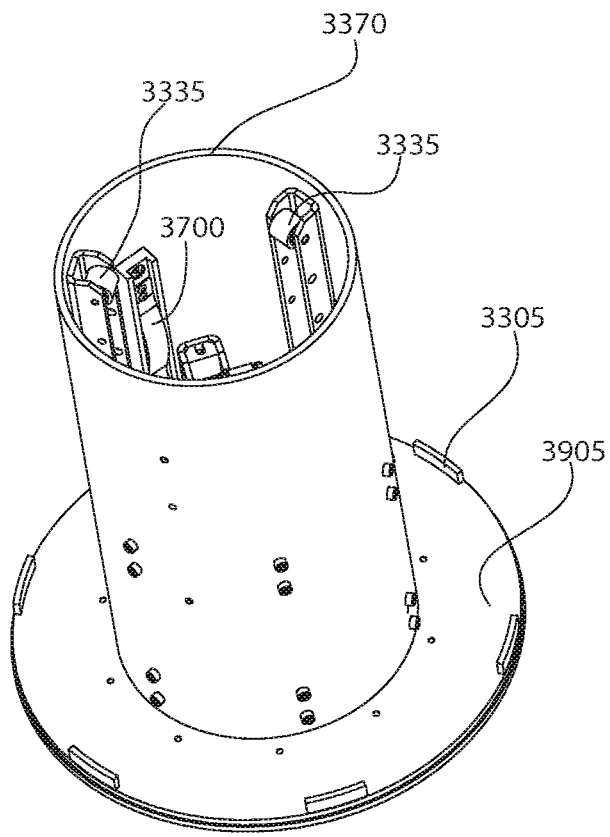
FIG. 40 provides a perspective view of an exemplary carriage assembly according to principles of the invention.
Figure 41:
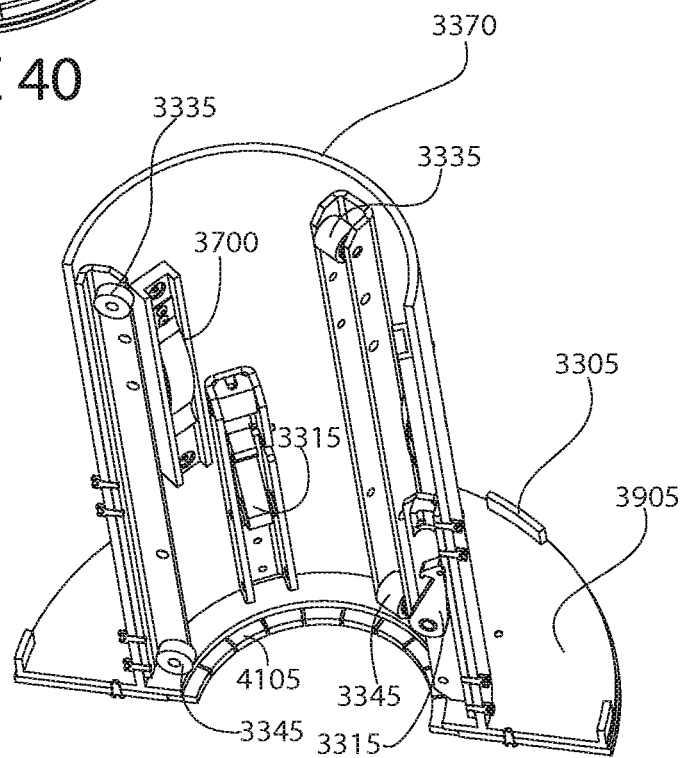
FIG. 41 provides a perspective section view of an exemplary carriage assembly according to principles of the invention.

Referring now to FIGS. 40 and 41, various views of a carriage assembly 3370 and components thereof are conceptually illustrated. A plurality of channel mounted rollers 3335, 3345 spaced around the carriage 3370 keep the carriage 3370 from scraping against and scratching the pole 3350 and facilitate smooth reduced friction travel of the carriage 3370 as it is drawn up and down the pole 3350. Catch-hooks 3315 allow for the carriage 3370 to be raised into a locking position. The catch hooks 3315 are pivotally mounted to the carriage 3370. Optionally, the tip of the hook may be fitted with a roller or a low friction material (e.g., a polytetrafluoroethylene pad) to facilitate ascending and descending movement and prevent scratching the finish on the pole 3370. A flanged base 3905 is provided to support and/or attach objects to be carried by the carriage 3370. The flanged base 3905 includes tabs for engaging and/or mating with corresponding features on the objects carried by the carriage 3370. An elastomeric o-ring, gasket or seal 4105 is provided along the inner diameter of the bottom of the carriage assembly 3370 to prevent intrusion of water, debris and dust. The gasket 3370 also helps maintain alignment and prevent binding of the carriage during ascending and descending motion. Optionally, a similar o-ring, gasket or seal may also be provided near the top of the carriage 3370.

Figures 42, 43:
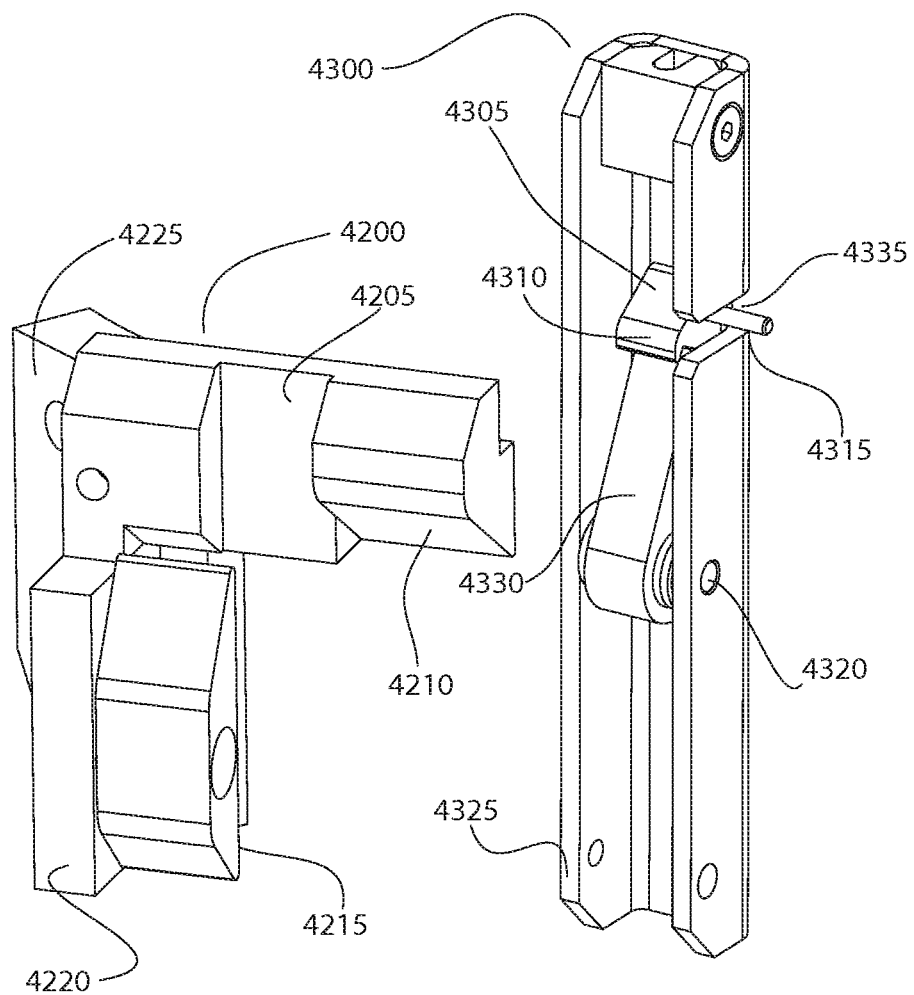
FIG. 42 provides a perspective view of an exemplary hook guide assembly according to principles of the invention.
FIG. 43 provides a perspective view of an exemplary hook assembly according to principles of the invention.

Referring now to FIGS. 42 and 43, an exemplary hook guide assembly 4200 for urging the pivotally mounted hook 4330 towards and away from a slot to lock and unlock (or release) a carriage 3370 from a collar 3310 are shown. The hook guide assembly 4200 is mounted to a collar 3310, adjacent to a slot 3515, with pin guide 4215 alongside the slot 3515 and ridge 4210 at the top of the slot 3515. The hook guide assembly 4200 is attached to the collar 3310 using a mounting bracket 4225. A furrow 4205 allows passage of the channel 4325 of the hook assembly 4300. The hook assembly 4300 is mounted on the carriage 3370 in alignment with the hook guide assembly 4200, with the hook assembly channel 4325 aligned with the furrow 4205.

The hook assembly 4300 includes a channel 4325 which is mounted to the interior surface of the carriage 3370. A hook 4330 is pivotally mounted to the channel 4325 by a pivot pin 4320. A guide pin extends laterally from the head 4305 of the hook. The head 4305 includes an inclined plane 4305 and a tip 4310. Optionally, the tip 4310 may include a roller (not shown) or a low friction pad. A notch 4335 in the channel 4325 accommodates movement of the pin 4315 during pivoting motion of the hook 4300.

The hook guide assembly 4200 includes a pin guide 4215 configured to engage and direct a pin 4315 towards a slot 3515 as the hook 4330 approaches a slot 3515 in a collar 3310. The pin guide 4215 is adjustably mounted to a shoulder 4220. Thus, the angle of the pin guide 4215 may be adjusted for optimal guidance of the pin 4315. As the carriage 3370 travels upwardly from a lowered position towards the collar 3310, the hook guide assembly 4200 mounted to the collar 3310 is stationary. As the hook assembly 4300 reaches the hook guide assembly 4200, the pin 4315 encounters the pin guide 4215, urging the pin 4315 towards the slot 3515 and thereby causing the hook 4330 to tip forward toward the slot 3515 in the collar 3310. Upon tipping forward, the hook 4330 makes an audible sound and generates a palpable impulse. Thereupon, the carriage 3370 may be lowered until the tip 4310 of the hook 4330 engages the bottom of the slot 3515. At that point, the carriage 3370 is locked and the hook 4330 carries the load of the carriage 3370.

Other means for indicating contact between the hook 4330 and slot 3515 may optionally be provided. By way of example and not limitation, a visible indicator such as a light or an audible alarm such as a buzzer may be activated when the hook 4330 pivots towards the slot 3515 a sufficient angular amount for locking engagement and/or when the hook 4330 contacts any part of the periphery of the slot 3515.

To release the hook 4330, the carriage 3370 is elevated until the inclined plane 4305 of the hook tip 4310 encounters the hook ridge 4210. The hook ridge 4210 is angled to urge the encountered inclined plane 4305 of the hook tip 4310 to pivot away from the slot 3515, back towards the channel 4325 of the hook assembly 4300. Thereupon, the carriage 3370 may be lowered without the hook engaging the slot 3515.

Figures 44, 45:
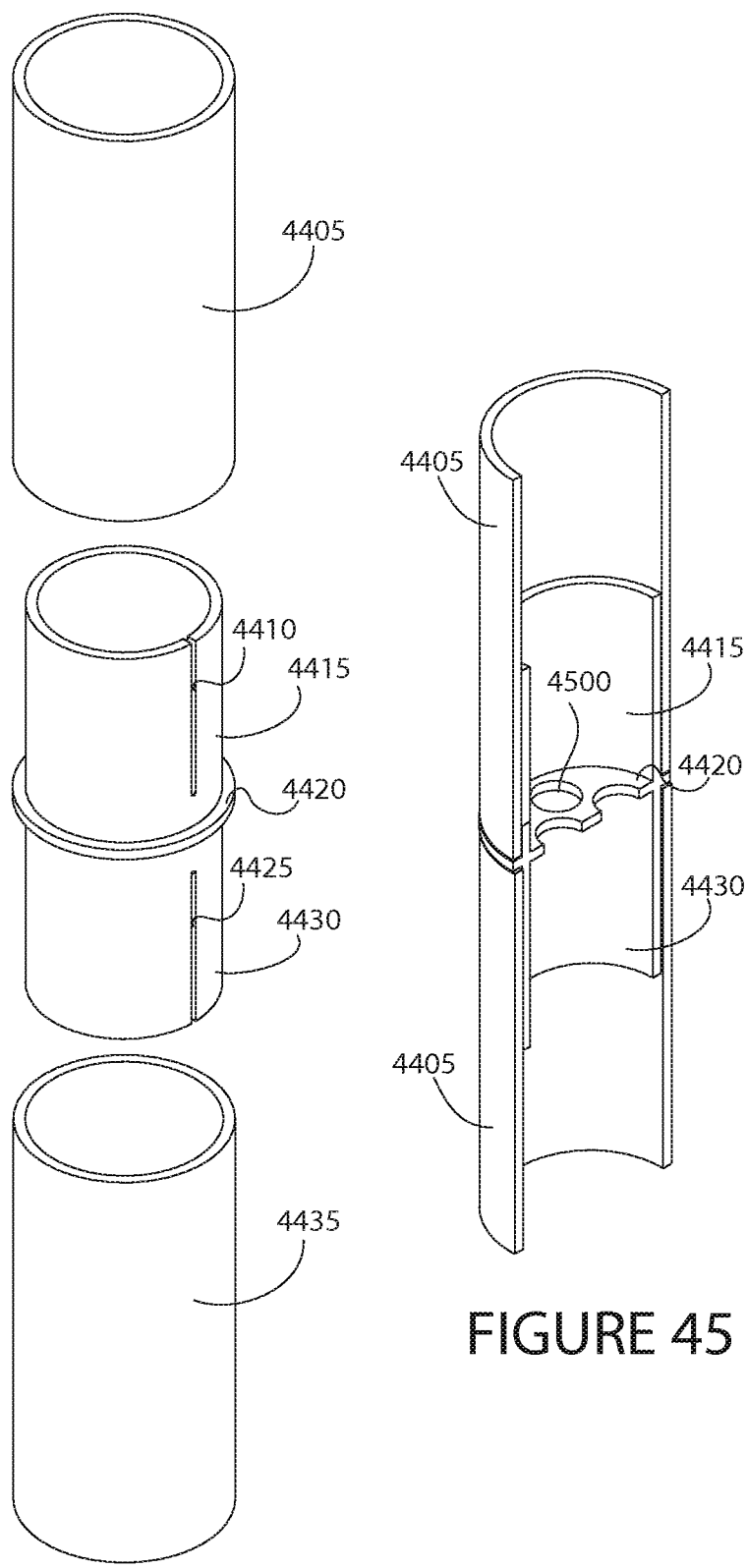
FIG. 44 provides a perspective exploded view of an exemplary coupling according to principles of the invention.
FIG. 45 provides a perspective section view of an exemplary coupling according to principles of the invention.
Figure 54:
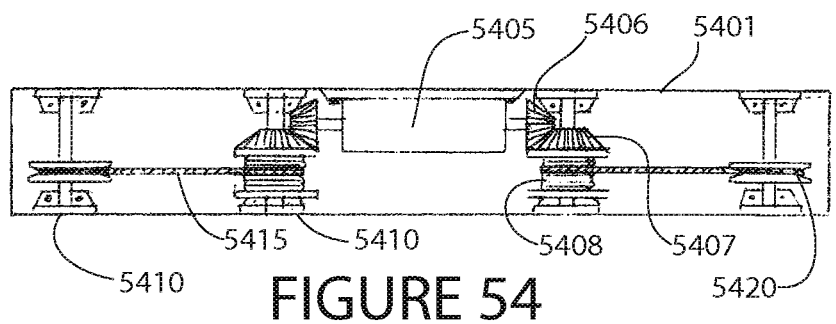
FIG. 54 provides a side view of a raceway fixed carriage and cable with two bevel gear driven winches according to principles of the invention.
Figure 55:
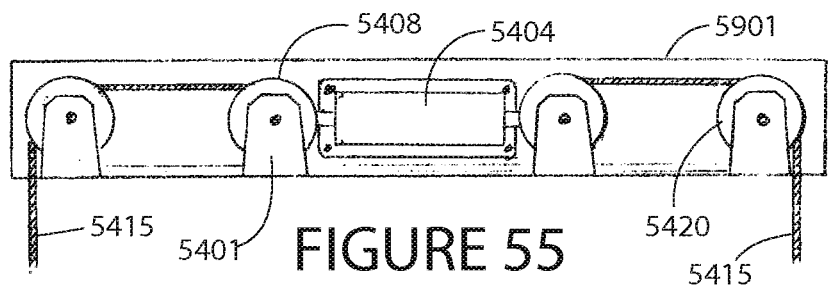
FIG. 55 provides a top view of a raceway fixed carriage and cable with two bevel gear driven winches according to principles of the invention.

Now referring to FIGS. 44 and 45, alternative exemplary couplings for adjoining any separate tubular components comprising the pole, collar and fixtures are conceptually shown. For example, the couplings may be used to join the pole to the collar, the pole to a sleeve on the base, the collar to a fixture, separate pole segments 4405, 4435 to each other, or any other tubular components requiring a joint. The coupling comprises opposed notched sleeves 4415, 4430 with a center rim 4420. Notches 4410, 4425 in the sleeves 4415, 4430 allow narrowing of the diameter of the sleeves 4415, 4430 to facilitate a good fit. The center rim 4420 may extend into the interior of the coupling and comprise a disk-like flange 4420 with apertures 4500 for passage of cables, electrical wires, and pipes. Optionally, the center rim 4420 may extend outwardly beyond the outer diameter of the adjoined sections to define a flange or shelf. Alternative designs are addressed above with reference to FIG. 35 for collars 3310 and splicing.

Referring now to FIGS. 46 through 49, various views of an embodiment with a stationary carriage 4601 for raising and lowering lighting fixtures are conceptually shown. The carriage 4601 includes cantilever arms 4602 containing pulleys 4606 over which lanyards 4620 are routed. Lighting fixtures 4610 are suspended from the lanyards 4620 and releasably locked into a catch-hold-release system, as illustrated in FIGS. 47 through 49. The arms 4602 may hold pulley sheaths 4606 which the lanyards 4620 pass through to the yoke 232 to the cable 230 and winches. As discussed herein, other means for raising and lowering may be utilized.

The lanyards are attached to the lighting fixture housing 4630 at the yoke 232. The lighting fixture housing includes an upper area dome 4732, a free catch-hook-release attachment ring 4835 that floats in an indented circular pocket 4836 around the inside lighting fixture casing 4631, electrical connectors 4770 as described above with reference to FIGS. 33 and 34, a light socket 4775 or other lighting technology attachment device and a light emitter device 4776 such as a lamp or LED. The electrical circuitry can emanate from an electrical box or wire cable in or through the cross arm 4602 inside the casing to the electrode connectors attached to the casing. When servicing, electrical power circuitry to the lighting fixture is cut off at the bottom and turned on again after the fixture is raised and locked into position.

The free moving catch-hook-release attachment ring 4835, as show in FIG. 49, is a low friction material (e.g., a polytetrafluoroethylene pad) to facilitate movement and adjust easily to receive and move a pin 4850 on the housing up into 4861, bouncing left at 4862, sliding down 4863 into a resting position at 4864, thereby releasing tension and pressure off the lanyard and locking the housing fixture into a fixed hanging position with electrical connectors completing the circuit. The fixture is lowered by raising it slightly bouncing left of the ridge 4865, sliding down the channel on 4866 and back out the entrance opening 4861. The system works much like a ball point pen retractor. Other systems can be used including, but not limited to, modifications of the catch hook and release system described above with reference to FIGS. 33 and 34, or a grapple mechanism.

Now referring to FIGS. 50 through 53, various views of another fixed carriage are provided. The fixed carriage comprises a raceway enclosure 5001 of configured for attachment to elevated or elongated structures, such as single or double poles, or to flat surface areas as a single faced unit, or may hang between poles or under bracing between poles. Objects, including, but not limited to, planters, bird or animal houses, nests or feeders, platforms, signage, security system components, cameras, communication system components, and other objects may be raised and lowered using the fixed carriage. By way of illustration, FIG. 52 shows two objects being raised and lowered simultaneously, while 53 shows one elongated object. Electric wiring and hardware for lighting as well as plumbing for irrigation may be included in the raceway. The raceway cabinet 5001 may be comprised of various materials including metals, and plastics, such as extruded tubing with access holes and panels. An electrical motor and mounting frame 5005 are attached to the raceway cabinet 5001. A support bearing 5030 provides strength and support for the shaft 5010 and winch spool 5020. A cable 5115 winds and unwinds from the spool 5020 to raising and lowering a plurality of objects. The motor can be activated by a remote control hand held unit at the base of the structure. A plurality of catch-hook-release mechanisms, such as any of those describe above, may also be used.

Figure 56:
FIG. 56 provides a side view of two objects that can be raised at the same time using the raceway fixed carriage according to principles of the invention.
Figure 57:
FIG. 57 provides a side view of a single elongated object that can be raised and lowered using the raceway fixed carriage according to principles of the invention.

Now referring to FIGS. 54 through 57, various views of another fixed carriage are provided. The fixed carriage comprises a raceway enclosure 5401 of configured for attachment to elevated or elongated structures, such as single or double poles, or to flat surface areas as a single faced unit, or may hang between poles or under bracing between poles. Objects, including, but not limited to, planters, bird or animal houses, nests or feeders, platforms, signage, security system components, cameras, communication system components, and other objects may be raised and lowered using the fixed carriage. By way of illustration, FIG. 56 shows two objects being raised and lowered at the same time, while FIG. 57 shows one elongated object. Electric wiring and hardware for lighting as well as plumbing for irrigation may be included in the raceway. The raceway cabinet 5401 may be comprised of various materials including metals, and plastics, such as extruded tubing with access holes and panels. An electrical motor and mounting frame 5005 are attached to the raceway cabinet 5001. A drive train including bevel gears 5406, 5407 transmits torque to a winch spool 5408 and pulley 5420. Axle supports 5410 can be stationary and/or bearing aided. A cable 5415 runs from the winch spool 5408 over the pulley 5420 and down to the various objects being raised and lowered. A plurality of gear systems can be use including a worm gear design. The motor can be activated by a remote control hand held unit at the base of the structure. Various catch-hook-release mechanisms may also be used, as discussed above.

Figures 58, 59:
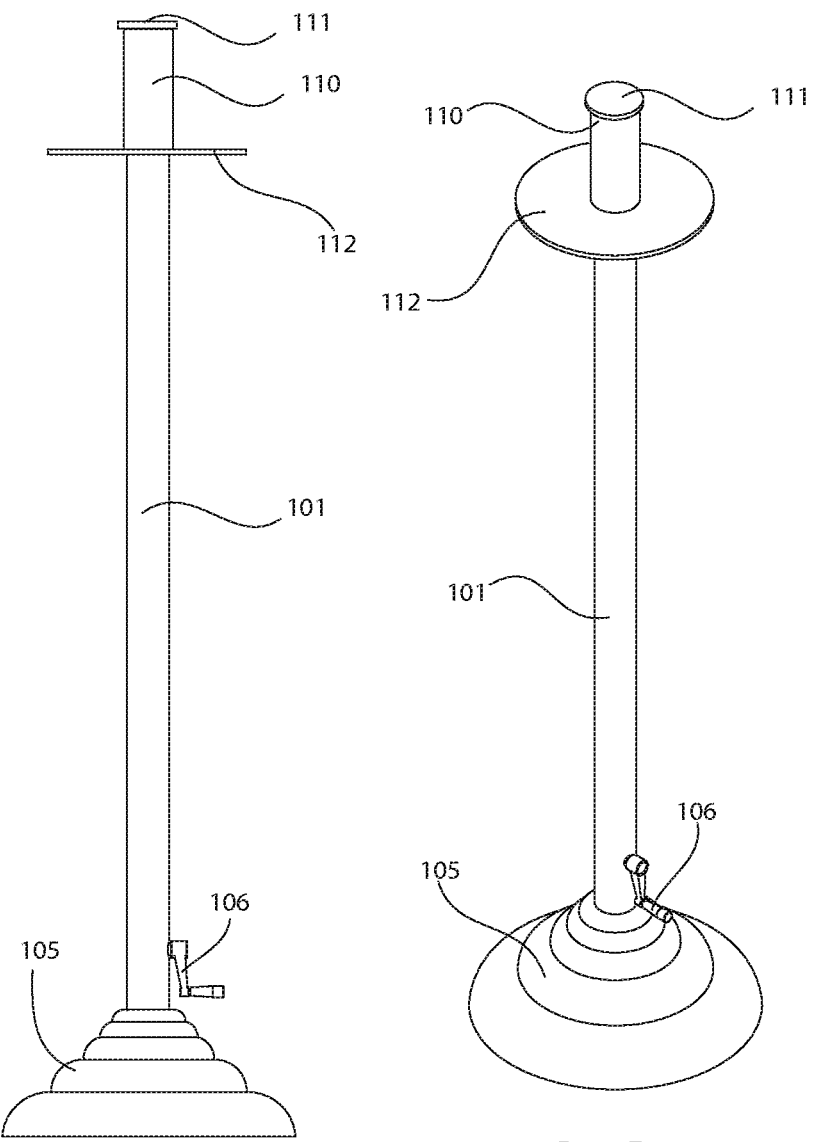
FIG. 58 provides a profile view of an exemplary pole structure with an ornamental base and a carriage with a multi-use support flange in a fully elevated position in accordance with principles of the invention.
FIG. 59 provides a perspective view of an exemplary pole structure with an ornamental base and a carriage with a multi-use support flange in a fully elevated position in accordance with principles of the invention.

Referring now to FIGS. 58 and 59, a pole structure 101 is attached to a decorative pole base 105. A movable carriage 110 surrounds a portion of the pole 101, near the top or distal end of the pole, i.e., in the raised position 110. The pole 101, base 105 or carriage 110 can be of any style, shape, size or height and made of any material. The pole 101 or base 105 may be attached or mounted to bases or direct imbedded into the ground. A crank 106 (which may be removable) is operably coupled to a winch (not shown in FIG. 58) contained in the pole 101 or base 105. The carriage includes a broad flange 112 suitable for supporting a wide range of objects (i.e., payloads), including but not limited to any and all of the objects discussed herein. A cap 111 at the top of the pole 101 shields the space between the carriage 110 and collar from debris, dust, water and other contaminants.

Figures 60, 61:
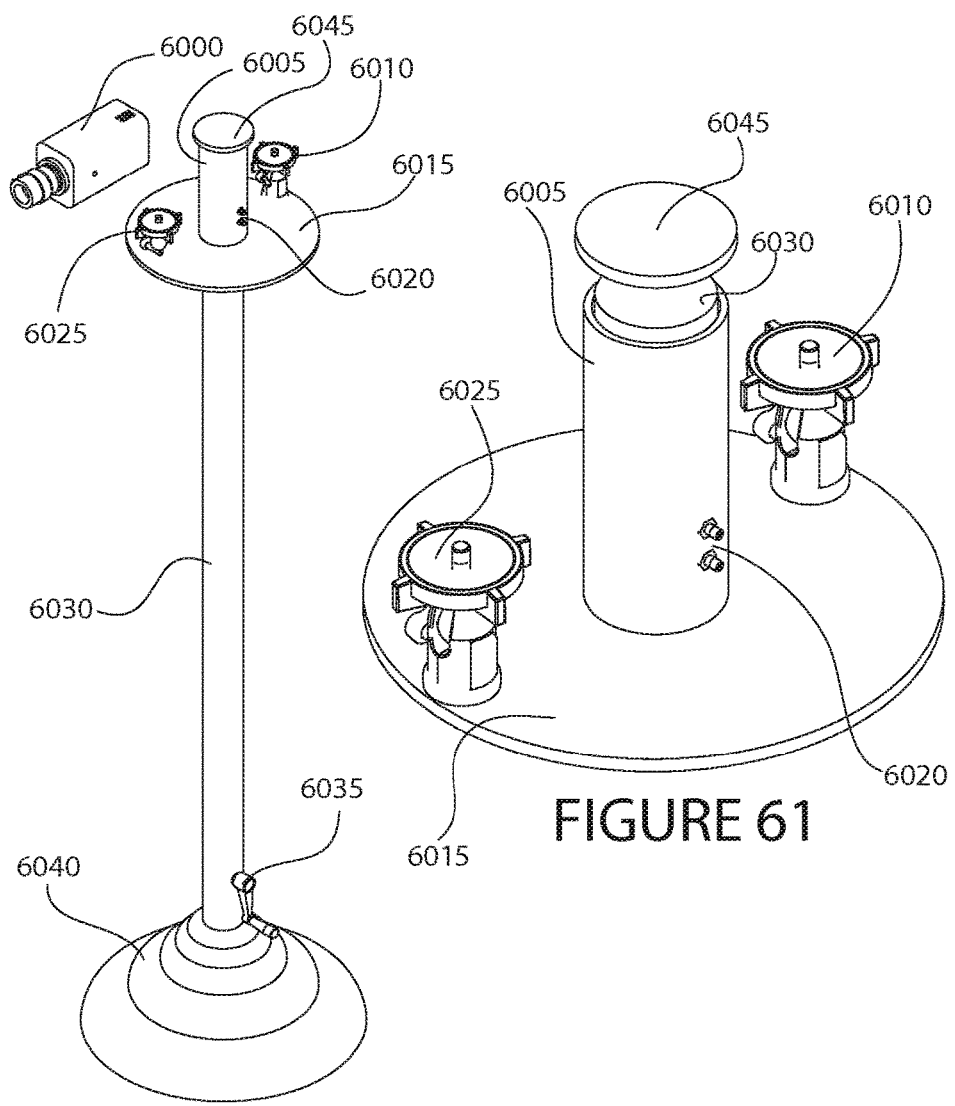
FIG. 60 provides a perspective view of an exemplary pole structure with an ornamental base and a carriage with a support flange, adjustable camera mounts and ports for data and power electrical connections, in a fully elevated position in accordance with principles of the invention.
FIG. 61 provides a perspective view of an exemplary carriage with a support flange, adjustable camera mounts and ports for data and power electrical connections, in a fully elevated position in accordance with principles of the invention.

Referring now to FIG. 60, a pole structure 6030 is attached to a decorative pole base 6040. A movable carriage 6005 surrounds a portion of the pole 6030, near the top or distal end of the pole, i.e., in the raised position. The pole 6030, base 6040 or carriage 6005 can be of any style, shape, size or height and made of any material. The pole 6030 or base 6040 may be attached or mounted to bases or direct imbedded into the ground. A crank 6035 (which may be removable) is operably coupled to a winch (not shown in FIG. 60) contained in the pole 6030 or base 6040. As shown in FIG. 61, the carriage 6005 includes a broad flange 6015 suitable for supporting a wide range of objects (i.e., payloads), including but not limited to security system components, such as one or more camera mounts 6010, 6025 to support one or more cameras 6000. Adjustable camera mounts 6010, 6025 may be attached to the top or underside of the flange 6015. Electrical interfaces 6020 may be provided on the carriage 6005. The electrical interfaces are electrically coupled to electrodes within the carriage 6005, which align with and engage electrodes on the collar when the carriage is in a raised and locked position. The electrodes in the collar are connected to wires, which transmit electrical power and/or digital or analog signals through the collar and pole 6030. The insulated portions of the electrode assemblies (as described above) may be covered with shielding material to reduce electromagnetic field interference. A cap 6045 at the top of the pole 6030 shields the space between the carriage 6005 and collar from debris, dust, water and other contaminants.

Figure 62:
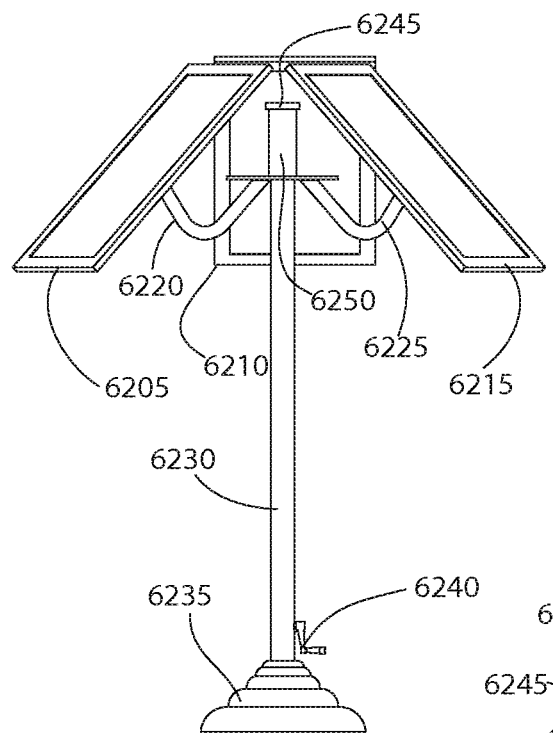
FIG. 62 provides a profile view of an exemplary pole structure with an ornamental base and a carriage with a support flange, and adjustably mounted photovoltaic panels, in a fully elevated position in accordance with principles of the invention.
Figure 63:
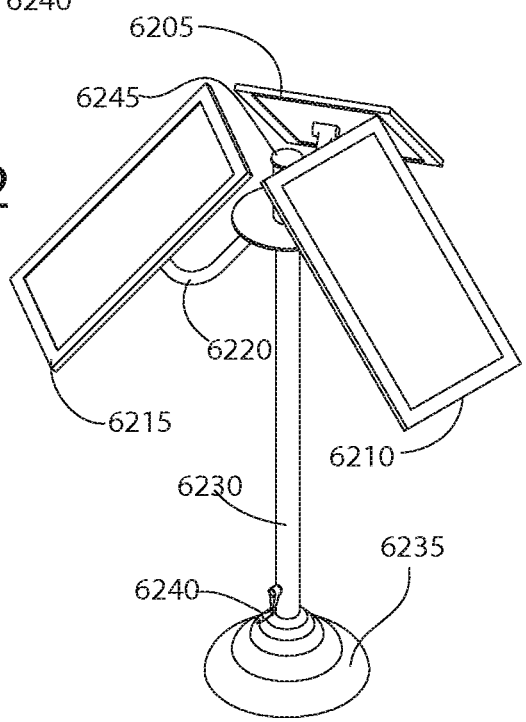
FIG. 63 provides a perspective view of an exemplary pole structure with an ornamental base and a carriage with a support flange, and adjustably mounted photovoltaic panels, in a fully elevated position in accordance with principles of the invention.

Referring now to FIGS. 62 and 63, profile and perspective views of an exemplary pole structure 6230 with an ornamental base 6235 and a carriage 6250 with support arms 6220, 6225, and adjustably mounted photovoltaic panels 6205, 6210, 6215, in a fully elevated position in accordance with principles of the invention are shown. The pole structure 6230 is attached to a decorative pole base 6235. The movable carriage 6250 surrounds a portion of the pole 6230, near the top or distal end of the pole, i.e., in the raised position. The pole 6230, base 6235 or carriage 66250 can be of any style, shape, size or height and made of any material. The pole 6230 or base 6235 may be attached or mounted to bases or direct imbedded into the ground. A crank 6240 (which may be removable) is operably coupled to a winch (not shown in FIG. 62) contained in the pole 6230 or base 6235. As The support arms are suitable for supporting a wide range of objects (i.e., payloads), including but not limited to electric power generation components, such as one or more photovoltaic panels 6205, 6210, 6215. The panels may be electrically coupled to electrodes within the carriage 6250, which align with and engage electrodes on the collar when the carriage is in a raised and locked position. The electrodes in the collar are connected to wires, which transmit electrical power and/or digital or analog signals through the collar and pole 6230. Generated electrical power may be supplied to any electrical load, including a utility power grid, one or more batteries and/or one or more electrically operated devices, which may be adjacent to attached to or remote from the pole 6230. The insulated portions of the electrode assemblies (as described above) may be covered with shielding material to reduce electromagnetic field interference. A cap 6245 at the top of the pole 6230 shields the space between the carriage 6250 and collar from debris, dust, water and other contaminants. This embodiment enables raising and lowering of electric power generation components, such as one or more photovoltaic panels 6205, 6210, and 6215 for adjustment, cleaning, repair, installation and replacement. Other electric generation equipment, such as a wind turbine, may also be mounted to the carriage or to the top of the pole 6230.

Figure 64:
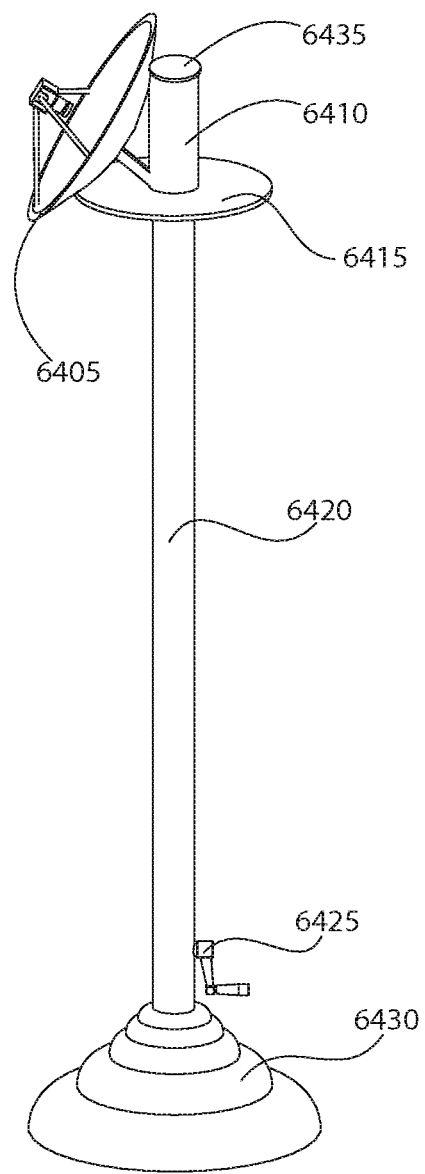
FIG. 64 provides a perspective view of an exemplary pole structure with an ornamental base and a carriage with a support flange, and adjustably communications equipment, in a fully elevated position in accordance with principles of the invention.

FIG. 64 provides a perspective view of an exemplary pole structure 6420 with an ornamental base 6430 and a carriage 6410 with a support flange 6415, and adjustably mounted communications equipment 6405 such as a satellite dish, in a fully elevated position in accordance with principles of the invention. A crank 6425 (which may be removable) is operably coupled to a winch (not shown in FIG. 64) contained in the pole 6420 or base 6430. The carriage 6005 includes a broad flange 6415 suitable for supporting a wide range of objects (i.e., payloads), including but not limited to communication system components, such as one or more receivers, transmitters, transceivers, transmitter-receivers, speakers, microphones, cameras, antennas, satellite dishes 6405 or other communications equipment that benefit from operation at an elevation. Electrical interfaces may be provided in the carriage 6410. The electrical interfaces are electrically coupled to electrodes within the carriage 6410, which align with and engage electrodes on the collar when the carriage is in a raised and locked position. The electrodes in the collar are connected to wires, which transmit electrical power and/or digital or analog signals through the collar and pole 6420. The insulated portions of the electrode assemblies (as described above) may be covered with shielding material to reduce electromagnetic field interference. A cap 6435 at the top of the pole 6420 shields the space between the carriage 6410 and collar from debris, dust, water and other contaminants.

Figure 65:
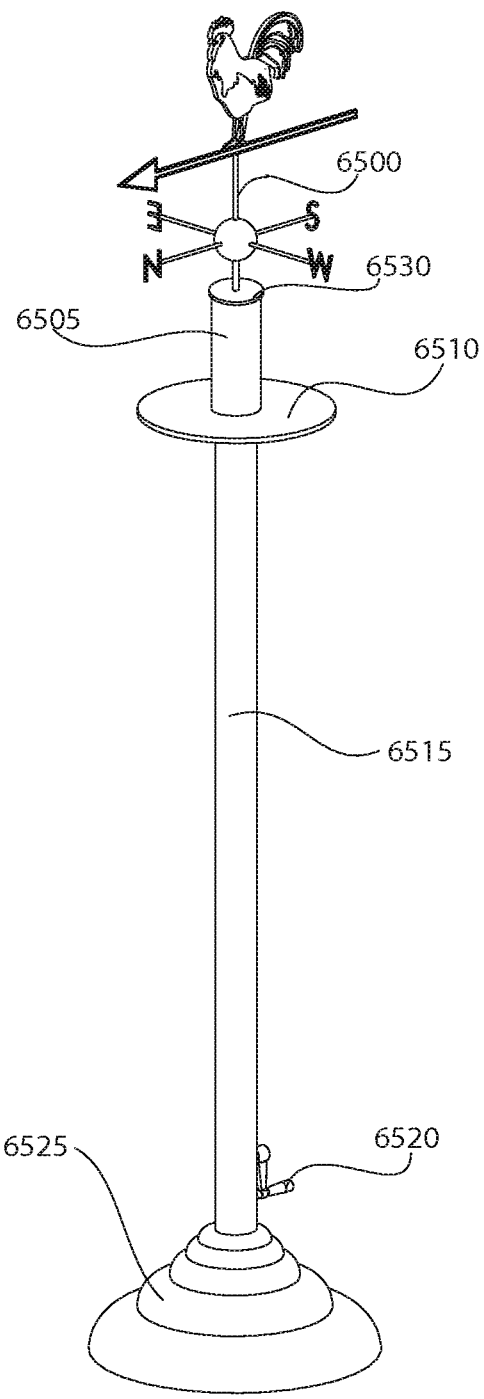
FIG. 65 provides a perspective view of an exemplary pole structure with an ornamental base and a carriage with a multi-use support flange in a fully elevated position, and a wind vane attached to a protective cap at the top of the pole structure, in accordance with principles of the invention.

FIG. 65 provides a perspective view of an exemplary pole structure with an ornamental base 6525 and a carriage 6505 with a multi-use support flange 6510 in a fully elevated position, and a wind vane 6500 attached to a protective cap 6530 at the top of the pole structure, in accordance with principles of the invention. A crank 6520 (which may be removable) is operably coupled to a winch (not shown in FIG. 65) contained in the pole 6515 or base 6525. The carriage 6505 includes a broad flange 6510 suitable for supporting a wide range of objects (i.e., payloads), including objects that benefit from elevation. Electrical interfaces may be provided in the carriage 6505. Plumbing interfaces for irrigation may be provided in the pole 6515. A cap 6530 at the top of the pole 6515 shields the space between the carriage 6505 and collar from debris, dust, water and other contaminants. The vane 6500 serves as a wind direction indicator, an ornamental feature and a hindrance to nesting animals.

Figures 66, 67:
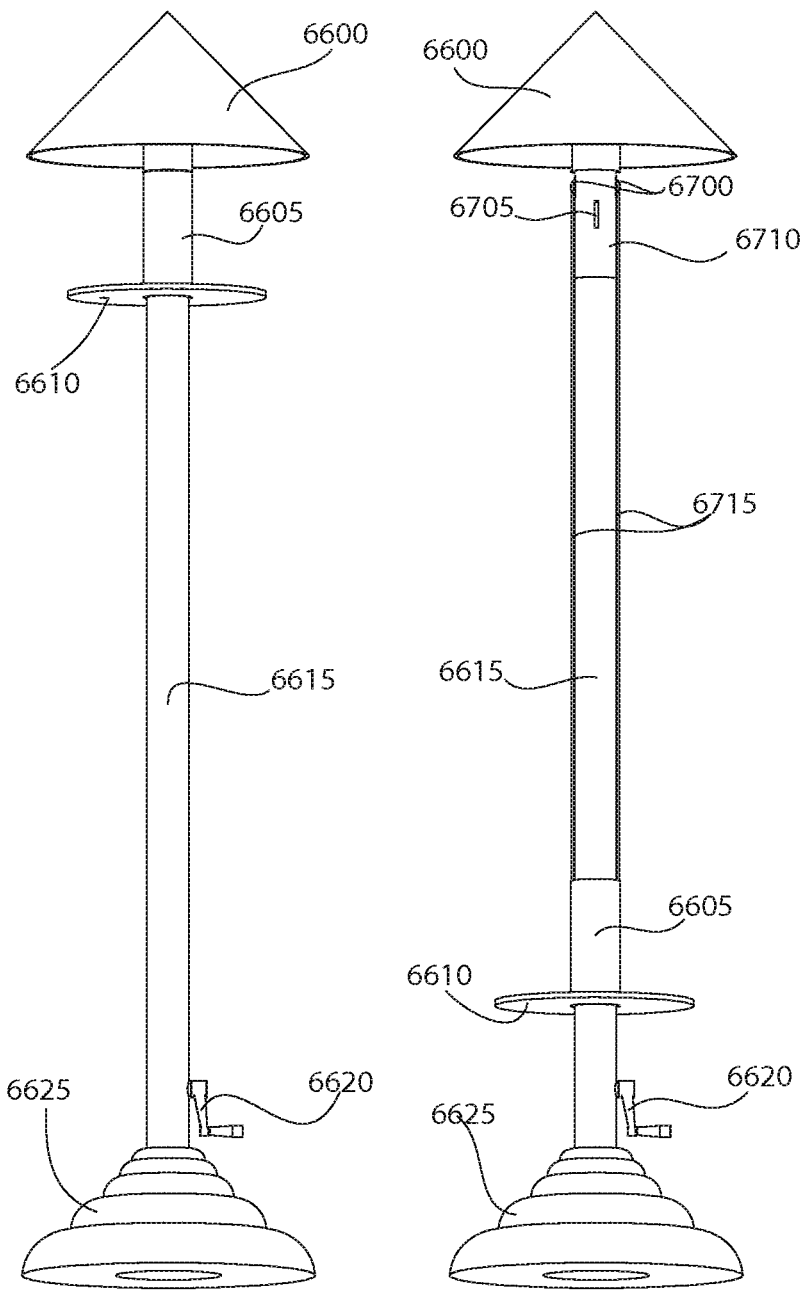
FIG. 66 provides a perspective view of an exemplary pole structure with an ornamental base and a carriage with a multi-use support flange in a fully elevated position, and a roof attached to the top of the pole structure, accordance with principles of the invention.
FIG. 67 provides a perspective view of an exemplary pole structure with an ornamental base and a carriage with a multi-use support flange in a lowered position, and a roof attached to the top of the pole structure, in accordance with principles of the invention.

FIGS. 66 and 67 provide a perspective view of an exemplary pole structure with an ornamental base 6625 and a carriage 6605 with a multi-use support flange 6610 in a fully elevated and lowered positions, and a roof 6600 attached to the top of the pole structure 6615, in accordance with principles of the invention. A crank 6620 (which may be removable) is operably coupled to a winch (not shown in FIG. 66) contained in the pole 6615 or base 6625. The carriage 6605 includes a broad flange 6610 suitable for supporting a wide range of objects (i.e., payloads), including objects that benefit from elevation. Electrical interfaces may be provided in the carriage 6605. Plumbing interfaces for irrigation may be provided in the pole 6615. The roof 6600 covers objects on the flange 6610 and shields the space between the carriage 6605 and collar from debris, dust, water and other contaminants. When the carriage 6605 is lowered, the lanyards 6615, corresponding pulleys 6700, locking slot 6705 and collar 6710 are revealed.

Figure 68:
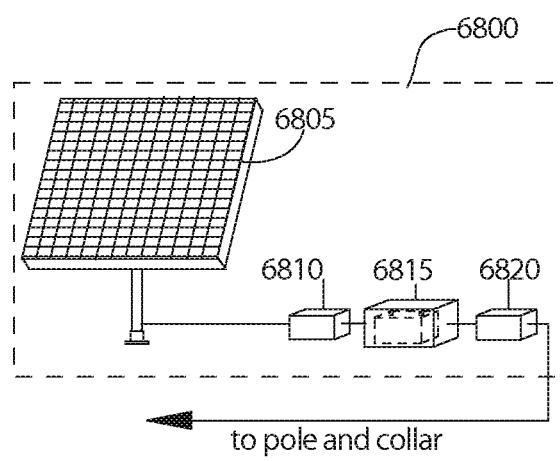
FIG. 68 provides a high level block diagram of an exemplary photovoltaic power supply system for supplying electrical power to a pole structure and collar, in accordance with principles of the invention.

FIG. 68 provides a high level block diagram of an exemplary photovoltaic power supply system for supplying electrical power to a pole structure and collar, in accordance with principles of the invention. In embodiments used outdoors and requiring electrical power, an optional solar power supply subsystem 6800 may be provided. As shown in FIG. 68, the solar power supply subsystem 6800 includes a photovoltaic panel (i.e., solar panel) 6805 comprising solar cells or solar photovoltaic arrays to convert light, such as sunlight, into electrical power. The solar cells may be packaged in photovoltaic modules, electrically connected in multiples as solar photovoltaic arrays, to convert sufficient energy from sunlight into electricity to meet operating requirements. As the solar cells require protection from the environment, they are packaged behind a protective transparent (e.g., glass) sheet. The solar panel 6805 preferably has an orientation and angle of inclination to take advantage of the sun's energy. In general, if the solar panel 6805 is stationary (i.e., non-tracking), in the Northern Hemisphere it should point toward true south (i.e., the orientation) and should be inclined at an angle equal to the area's latitude to absorb the maximum amount of energy year round. A different orientation and/or inclination may be used to maximize energy production in the morning or afternoon, and/or the summer or winter. The solar panel 6805 should not be shaded by nearby trees, buildings or other objects, no matter the time of day or the time of year. The solar panel 6805 may be mounted on, atop or adjacent to the planter system.

The solar panel 6805 produces direct current electricity from light, which is used to charge one or more batteries 6815. If a plurality of batteries is used, they may be connected in series and/or in parallel. A parallel combination of batteries has the same voltage as a single battery, but can supply a higher current (the sum of the currents from all the batteries). A series combination has the same current rating as a single battery but its voltage is the sum of the voltages of all the batteries.

The solar panel 6805 is preferably sized to recharge a battery 6815 within a determined amount of time, during prevailing average daytime lighting conditions. For example, one or more solar panels may be provided to deliver enough current (amps) per hour in average daylight conditions to supply enough amp hours to fully recharge the one or more batteries within a few hours or so, while the solar power supply subsystem 6800 supplies all necessary power to the planter system. The time required will depend upon the specifications and conditions of the battery or batteries, the solar panel or solar panels, and the lighting conditions. The size and/or number of batteries are preferably more than sufficient to supply power to meet operating requirements of the system throughout dusk and nighttime, and overcast days.

Although various kinds of batteries may be employed, preferably a deep-cycle battery 6815 is utilized. By way of example and not limitation, the deep-cycle battery 6815 may be a sealed or vented lead-acid battery, a nickel-cadmium battery, or some other type of deep cycle battery now known or hereafter developed. In a particular preferred embodiment the battery is an absorbed glass mat, or AGM battery, with electrolyte (acid) contained in a fine fiber Boron-Silicate glass mat that prevents spillage, even if broken, and withstands shock and vibration. Advantageously, an AGM battery also resists freezing damage, recombines oxygen and hydrogen inside the battery while charging to prevent the loss of water through electrolysis, maintains low internal resistance which avoids heating of the battery even under heavy charge and discharge currents, offer low self-discharge of approximately 1% to 68% per month.

Another component of the solar power supply subsystem 6800, a charge controller 6810, electrically coupled between the solar panel 6805 and the battery 6815, manages the electrical current supplied from the solar panel 6805 to the battery 6815 to assure maximum useful life. The charge controller 6810 does so by fully charging the battery 6815 without permitting overcharge while preventing reverse current flow at night. Circuitry in the controller 6810 reads the voltage of the battery 6815 to determine the state of charge. Based upon the detected voltage, the controller 6810 regulates the current supplied from the solar panel to the battery 6815, preferably using either Pulse Width Modulation (PWM) or Maximum Power Point Tracking (MPPT). Illustratively, a PWM controller 6810 maintains the battery 6815 at its maximum state of charge and minimizes sulfation build-up by pulsing the voltage at a high frequency. A PWM controller 6810 will first hold the voltage to a safe maximum for the battery 6815 to reach full charge. Then it will drop the voltage lower to sustain a "finish" or "trickle" charge. An MPPT controller will adjust the voltage and current supplied from the solar panel 6805 to the battery 6815, to maximize the recharging current supplied to the battery 6815. The controller also provides reverse current leakage protection by disconnecting the solar panel or using a blocking diode to prevent current loss into the solar modules at night. The controller also provides low-voltage load disconnect (LVD) to reduce damage to the battery 6815 by avoiding deep discharge. When overdischarge is detected (e.g., when a 12 volt battery 6815 drops below 11 volts), an LVD circuit will disconnect loads and reconnect the loads only when the battery 6815 voltage has substantially recovered due to recharging. A typical LVD reset point is 13 volts. In addition, the controller provides overcurrent protection with fuses, circuit breakers. Because the battery 6815 is used outdoors, the controller also provides temperature compensation, adjusting the charging voltage to the temperature. If the battery 6815 temperature differs more than a determined threshold, such as 5° C., from a reference temperature, such as 20° C., the end-of-charge voltage may corrected by a correction factor, which has the effect of increasing the end-of-charge voltage as temperature decreases.

The solar panel 6805, regardless of its size or sophistication, generates only direct current (DC). If the system requires only DC, an inverter 6820 may be unnecessary. However, an inverter is required if the image capturing system requires an alternating current (AC) load. The inverter 6820 converts DC output of the battery 6815 to standard AC power similar to that supplied by utilities. In a preferred embodiment, the inverter, if required, is a solid state electronic device that uses pulse width modulation and a low pass filter at the inverter output to produce a sine wave, quasi-sine wave or modified sine wave output waveform.

Figure 69:
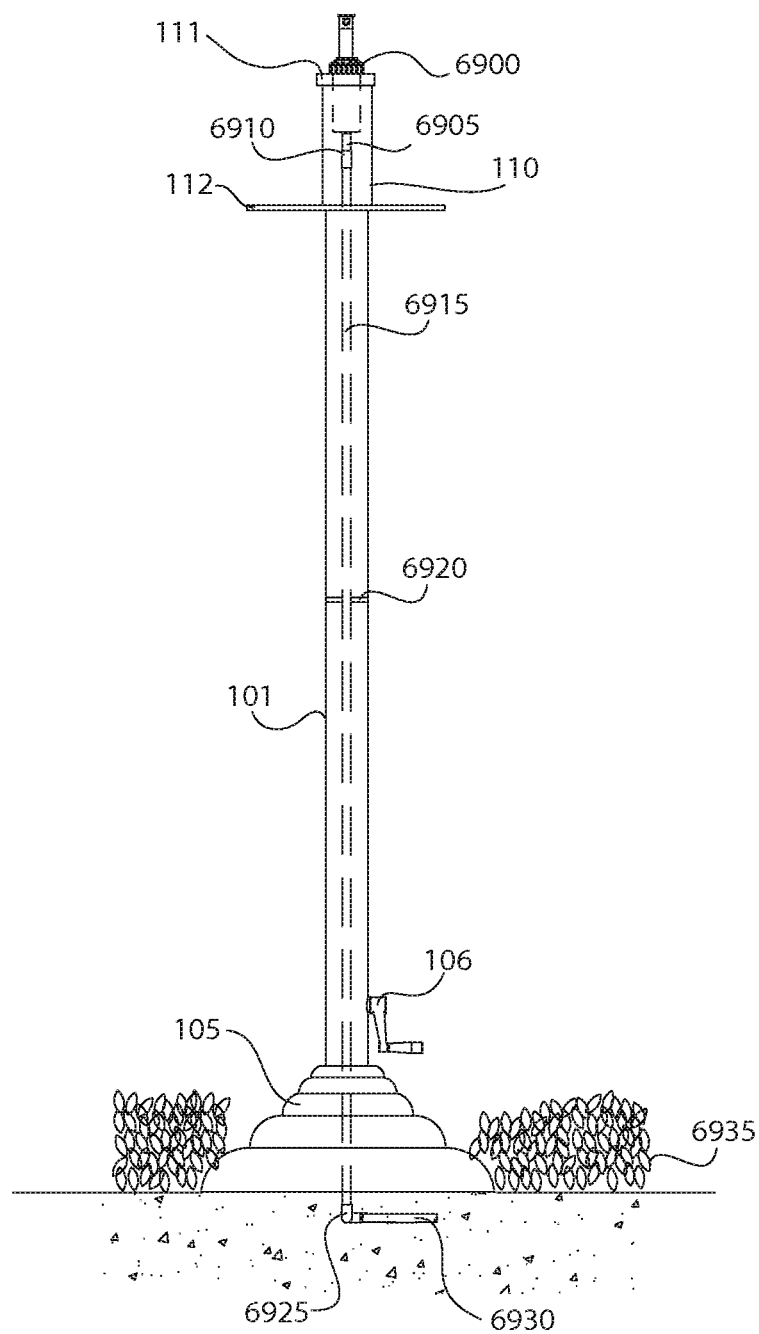
FIG. 69 provides a profile view of an exemplary pole structure with an ornamental base and a carriage with a support flange, and an irrigation subsystem including a rotor sprinkler in a fully elevated position in accordance with principles of the invention.
Figure 70:
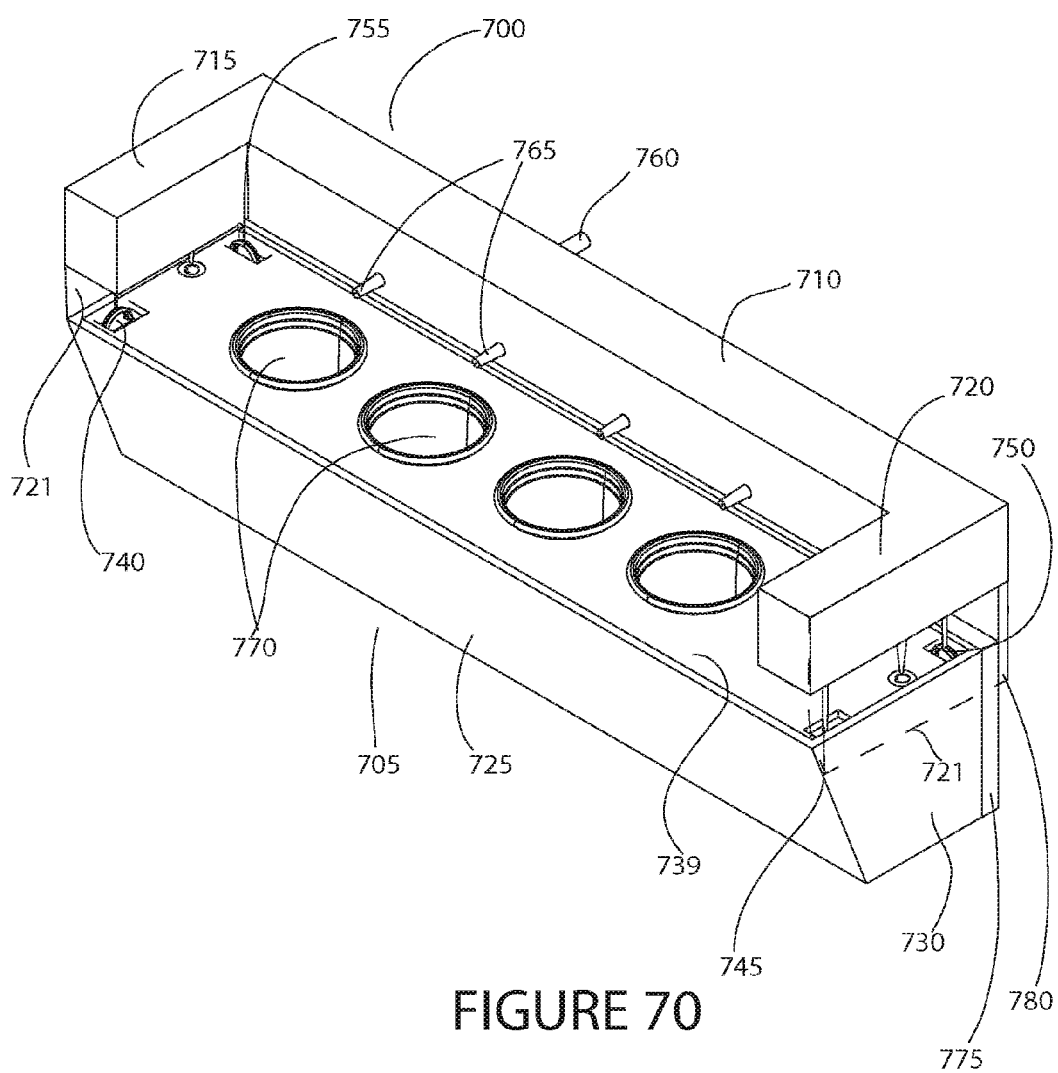
FIG. 70 provides a perspective view of an exemplary raceway planter system with a planter assembly in a raised position according to principles of the invention.
Figure 71:
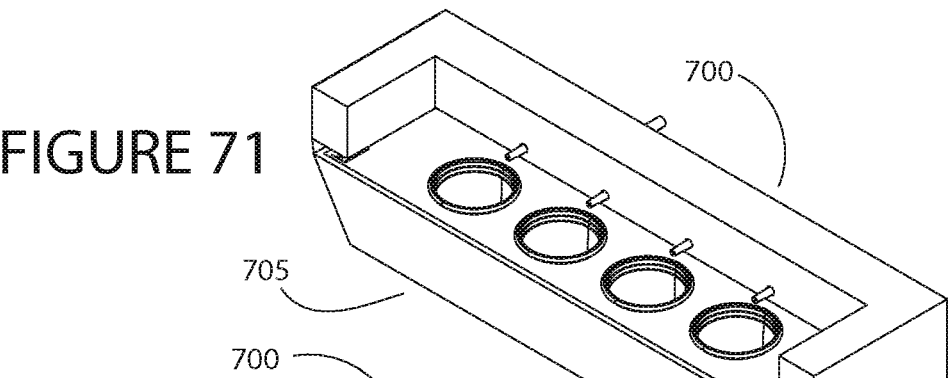
FIG. 71 provides a perspective view of an exemplary raceway planter system with a planter assembly in a locked position according to principles of the invention.
Figure 72:
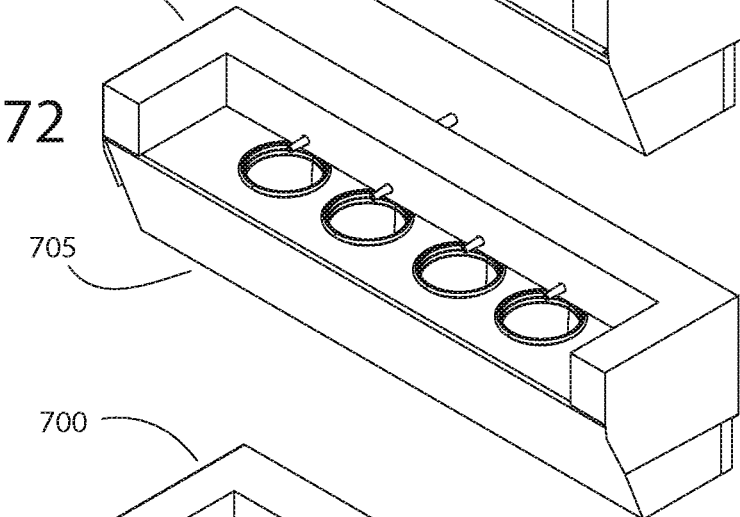
FIG. 72 provides a perspective view of an exemplary raceway planter system with a planter assembly in a releasing position according to principles of the invention.
Figure 73:
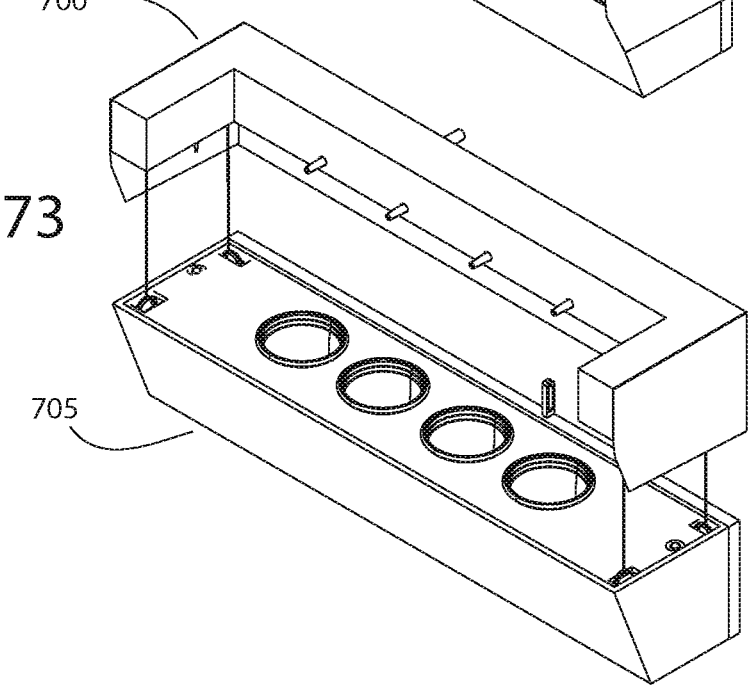
FIG. 73 provides a profile view of an exemplary raceway planter system with a planter assembly in a lowered position according to principles of the invention.

Any of the embodiments described above, particularly those that include planters, may include an irrigation subsystem with water supplied from any conventional irrigation plumbing system. Various embodiments of irrigation subsystems are described in U.S. Nonprovisional application Ser. No. 11/868,534, filed Oct. 8, 2007, and U.S. Nonprovisional application Ser. No. 12/026,553 filed Feb. 2, 2008, which are incorporated herein by this reference. As one example, with reference to FIG. 69, the pole 101 and collar 110 accommodate various irrigation components, including, but not limited to, plumbing lines, valves, controllers, joints, fittings, couplings, adapters, elbows, manifolds, microirrigation mufflers, emitters, bubblers, drippers, sprayers and sprinkler heads. By way of illustration and not limitation, a sprinkler such as a rotor sprinkler 6900 may be fluidly connected at the top of the pole 101 or collar 110 to an irrigation supply line 6915. The connection may include a coupling 6910 with a male threaded nipple 6905 configured for threaded engagement by the rotor sprinkler 6900. The sprinkler 6900 may be configured to water only one or more planter containers (not shown) on the carriage 112, only surrounding terrain 6935, or both planter containers on the carriage 112 and surrounding terrain 6935. One or more supports 6920 may be provided within the pole 101 to guide and secure the irrigation supply line 6915. At or below the base 105, the irrigation supply line 6915 connects to a coupling such as a tee or elbow 6925, which connects to a water supply line 6930.

Now referring to FIGS. 70 through 84, various views of another embodiment of a planter assembly according to principles of the invention are shown. This embodiment is referred to as a raceway assembly 700. The raceway assembly 700 includes an upper housing 710. Despite its unique shape and configuration, the housing 710 of the raceway assembly 700 replaces the collar assembly 250 of the embodiments described above. The housing 710 is a hollow container. A rear panel 780 is provided for mounting the housing 710 to a vertical support and/or providing an access panel to service interior components of the housing 710. Like the collar assembly 250, the housing 710 contains pulleys, guides, locking mechanisms and irrigation components for the planter assembly and defines the uppermost position of the planter assembly 705. Unlike the collar assembly 250, however, the housing 710 of the raceway assembly 700 also contains a winch or other raising and lowering means for raising and lowering the planter container assembly 705. In this embodiment, the vertical support may comprise a wall, or any other supportive structure to which the housing 710 of the raceway assembly 700 may be mounted at a height. The exemplary housing 710 is U-shaped, including an elongated base and a pair of parallel arms 715 and 720 extending therefrom. The outer sides of the arms may include dust covers 721 that extend downwardly to limit the intrusion of dirt and debris in the space between the housing and the planter assembly, when the planter assembly is raised.

Among the components contained in the exemplary housing 710 are irrigation components. The components include an assembly having outlet nozzles 765 and an inlet 760. The inlet 760 and outlet nozzles 765 may be fluidly coupled by a manifold 810 as shown in FIG. 84. Other components, such as timers, backflow prevention devices, control valves, filters, pressure regulators, pipes and tubing, emitters, sprayers and misters, for example, may be operably coupled to the irrigation assembly.

The housing 710 is configured to be supported by a vertical support, such as one or more poles, pedestals, columns, walls or the like. The vertical support may be fluted or non-fluted, textured or non-textured, solid or hollow, a standalone structure or an integral part of another structure such as a building, billboard or sign. The particular configuration of the vertical support is not important so long as it is suitable for supporting the housing 710 of the raceway assembly 700 at an elevation, to and from which the planter container assembly 705 may be raised and lowered.

The exemplary planter container assembly 705 is a window-box style planter container 705. The invention is not limited to a window-box style planter container 705. Rather, other shapes and configurations may be utilized and are intended to come within the scope of the invention. By way of example and not limitation, the ends of the planter container 705 can be aesthetically rounded rather than square as shown in the FIGS. 70-76. The exemplary planter container assembly 705 includes a front panel 725, side panels 730, a bottom panel and a rear panel 775. In the exemplary planter container assembly 705, at least one panel (e.g., the back panel 775) is removable to reveal a utility compartment that contains suspension and locking components. The planter container assembly 705 can be raised to, locked to, unlocked from and lowered from the housing 710 of the raceway assembly 700. A drainage port 727 and cleanout port 728 may be provided in the bottom of the planter assembly 705.

The planter container assembly 705 is raised and lowered using tethers 745, 750, (e.g., cables, rope or the like) near each corner of the planter assembly 705. One end of each tether connects to an attachment mechanism, such as a Dee-ring 740, 755, as also shown in FIG. 77. Each Dee-ring 740 includes a mounting base 741 and attachment ring 742. The opposite end of each tether is coupled directly or indirectly to a lifting mechanism such as a winch, contained in the housing 710 of the raceway assembly 700 and operated by remote control, or a manual switch near the bottom of the vertical structure.

The exemplary planter container assembly 705 includes a top lid 739 with apertures for accommodating planter pots 770 and exposing accessories such as Dee-rings 740, 755 and guides. The lid 739 may be removable or permanently attached.

Removable planter pots 770, such as the pot illustrated in FIG. 78, are inserted into apertures of the lid 739. Each removable pot 770 comprises a bottom 760 and walls 761 that define a compartment 763 for planting. Drainage ports 764 are provided at or near the bottom 760 of the pot 770. A lip or rim 762 is provided at the top of the pot. The rim 762 engages and covers the edge of the aperture in the lid 739.

This embodiment with removable pots 770 offers many unique advantages. It facilitates removal and replacement of potted plants held by the planter. This embodiment also reduces water consumption by using less soil or growing media. Additionally, this embodiment facilitates maintaining the temperature of potted plants, as the compartment beneath the lid 739 may be filled with an insulating material in the spaces between the plant pots 770. A variety of growing media can be used in each of the pots to match the needs of a plurality of plant species in each planter unit 705. Additionally, imitation plants can be firmly planted and periodically changed.

A narrow or wide roller or wheel assembly 785, 786, as shown in FIG. 80, is provided to facilitate linear vertical motion of the planter container assembly 705 in close proximity to a vertical support. The wheel assembly 785, 786 includes a mounting pad 787 and at least one rotating wheel. The mounting pad 787 attaches to the planter container assembly 705, such as to the rear panel 775 and/or to one or both side panels 730. The wheel assembly 785, 786 maintains a minimum space between the vertical support and the panel(s) to which the wheels is (are) mounted. The roller may be as wide as necessary with a variety of soft exteriors to traverse rougher vertical exteriors, such as stone or brick 786

In addition to or in lieu of the wheel assembly 785, a sliding pad may be used to maintain spacing and facilitate vertical movement. The pads may be comprised of a durable material that exhibits a low frictional coefficient in relation to the contacted vertical support material. By way of example, and not limitation, replaceable acrylonitrile butadiene styrene (ABS), polytetrafluoroethylene (PTFE) or polyvinyl chloride (PVC) pads may be used with a steel, aluminum, wood or concrete vertical support. Alternatively, the tethers may serve as guides.

A registration guide assembly 790 includes a male pin 791 and a female receptacle 793. The female receptacle 793 may be attached to either the planter container assembly 705 or the housing 710 of the raceway assembly 700. The male pin 791 may be attached opposite the female receptacle 793 on either the planter container assembly 705 or the housing 710 of the raceway assembly 700, and in corresponding alignment with the female receptacle 793. When the planter container assembly 705 is raised to the housing 710 of the raceway assembly 700, a conical male extension 792 of the male pin 791 enters into a corresponding cavity 794 in the female receptacle 793. Thus, the female receptacle 793 engages the male pin 791. Upon engagement, the mating male pin 791 and female receptacle 793 resist rattling and misalignment. Mating engagement helps ensure proper alignment for locking and unlocking Additionally, mating engagement helps resisting twisting forces from wind.

Figure 74:
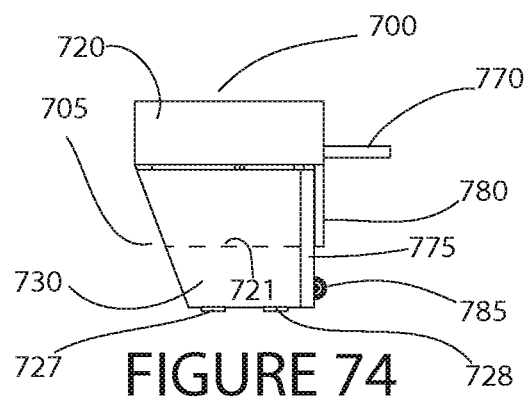
FIG. 74 provides a profile view of an exemplary raceway planter system with a planter assembly in a releasing position according to principles of the invention.
Figure 75:
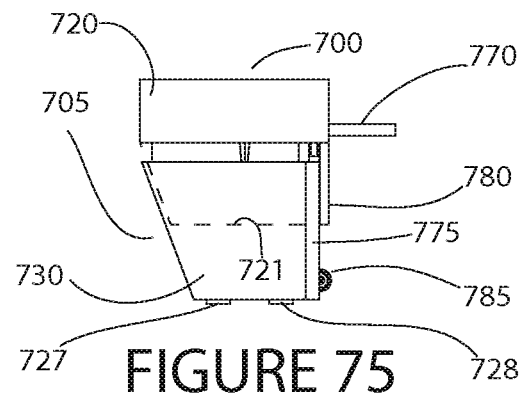
FIG. 75 provides a profile view of an exemplary raceway planter system with a planter assembly in a locked position according to principles of the invention.
Figure 76:
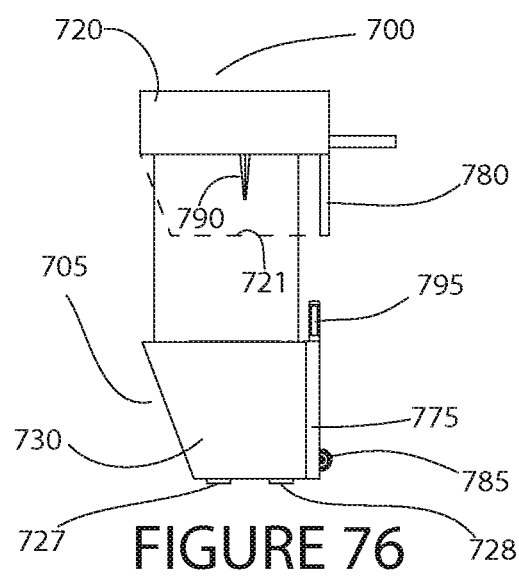
FIG. 76 provides a profile view of an exemplary raceway planter system with a planter assembly in a lowered position according to principles of the invention.

Referring now to FIGS. 70 through 76, perspective and profile views of the planter container assembly 705 and the housing 710 of the raceway assembly 700 in various positions are provided. In FIG. 74, the planter container assembly 705 is raised to an unlocking position relative to the housing 710 of the raceway assembly 700. In FIG. 75, the planter container assembly 705 is illustrated in a locked position relative to the housing 710 of the raceway assembly 700. In FIG. 76, the planter container assembly 705 is in an unlocked lowered position relative to the housing 710 of the raceway assembly 700. The planter container assembly 705 may be raised from the unlocked lowered position to the locked position, and then raised further to the unlocking position, and then lowered. Drainage apertures 727 and clean out plugs 728 are located in the bottom of the planter container assembly 705.

Figure 81:
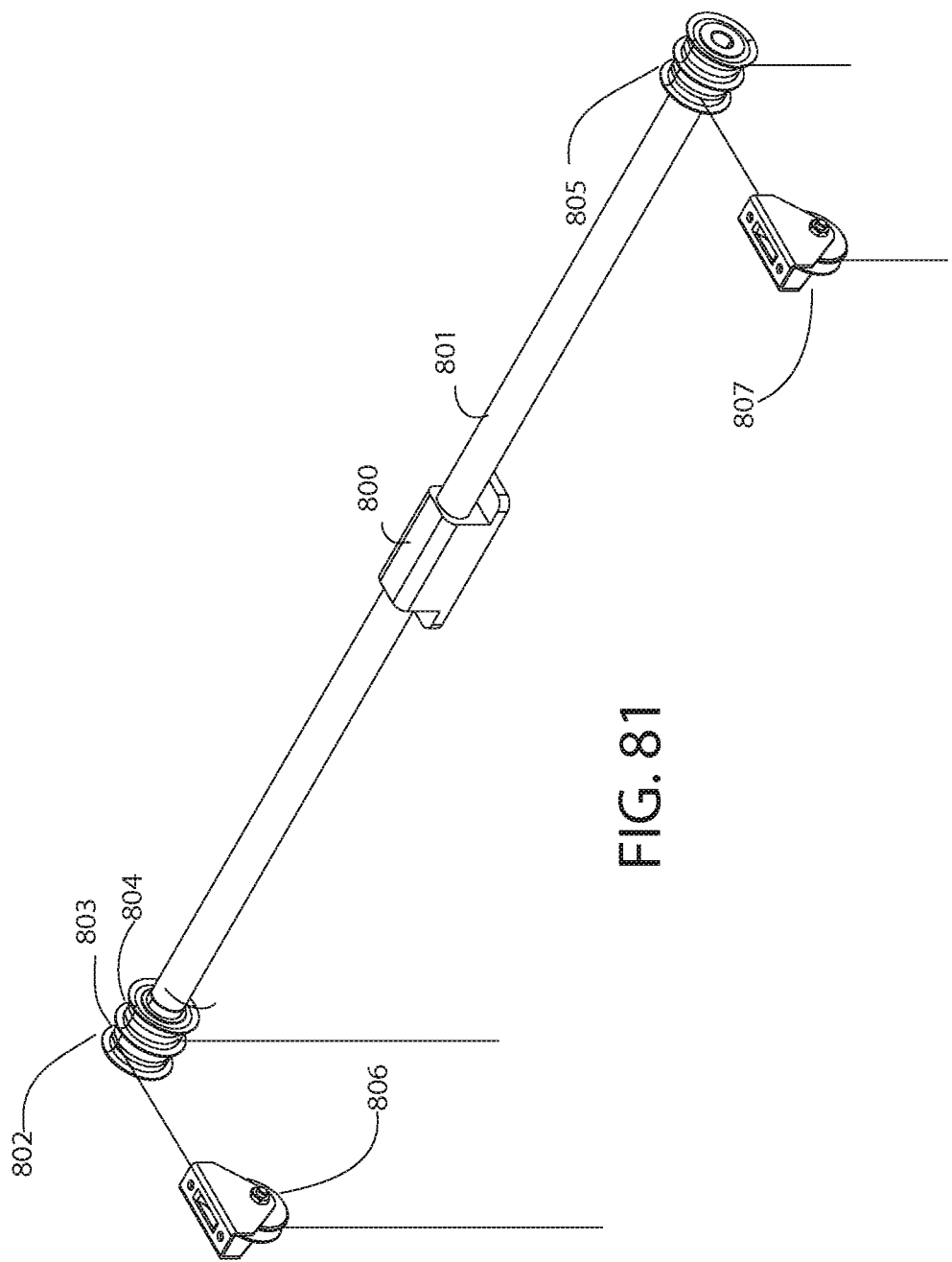
FIG. 81 provides a perspective view of an exemplary pulley and drivetrain assembly for a raceway planter system according to principles of the invention.

Referring now to FIG. 81, a winch and pulley assembly for the housing 710 of the raceway assembly 700 is shown. A winch 800 rotates drive shaft 801. Rotation of the drive shaft 801 rotates right and left dual spool assemblies 802, 805. Each dual spool assembly 802, 805 includes a pair of spools 803, 804, one spool 804 for the rear and the other spool 803 for the front. A tether (e.g., cable, rope, chain or other means of suspension suitable for winding) is wound around each spool. The tether from each front spool, extends forwardly to a corresponding pulley 806, 807. Therefore, rotation of the winch 800, winds or unwinds all tethers simultaneously. As all spools have the same diameter, the unwound portions of the several tethers are extended or refracted evenly.

Referring now to FIGS. 82 and 83, a back panel 775 of the planter container assembly 705 and alternative locking mechanisms are illustrated. The back panel 775 is removable to reveal a utility compartment that contains suspension and locking components. A locking mechanism, on the right side, comprises a solenoid 808 with a movable locking pin 809 and a corresponding female receptacle 795 for the locking pin 809. The female receptacle 795 is attached to or near the top edge of the back panel 775 of the planter container assembly 705. The solenoid 808 is attached to the housing 710 of the raceway assembly 700. When the planter container assembly 705 is raised to the housing 710 of the raceway assembly 700, the locking pin 809 of the solenoid 808 is extended through an elongated slot in the female receptacle 795. The locking pin 809 may be extended electronically, such as by actuating a switch or other sensor that defines the locking position. Alternatively, a locking pin may be mechanically actuated such as by pulling a cord or moving a slider. In an electronic embodiment, a switch or sensor may detect when the planter container assembly 705 is raised to the locking position relative to the housing 710 of the raceway assembly 700. At that point, the switch or sensor may generate a signal that activates the solenoid 808. Upon activation, the locking pin 809 of the solenoid 808 attached to the housing 710 of the raceway assembly 700 is extended through the slot in the female receptacle 795 attached to the back panel 775 of the planter container assembly 705. An unlock switch may retract the locking pin 809 of the solenoid 808, releasing it from the elongated slot in the female receptacle 795.

The left side of the embodiment in FIG. 82 illustrates an alternative of the solenoid and receptacle locking assembly. Here, the female receptacle 795 is attached to or near the housing 710 of the raceway assembly 700. The solenoid 808 is attached to or near the top edge of the back panel 775 of the planter container assembly 705.

As yet another alternative locking mechanism, a mechanical catch hook assembly 4300 may be associated with (e.g., attached to) either the housing 710 of the raceway assembly 700 or the back panel 775 of the planter container assembly 705, with the hook guide assembly 4200 being associated with the other of the two. Any other locking mechanisms, including those described herein, may be utilized in a similar manner without departing from the scope of the invention.

Still referring to FIGS. 82 and 83, the back panel 775 includes guides. For example, in the embodiment shown in FIG. 83, rollers 785 or 786 protrude through apertures in the back panel. Alternatively, or in addition to the rollers 785 or 786, brushes 784 or other spacing and sliding devices are attached to the back panel 775. The brushes 784 or similar structures maintain a space between the planter container assembly 705 and the vertical support. The brushes 784 can be a continuous horizontal band at the bottom as well.

Referring now to FIGS. 85 through 92, various alternative mechanical locking mechanisms are shown. These mechanisms illustrate the types of locking mechanisms that may be used, in addition to or in lieu of the catch hook locking mechanism described above. In each case, the mechanical locking mechanism responds to vertical linear motion of the carriage assembly 400 relative to the collar assembly 250, pole, or vertical structure, or of the planter container assembly 705 relative to the housing 710 of the raceway assembly 700. Each mechanical locking mechanism includes one or more movable components that controllably engages and disengages a stationary component. The movable component may be mounted on either a carriage assembly 112 or 400, or a collar assembly 250, or a pole, or a vertical structure, or a planter container assembly 705 or housing 710 of a raceway assembly 700. The stationary component may be attached to the other of the carriage assembly 112 or a collar assembly 250, or pole, or a vertical structure or the planter container assembly 705 or housing 710 of a raceway assembly 700. Movement of the a carriage assembly 112 relative to the collar assembly 250, or pole, or vertical structure, or the planter container assembly 705 relative to the housing 710 of a raceway assembly 700, provides the motion needed to move the movable component into a locked and then into an unlocked position as the moveable component engages the stationary component. These locking systems may also be implemented to prevent contact with the normally exposed part of vertical structure thereby reducing visible marking and scratching.

Using any of these locking mechanisms, or the catch hook locking mechanism described above, provides several advantages. First and foremost, the locking mechanism provides a dedicated lock to support a potentially heavy planter. If a winch is used as a raising or lowering means, the lock on the winch may provide a backup lock. Second, the locking mechanism relieves the raising and lifting means and lanyards and tethers and related hardware of prolonged stresses and strains which may otherwise deform the components and/or shorten their useful life. For example, metal cables that are stressed for prolonged periods of time tend to resist coiling on a spool. Third, the mechanical locking mechanism operates automatically, without the need of manipulation from a user. Vertical movement of the movable component relative to and in engagement with the stationary component is all that is needed to achieve locking and unlocking Fourth, it provides safety and security in high winds and protects against vandalism.

Figure 85:
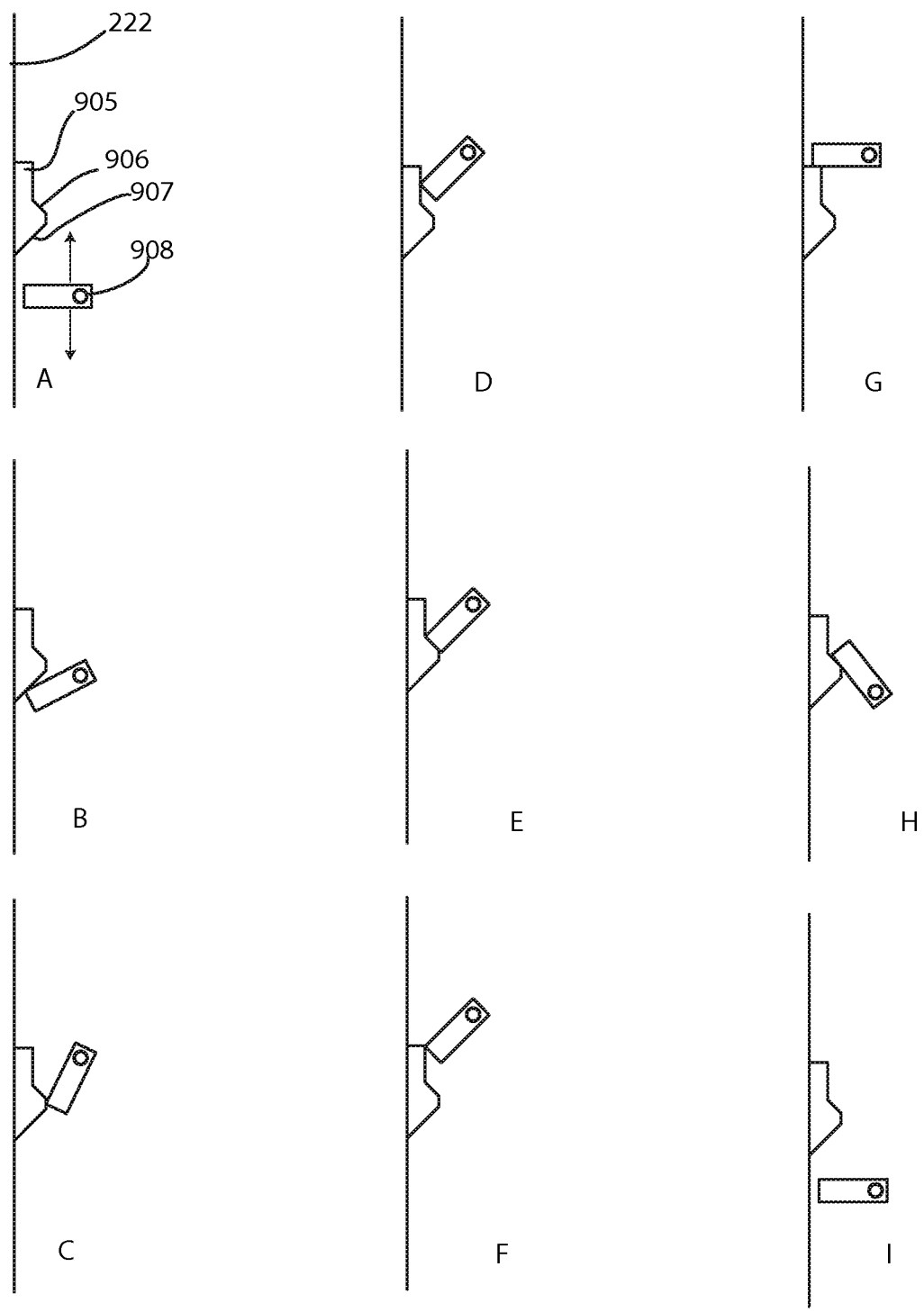
FIG. 85 provides a schematic flowchart of a sequence of steps for an exemplary locking mechanism according to principles of the invention.

With reference to FIG. 85, an embodiment with a stationary bracket 907 having a slanted locking surface 906 and a topmost unlocking corner 905 is shown. The bracket is mounted to a structure, such as (but not limited to) a collar assembly 250. A pivoting support pin 908 is mounted to the carriage assembly 112 in alignment with the bracket 907 so that the support pin 908 engages the bracket 907 when the carriage assembly 112 is raised to a locking position. The pivoting support pin 908 is shown moving into a locking position during upward movement relative to the bracket in steps A through E. In step E, the mechanism is locked, thereby supporting the planter assembly. Further upward movement, as shown in steps F through G pivots the support pin 908 into an unlocked position, which allows downward movement as in steps H and I. The pin 908 would include a spring wire to keep it perpendicular at the A and I sequence and to provide the tension necessary if moved up or down to move into each stage and position. The system would also work in reverse positions if the pin 908 were located on the collar or other stationary vertical structure and the stationary bracket were flipped over in the reverse top and bottom position.

Figure 86:
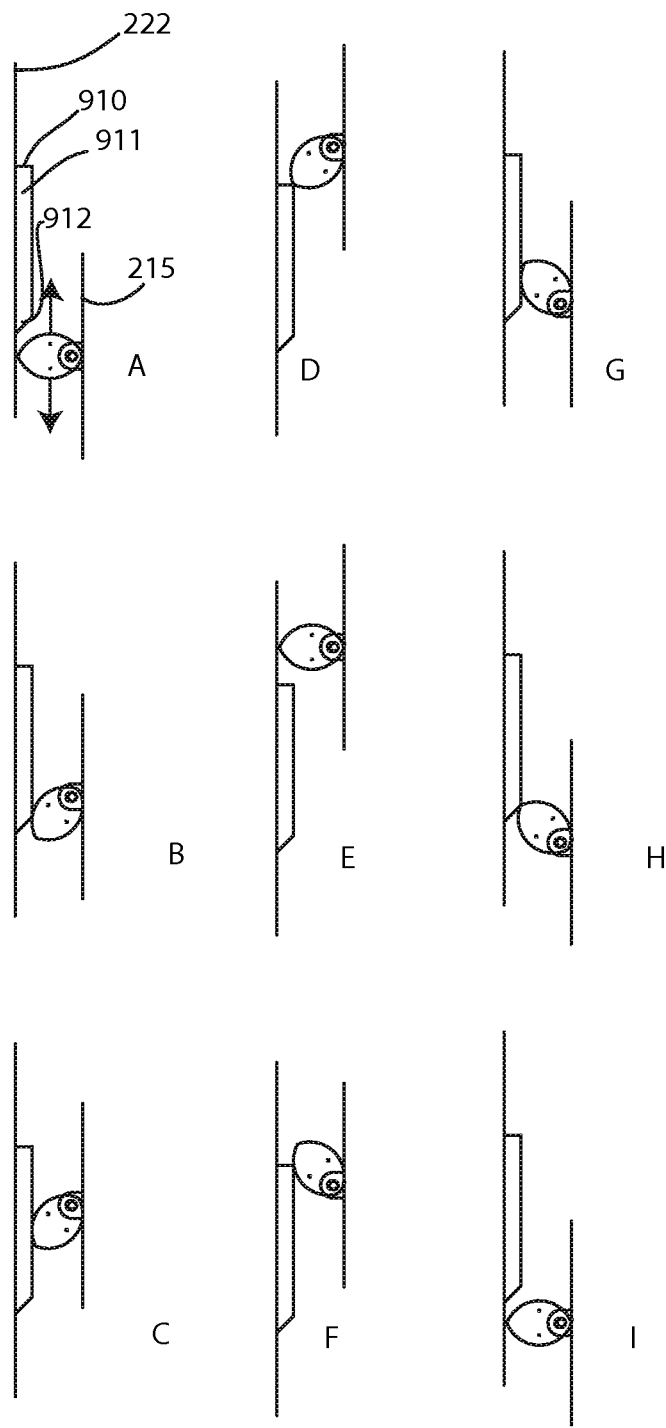
FIG. 86 provides a schematic flowchart of a sequence of steps for an exemplary locking mechanism according to principles of the invention.

With reference to FIG. 86, an embodiment with a stationary bracket 911 having a slanted locking surface 912 and a topmost unlocking corner 910 is shown. The bracket is mounted to a structure, such as (but not limited to) a collar assembly 250. A pivoting support cam is mounted to the carriage assembly 112 in alignment with the bracket 912 so that the support cam engages the bracket 912 when the carriage assembly 112 is raised to a locking position. The pivoting support cam is shown moving into a locking position during upward movement relative to the bracket in steps A through C. In step C, the mechanism is locked, thereby frictionally supporting the planter assembly. Downward movement is resisted. Further upward movement, as shown in steps D through E pivots the support cam into an unlocked position, which then allows downward movement as in steps F through I. With a spring holding the cam at the A and I position, the locking mechanism would work in reverse with the bracket upside down and mounted on the carriage assembly.

Figure 87:
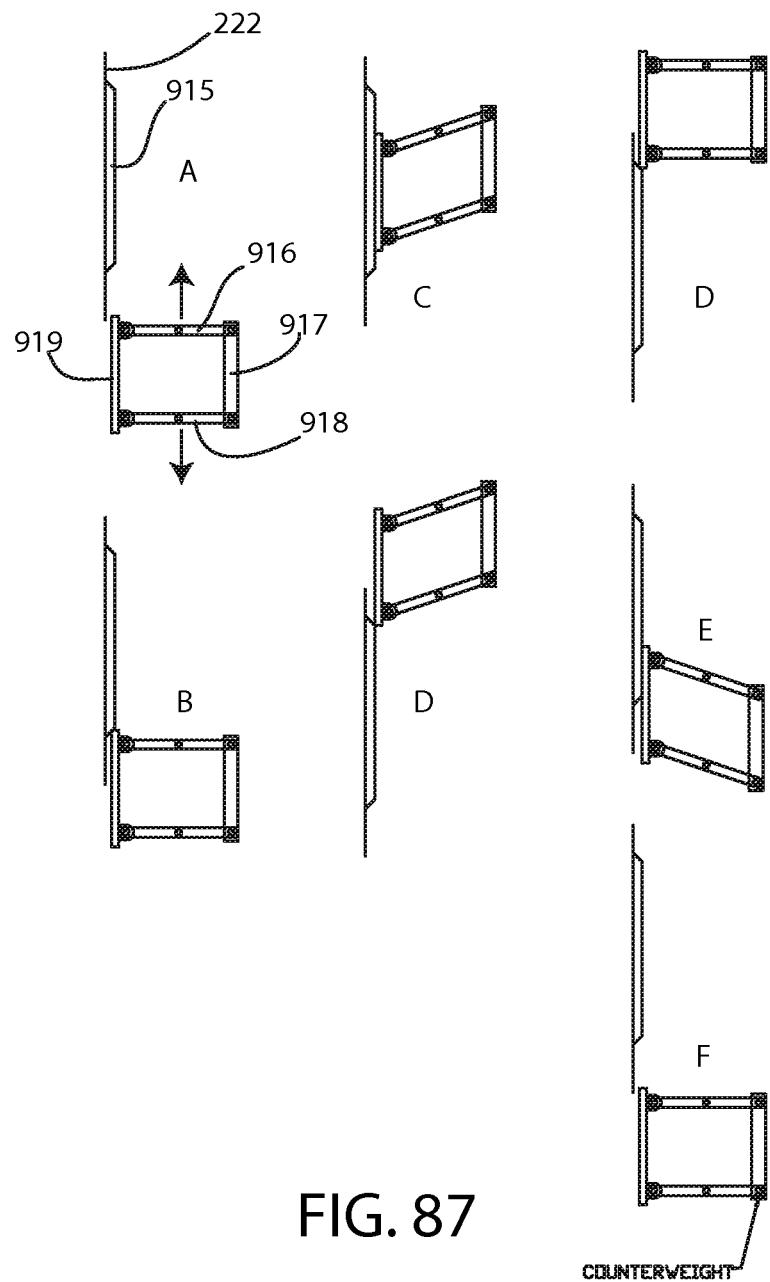
FIG. 87 provides a schematic flowchart of a sequence of steps for an exemplary locking mechanism according to principles of the invention.

With reference to FIG. 87, an embodiment with a stationary bracket 915 having a slanted lower locking surface and a topmost unlocking surface is shown. The bracket 915 is mounted to a structure, such as (but not limited to) a collar assembly 250. A pivoting support truss is mounted to the carriage assembly 112 in alignment with the bracket 915 so that the support truss engages the bracket 915 when the carriage assembly 112 is raised to a locking position. The pivoting support truss is shown moving into a locking position during upward movement relative to the bracket in steps A through C. In step C, the mechanism is locked, thereby frictionally supporting the planter assembly. Downward movement is resisted. Further upward movement, as shown in steps D through E pivots the support truss into an unlocked position, which then allows downward movement as in steps F through G. This unit would perform in reverse by switching the position of the bracket and support truss from the carriage assembly and the vertical structure.

Figure 88:
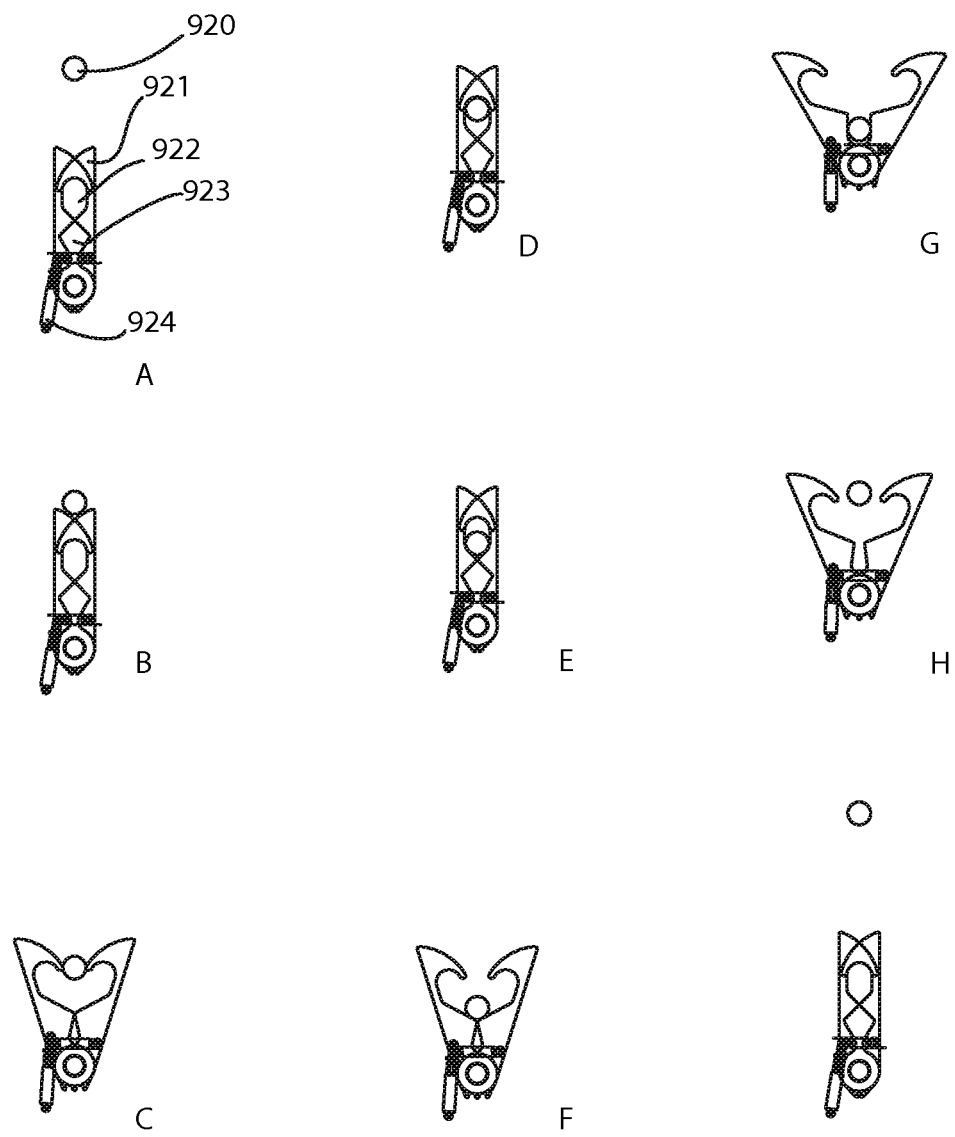
FIG. 88 provides a schematic flowchart of a sequence of steps for an exemplary locking mechanism according to principles of the invention.

With reference to FIG. 88, an embodiment with a stationary pin 920 is shown. The pin 920 is mounted to a structure, such as (but not limited to) a collar assembly 250. A pivoting hooked jaw assembly is mounted to the carriage assembly 112 in alignment with the pin 920 so that the jaw assembly engages the pin 920 when the carriage assembly 112 is raised to a locking position. The pivoting jaw assembly includes angled leading edges 921 to urge the jaws open upon encountering the pin, a biasing and damping means 924 to slowly urge the jaws closed, a hook 922 to engage the pin 920 when locked, and a disengagement surface to force the jaws open and allow release upon unlocking. The pivoting jaw assembly is shown moving into a locking position during upward movement relative to the pin in steps A through D. In step D, the mechanism is locked (i.e., hooked on the pin), thereby supporting the planter assembly. Downward movement is resisted. Further upward movement, as shown in steps D through G pivots the jaw assembly into an open and unlocked position. Because the biasing and damping means slowly closes the jaws, enough time is permitted to allow downward movement past the pin 920 as in steps H through I. This unit could be reversed with the pin and jaw assembly switched on either the carriage assembly or the vertical structure with the jaw assembly flipped up or down.

Figure 89:
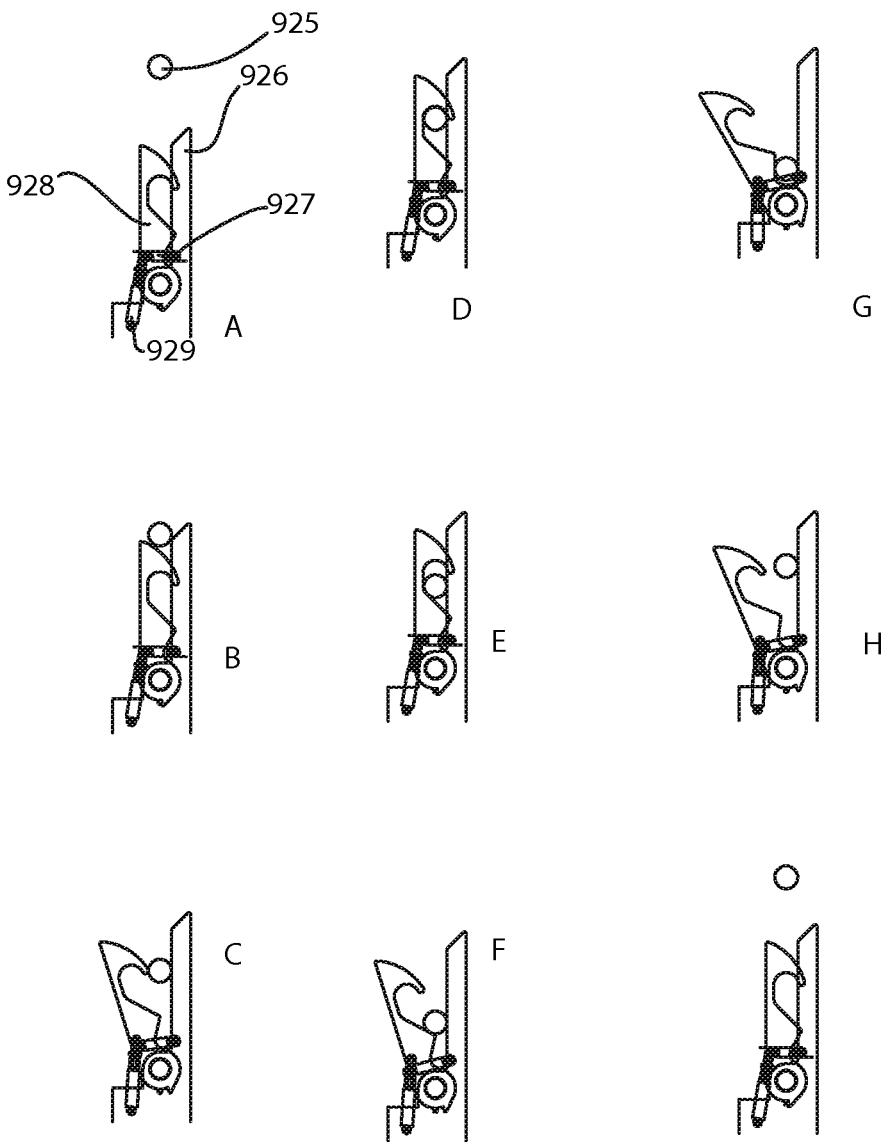
FIG. 89 provides a schematic flowchart of a sequence of steps for an exemplary locking mechanism according to principles of the invention.

With reference to FIG. 89, another embodiment with a stationary pin 925 is shown. The pin 925 is mounted to a structure, such as (but not limited to) a collar assembly 250. A pivoting hooked jaw assembly is mounted to the carriage assembly 112 in alignment with the pin 925 so that the jaw assembly engages the pin 925 when the carriage assembly 112 is raised to a locking position. The pivoting jaw assembly includes one pivoting jaw 928 with an angled leading edge to urge the jaw open and away from its base 926 upon encountering the pin 925, a biasing and damping means 927 to slowly urge the jaw closed, a hook to engage the pin 925 when locked, and a disengagement surface to force the jaws open and allow release upon unlocking. The pivoting jaw assembly is shown moving into a locking position during upward movement relative to the pin in steps A through D. In step D, the mechanism is locked (i.e., hooked on the pin), thereby supporting the planter assembly. Downward movement is resisted. Further upward movement, as shown in steps E through G pivots the jaw assembly into an open and unlocked position. Because the biasing and damping means slowly closes the jaws, enough time is permitted to allow downward movement past the pin 925 as in steps H through I. This unit can work in reverse positions of up or down in relationship to mounting on the carriage assembly or vertical structure.

Figure 90:
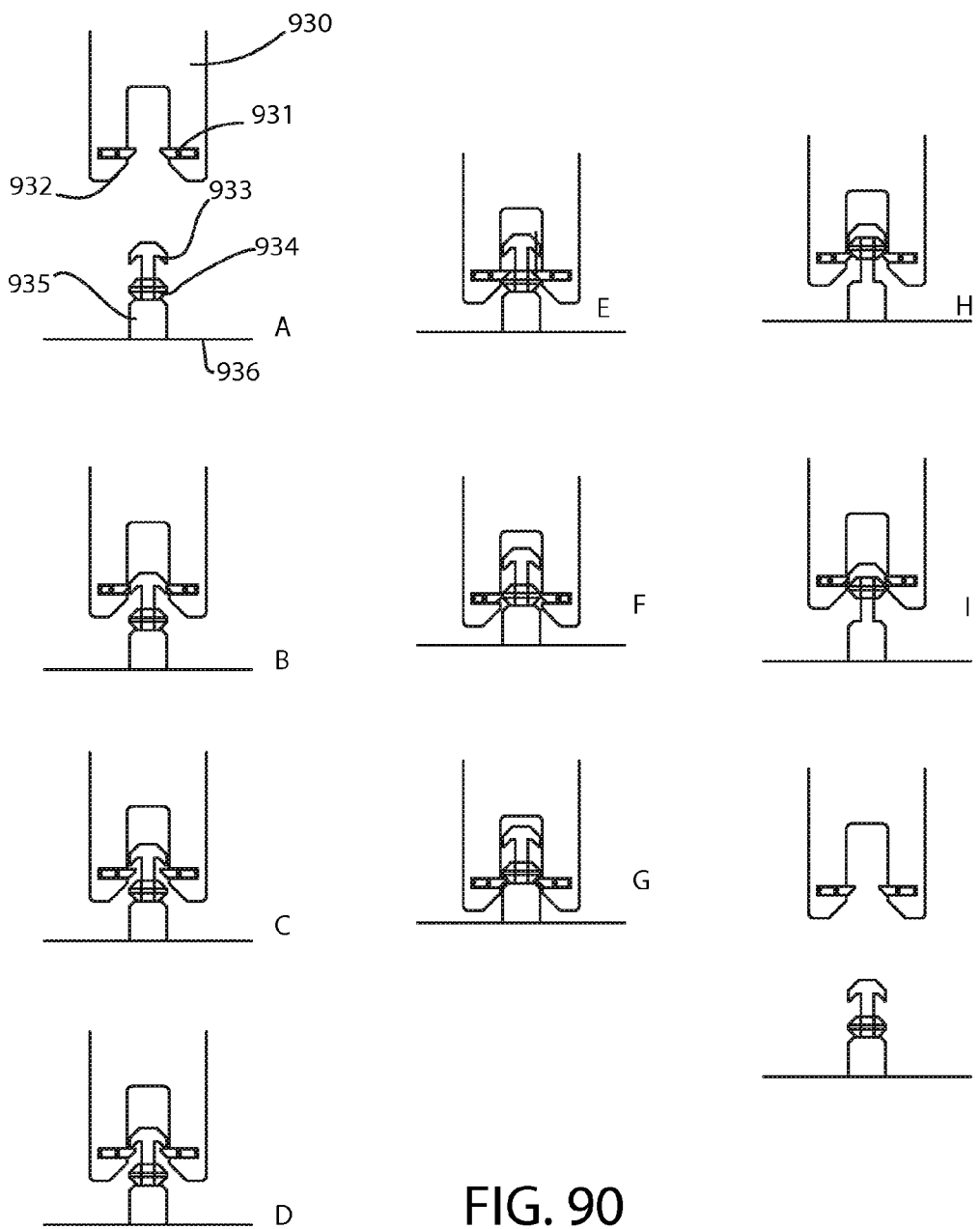
FIG. 90 provides a schematic flowchart of a sequence of steps for an exemplary locking mechanism according to principles of the invention.

With reference to FIG. 90, a male-female embodiment is shown. A male pin 935 is mounted to a structure 936, such as (but not limited to) a collar assembly 250, or 400 or a planter container assembly 705 or housing 710 of a raceway assembly 700 (i.e. reverse flipped, the lock can be used as shown or turned upside down and attached to the opposite assembly part). The male pin includes an angled head 933, a shaft and a sliding bushing 934 with chamfered sides slidingly disposed on the shaft. A female receptacle 930 includes a chamfered opening 932 and laterally sliding spring biased engagement pins 931 or a C-clamp. The male pin is shown moving into a locking position during upward movement relative to the pin in steps A through D. In step B, the angled head of the male pin urges the pins 931 or C-clamp open. In step D, the mechanism is locked, thereby supporting the planter assembly. Downward movement is resisted. Further upward movement, as shown in steps E through G causes the bushing to urge the pins 931 or C-clamp open and hold them in an open and unlocked position until the head is removed from the receptacle as in steps H through J.

Figure 91:
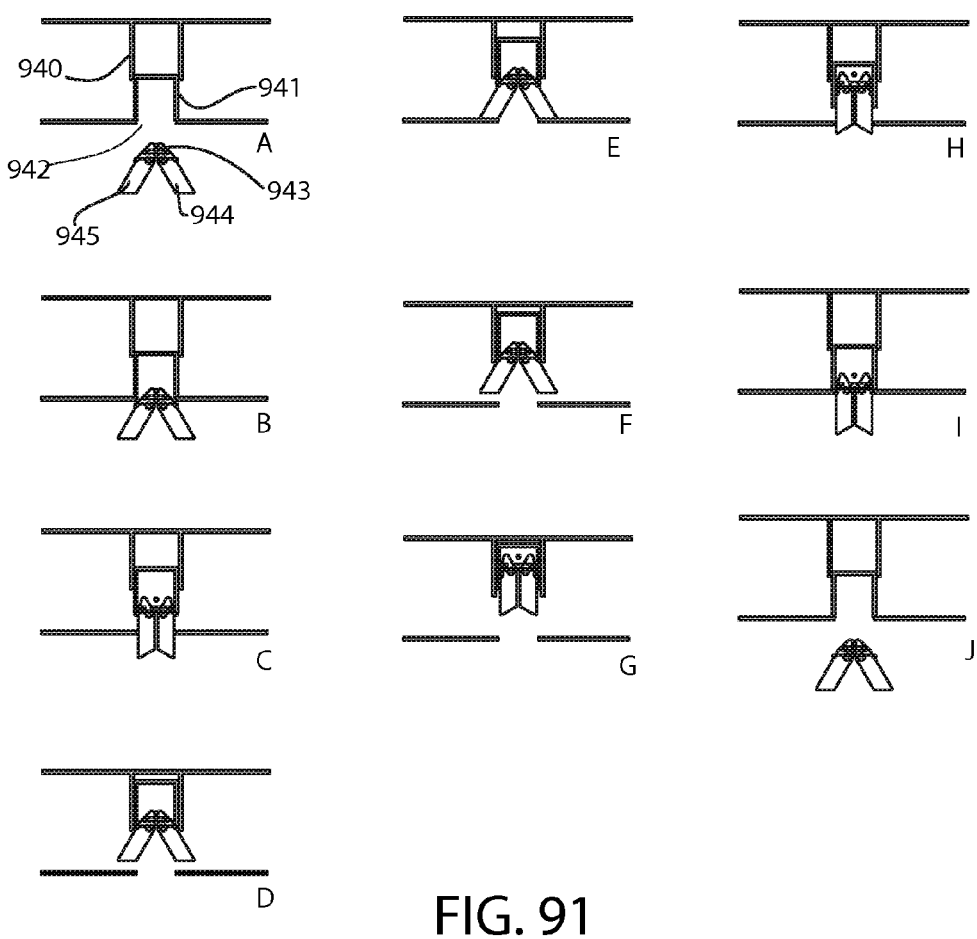
FIG. 91 provides a schematic flowchart of a sequence of steps for an exemplary locking mechanism according to principles of the invention.

With reference to FIG. 91, another male-female embodiment is shown. A male jaw assembly 943 is mounted to a structure 936 (not shown), such as (but not limited to) the planter container assembly 705 or housing 710 of a raceway assembly 700. The male jaw assembly includes a hinge biasing arms 944 and 945 of the jaw assembly 943 into an open position as shown in step A. A female receptacle 940 includes a telescoping sleeve 941 and a wall 942. The jaw assembly is shown moving into a locking position during upward movement relative to the female receptacle in steps A through E. In steps C and D, the jaws urge the sleeve 941 into the receptacle 940. This allows the jaws to flex open and be supported by the wall as in step E. In step E, the mechanism is locked, thereby supporting the planter assembly. Downward movement is resisted. Further upward movement, as shown in steps F through G cause the jaws to close in the sleeve, which holds them in an closed and unlocked position until the jaws are removed from the receptacle as in steps H through J.

Figure 92:
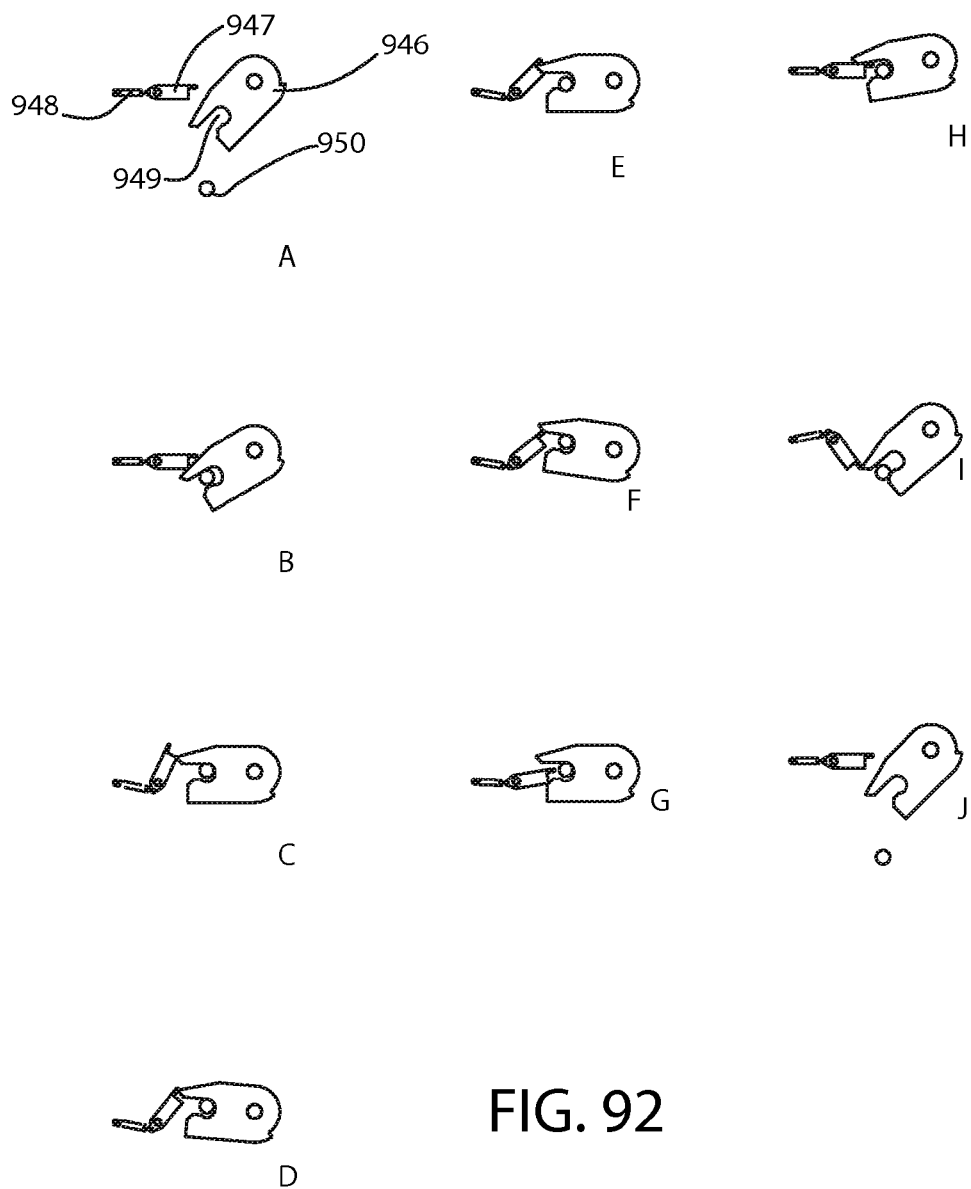
FIG. 92 provides a schematic flowchart of a sequence of steps for an exemplary locking mechanism according to principles of the invention.

With reference to FIG. 92, an embodiment with a stationary pin is shown. The pin 950 is mounted to a structure, such as (but not limited to) the carriage assembly 112, in which case the pin is stationary relative to the structure upon which it is mounted. A pivoting support claw and biased pawl 947 with a support arm 948 are mounted to the opposite of the collar 225 or carriage assembly 112 in alignment with the pin 950 so that the support claw engages the pin 950 when the carriage assembly 112 is raised to a locking position. The pivoting pawl 947 catches the top arm of the support claw in the locked position, as in step D. The pivoting support claw is shown moving into a locking position during upward movement relative to the pin 950 in steps A through E. In step E, the mechanism is locked, thereby supporting the planter assembly. Downward movement is resisted. Further upward movement, as shown in step F releases the pawl and pivots the support claw into an unlocked position, which then allows downward movement as in steps G through J.

Figure 93:
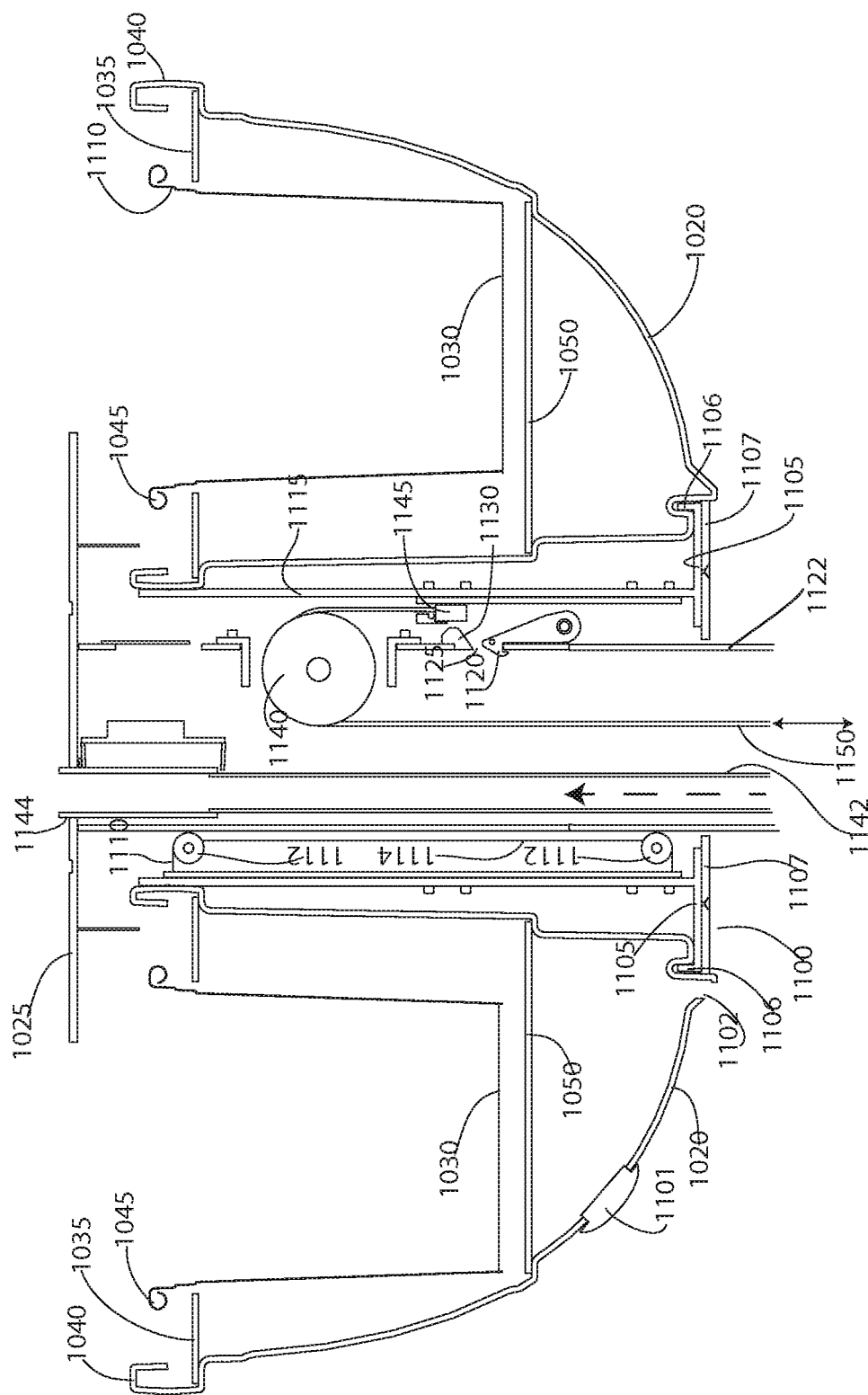
FIG. 93 provides a section view of a planter assembly with a waterfall feature according to principles of the invention.
Figure 94:
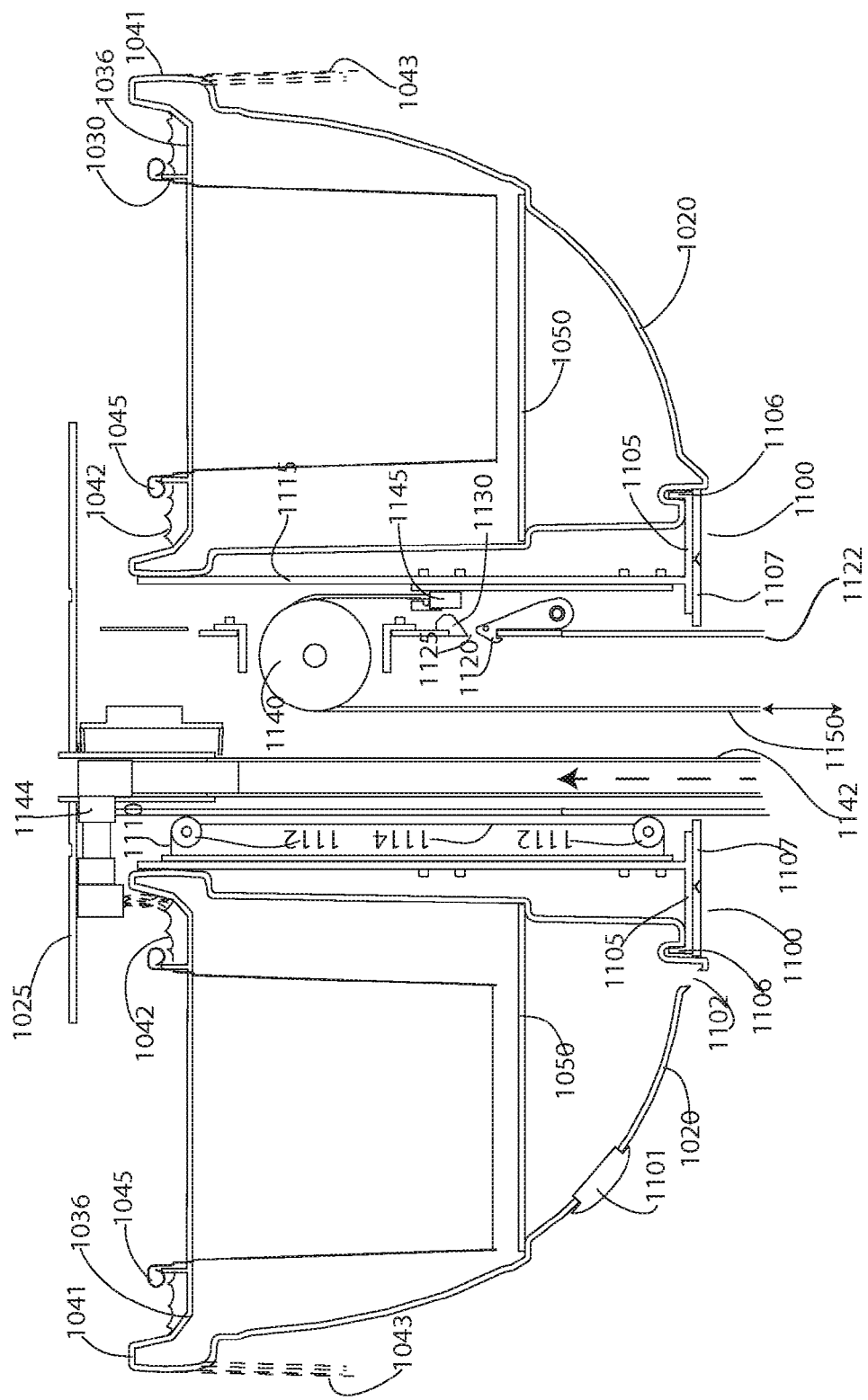
FIG. 94 provides a section view of a planter assembly with a waterfall feature according to principles of the invention.

With reference to FIGS. 93 and 94, a drip plate 1025 is shown above the planter assembly 1020 for distributing water to plants in the planter assembly. As discussed in more detail below, in a particular embodiment the system may be configured to irrigate the surrounding terrain and/or plants in the planter assembly 1020. Plumbing (e.g., pipes) running within the pole supplies water from a source (e.g., a garden hose or utility connection) to one or more water emission devices, such as the drip plate 1025 or a sprinkler. The drip plate 1025 channels and moderates water supplied from the plumbing to the planter assembly. It also can be used to fasten irrigation tubes distributed from the interior water source to drip or drain into the planter containers 1030. Additionally, it distributes natural rain water to the containers and prevents rain entering the structural pole system. Drip plates are not universally used on all types of systems as other alternatives are available.

The planter assembly includes a planter 1020. The planter 1020 is an open top receptacle for holding plants. The planter 1020 may be a unitary structure or a structure comprised of a plurality of components. The planter 1020 may define one or more compartments for storing plants. So long as the planter is compatible for use with a planter system according to principles of the invention, the planter is not limited to any particular size, configuration, material or shape, nor is it limited to any types of plants whether natural or artificial.

As shown in FIGS. 93 and 94, an exemplary planter 1020 includes a top lid 1035 with apertures to receive a plurality of removable plant pots 1030 referred to as min-i-pots. Each removable pot 1030 defines a compartment for planting. This embodiment offers many unique advantages. It facilitates removal and replacement of potted plants held by the planter 1020. This embodiment also reduces water consumption by using less soil or growing media, which also reduces the weight. Additionally, this embodiment facilitates maintaining the temperature of potted plants, as a compartment beneath the lid 1035 may be filled with an insulating material in the spaces between the plant pots 1030.

In FIGS. 93 and 94, an embodiment of a planter 1020 with several plant pots 1030 also referred to as min-i-pots, each having a lip 1045 that extends above the lid 1035. A support base 1050 may be provided to support the weight of the plant pots 1030. Additional insulation can be included between the min-i-pots as necessary for varying climates to conserve water and protect against extreme weather conditions.

The plant pots 1030 and base 1050 each include at least one drainage aperture. Thus, excess water may drain from a pot 1030 through the base 1050 and out of a drainage aperture 1102 provided in the planter 1020. A variety of drainage apertures can be utilized including 1103 per FIG.

42, which allows the water to exit in a stream away from the pole 105. In this embodiment, a flanged or rolled lip 1040 defines the top edge of the planter and enhances its rigidity.

A removable clean-out plug 1101 is provided towards the bottom of the planter 1020 to allow access to the interior compartment of the planter 1020 through a corresponding clean-out port for purposes of cleaning out any debris from the planter 1020. A hose may be inserted through the port to wash out the compartment. Such cleaning may be performed while the planter is elevated or lowered and while the planter contains plants, without disturbing the contained plants. Such cleaning is important for reducing the buildup of bacteria, mold, and other potentially hazardous substances and organisms. Conventional plugs can be used that either threadedly screw or pressure snap into place.

A carriage 1100 supports the planter 1020. The carriage includes a bottom 1105 and a flange 1106 which is received in a corresponding recess formed in the bottom of the planter 1020. Other structures for securing the planter 1020 to the carriage may be utilized without departing from the scope of the invention.

The carriage also includes guides to maintain a space between the pole and carriage and facilitate translation (i.e., movement) of the carriage 1100 and supported planter 1020 relative to the pole. In the exemplary embodiments shown in FIGS. 4 and 5, the guides comprise rollers 1112 attached to a roller plate 1114, which is a cutaway of one flange of the channel 1110 also shown in FIGS. 15 and 16 s that is attached to the body of the carriage 1100. The rollers 1112 may optionally be spring based against the pole, thus allowing more controlled use with non-finished larger tapered poles. The rollers are axle mounted between the two flanges 1114 of the channel 1110. Finished poles would normally not use rollers except when they can be very resilient, shaped to the pole, or wider to prevent marring. In most instances the rollers are not meant to ride the vertical structure throughout the raising and lowering movements, but to act as a soft non marring bumper guide. Other types of guides may be used to protect finished surfaces, such as resilient spacers, bristles, carpet, sliding pads and the like, in lieu of rollers. Many of these can be mounted in the same channel as 1110. These guides also work with tapered, fluted and textured poles.

In the exemplary, a resilient gasket 1107 is provided at the bottom of the carriage. The gasket 1107 comprises a resilient elastomer that will not mar the pole and can withstand repeated outdoor use. The gasket 1107 extends from the carriage body 1100 to the pole 105. The gasket 1107 acts like a squeegee, blocking unwanted debris from fouling the mechanical components of the carriage 1100. The gasket 1107 also serves as a spacer or guide. In some embodiments, the gasket 1107 may be used in lieu of or in addition to other guides, such as rollers 1112. A similar gasket acting as a shaft seal can be attached to the pole or collar at the top.

One or more pulleys 1140 and lanyards 1150 are provided to enable raising and lowering the carriage 1100. One end of a lanyard 1150 is routed over a corresponding pulley 1140 and attached to the carriage 1100 using a mechanical fastener 1145. The pulley 1140 is rotatably attached to a collar assembly 1122, which is attached to the pole 1020. As yet another type of guide, lanyard cables 1150 which connect to the planter assembly may be utilized to maintain spacing between the vertical support 105 and planter assembly 1020.

A mechanical locking mechanism responds to vertical linear motion of the planter assembly. In one exemplary embodiment, the mechanism comprises a catch-hook 1120 pivotally mounted to the carriage 1100. The hook system is designed to not touch the pole throughout the raising and lowering function until actuated into the locking position. Optionally, as a safety measure on various systems the tip of the hook 1120 may be fitted with a roller or a low friction material (e.g., a polytetrafluoroethylene pad) to facilitate ascending and descending movement and prevent accidentally scratching the finish on the pole 1020. A pusher bracket (discussed above) positioned below the slot 1125 in the collar assembly 1122, urges the catch hook 1120 toward the slot 1125 (i.e., into a "locking position") when the planter assembly is raised from a position below the pusher bracket to a position above the pusher bracket. The tip of the catch hook 1120 then falls into and engages the slot 1125. An angled release bracket 1130 above the slot 1125 urges the catch hook 1120 away from the slot 1125 (i.e., into an "unlocked position") when the planter assembly is raised above the slot 1125. In the unlocked position the planter assembly may then be lowered past the slot 1125 without the hook 1120 catching the slot 1125. Various compatible mechanical locking mechanisms that are responsive to vertical linear movement of the planter assembly are described above.

An advantage of certain embodiments of the invention is rotatability. The planters of the embodiments shown in FIGS. 93 and 94 for example, can be conveniently rotated without removal of the planter from the carriage and without any disassembly. Rotation allows positioning and repositioning of plants for aesthetic reasons, to manage exposure to sunlight and to facilitate maintenance. Additionally, in embodiments with optional mini-pots (i.e., smaller planter pots held by the planter, the mini-pots may also be rotatable, without removal and without any disassembly. Thus, each mini-pot may revolve around its own central axis and rotate around the planter central axis.

One or more irrigation pipes and/or electrical conduits may extend through the collar assembly 1122. In an exemplary embodiment, an irrigation pipe 1142 supplies water to an outlet 1144. A sprinkler head or other water distribution device as for a fountain or misting may be coupled to an outlet.

The embodiments shown in FIGS. 93 and 94 include waterfall features. Pumped water is emitted from a down spout attached to the outlet 1144. The water floods over a planter top 1042 acting as a spillway defined by an integral lid 1036 of the planter 1020, to the outer edge of the planter through an exit opening provided by a lowered edge 1022 of the planter rim 1041 down into a reservoir at the base of the vertical support, without flooding the plant pots 1030. The rim 1045 of each plant pot 1030 extends above the maximum height of the planter spillway 1042. Alternative slots, apertures or other outlet features at the edge 1041 of the planter 1020 also define spillway outlets 1022. A ground reservoir may be exposed or covered. In the case of a covered reservoir 107 a receptacle may be provided below ground level underneath a porous superstructure (e.g., stones). The porous superstructure may comprise decorative materials such as rocks on top of a supporting screen. Water flows between the rocks through the screen into the reservoir below. A pump and plumbing re-supply water from the reservoir through the pole to the planter 1021. Plumbing for fresh water for irrigation and/or periodic refilling of the reservoir may optionally be provided and, or an automatic refill valve utilized. An alternative system may extend the water source conduit 1144 in multiple lines to the outside edge directly over 1040, bypassing the spillway 1036, planter containers 1030 and planter 1020. The planter 1020 can be a one piece rotary molded unit with the raised portion of 1036 being removed for the min-i-pots. The lower resting plate 1050 for the min-i-pots would be in sections insertable through the min-i-pots opening. Alternative methods for installation of irrigation and electrical conduits can be used on all bases by first installing a sweep with a larger diameter than a flexible line inserted through it.

FIG. 95 provides a side view of an exemplary pole-mounted vertical, or modular planter assembly 1502 that includes compartments for deployable support arms 1504, 1508 and a periphery configured for use as a display surface, to the extent not being used to grow plants, according to principles of the invention. The assembly is functional without plants. The assembly 1502 may be stationary or raised and lowered on the pole 1500 as described above. The deployable support arms may pivot, extend (e.g., telescopically) and retract. Banners—, flags, and planters 1507 may be suspended from an arm 1504, 1508. A small extension piece from the compartment may be used to tie the flag or banner 1506 through a grommet to the carriage in lieu of a banner arm. A supplemental or substitute lighting system 1509 (FIG. 96) may be included as a part of the assembly. The light assembly may, by way of example and not limitation, comprise LED's. The lighting assembly may augment or replace a top lighting fixture on a pole. Planter assembly designs other than modular can be used for greater strength and easier service without departing from the scope of the invention. Irrigation for the planter may be provided up through the vertical structure down into the planters with various fittings as the other embodiments.

FIG. 96 provides a sequence of side views of an exemplary vertical, or modular planter assembly 1502 (planter unit) that includes compartments for deployable support arms and a periphery configured for use as a display surface, to the extent not being used to grow plants, according to principles of the invention. Apertures, such as circular openings, 1510, allow plants to grow out the periphery of the assembly 1502. Apertures can also receive individual planters with growing media for plants. A decorative or informative sheet or sleeve (e.g., a banner, advertisement or other display) 1514 may cover the periphery of the assembly 1502 when it is not being used to grow plants or the arms are not in use. The periphery of assembly 1502 can be of any shape or size, allowing any part to be used for this purpose.

Planter units may attach and detach in a number of ways. Joints may be formed in the units, such as dovetail joints. Snap fit connections may be used. Bands may be used to strap units together. Depending upon the attachments used, the planter units may slide, slip, tip or snap into and out of the assembly.

The upper unit in the sequence include a vertical bar at the edge of the deployable arms section that can be used also as an attachment bar 1545 for display sheet 1514. It may feature grommets 1543, apertures, eyed appendages, clasps, hooking devices as hook and loop fasteners, as well as be a French or "Z" bar in full length or shorter for attachment purposed. They can be long, collapsible, or short. Additionally, easily releasing pins, snaps, or clasps can be used. The material may be sewed with seams and pockets to accommodate nylon cable ties, stretchable hooking bands, or cords, Additionally, a "U" channel 1545 for sliding 1514 in and out of for storage may be provided. The "U" channel would feature and opening being small enough to accommodate the thin informative sheet 1514 and the inside larger to accommodate a seam pocket filled with a bar or rod large enough to slip into the back larger area of the channel but not large enough to pass through the narrow opening.

FIG. 97 provides views of components of an exemplary vertical, or modular planter assembly that includes compartments 1512 for deployable support arms and a periphery configured for use as a display surface, to the extent not being used to grow plants, according to principles of the invention. The components include a plurality of planter modules 1510. Each module 1510 defines a portion of the generally cylindrical assembly 1502. Modules may be held together with mechanical attachments such as bands, straps, snap fit couplings, joinery (e.g., dovetail joints), threaded fasteners (e.g., screws), and the like, or manufactured together as more than one module. Such combining of modules into larger modules can include a plurality necessary to fill the surface areas between the deployable arms as necessary. Removable covers 1516, 1520 attach to the top and bottom of the body 1518 of each module 1510. Each module 1502 abuts a central sleeve or tube 1522, which can also act as part of a carriage with 1530. Each module may be attached to the tube 1522 as described above. Drainage and irrigation ports 1524, 1526 are provided to facilitate watering plants and releasing accumulated water. The tube 1522 has an inner diameter that is at least as large as the outer diameter of the pole or other support to which it is attached. Upper and lower caps 1528, 1530 cover the top and bottom ends respectively, as shown in FIG. 98. A support disc 1534, provides additional support for the modules 1510.

FIGS. 99 through 101 illustrate an exemplary pole-mounted vertical, or modular planter assembly, in partially unassembled and assembled states. In this embodiment, the assembly includes four deployable arms 1536, 1538, 1540, 1542, to demonstrate locations thereof. Each of the arms may be of any useful length and deployed or folded into a storage compartment 1572. When stored in a storage compartment 1572, an arm 1536, 1538, 1540, 1542 is protected from damage, such as damage caused by weather, vandalism, or nearby vehicles or machinery as shown in FIG. 101.

FIGS. 102 through 104 illustrate another exemplary vertical, or modular planter assembly 1510 according to principles of the invention. The top and bottom covers 1516, 1520 are omitted from these views to more clearly show the exemplary cross-section, which includes dovetail tails 1550, 1552 and a dovetail slot 1552. Each dovetail slot 1552 matingly receives a dovetail tail 1550 of an adjacent, abutting module 1510. Concomitantly, one dovetail tail 1554 mates with a corresponding slot 1562 in the central sleeve 1560 shown in FIG. 105. In this manner, the assembly may be formed by sliding engagement of the various modules. In alternative embodiments, the planter modules can be tipped or pulled from the assembly.

Figure 106:
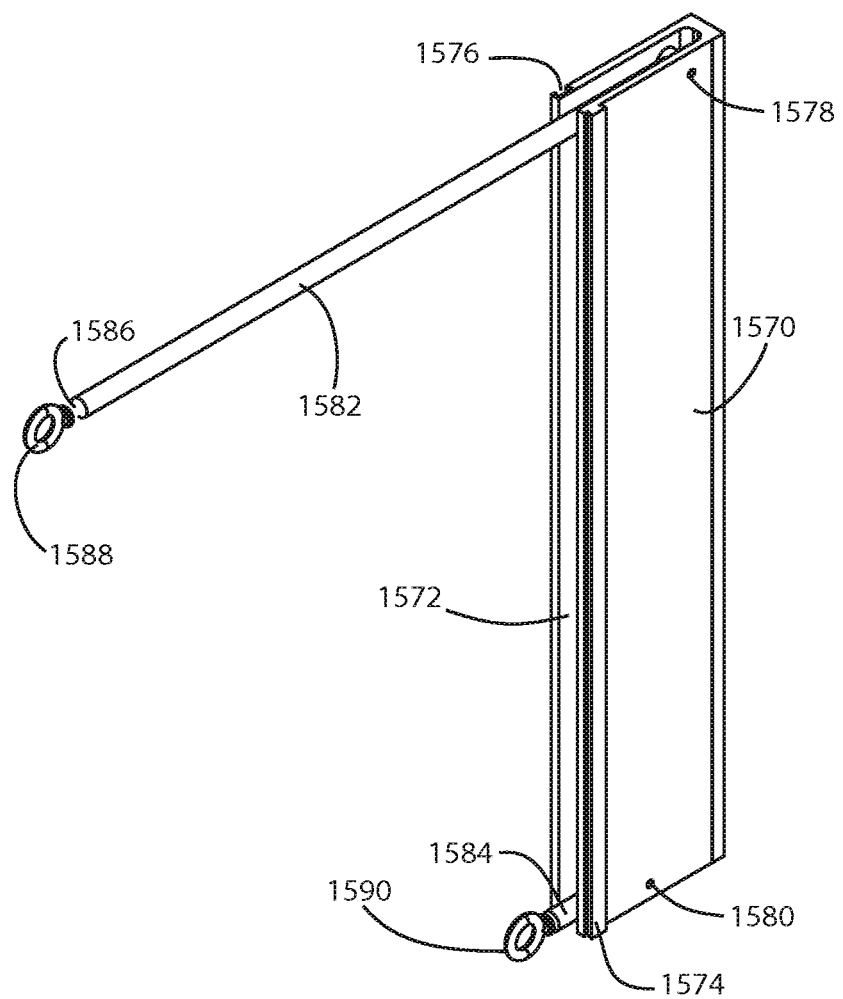
FIG. 106 provides a perspective view of an exemplary mounting arm compartment for a planter module for a modular planter assembly according to principles of the invention.
Figure 107:
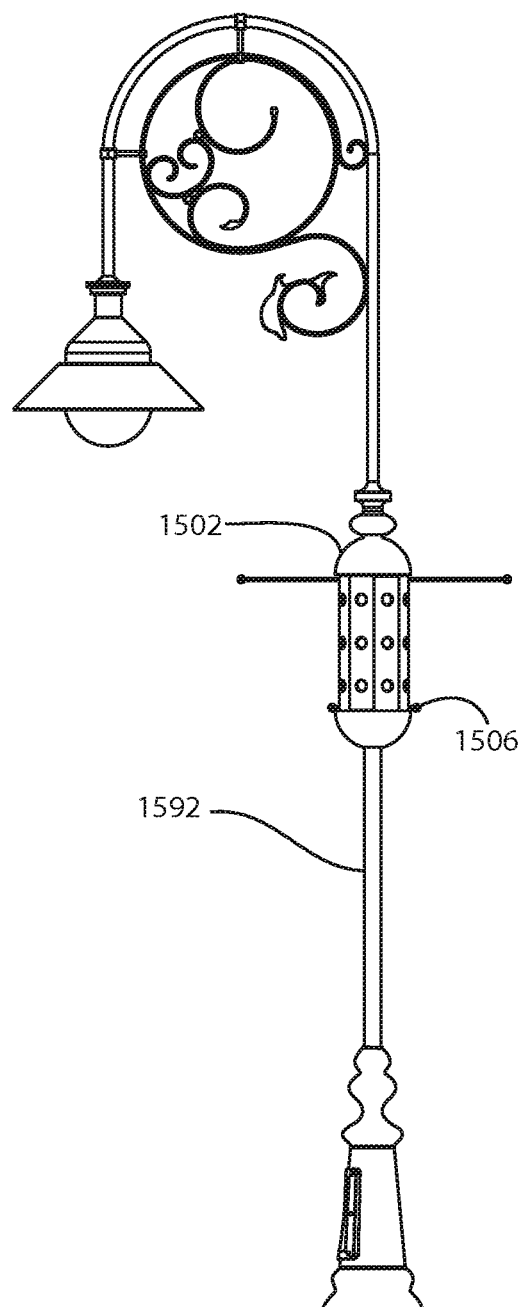
FIG. 107 provides another side view of an exemplary pole-mounted modular planter assembly that includes compartments for deployable support arms and a periphery configured for use as a display surface, to the extent not being used to grow plants, according to principles of the invention.

FIG. 106 provides a perspective view of an exemplary mounting arm compartment assembly 1570 which defines a storage compartment 1572 for a mounting arm module for a vertical, or modular planter assembly according to principles of the invention. In this embodiment, a plurality of arms 1582, 1584 are shown. The arms may include extendable telescoping sections 1586. Each arm pivots about a pivot pin 1578, 1580. Each arm ends with an attachment, such as an eye bolt 1588, 1590, for a banner, flag or other suspendable item such as a planter. The eyebolt 1590 is similar to the attachment device 1506 in FIG. 95. In this embodiment, the compartment assembly 1570 includes a dovetail tail 1574 and a corresponding dovetail slot 1576 for engaging abutting adjacent modules 1510. This embodiment of the assembly 1502 is conceptually on a light pole 1592 in FIG. 107. The assembly 1502 may be permanently or temporarily (e.g., removably attached). Additionally, as discussed above, the assembly may be raised and lowered on the pole 1592 using mechanisms for raising and lowering as described above.

Thus, a modular planter assembly according to principles of the invention may include a plurality of display modules. Each display module may include an interior compartment for containing a planting medium (e.g., soil or other media suitable for supporting a growing plant). At least one coupling joins the plurality of display modules together. In one embodiment, as described above, each module is equipped with a coupling comprising a dovetail joint to secure adjacent modules together. A channel extends through the assembly. The channel is defined by and substantially surrounded by the joined plurality of display modules. The joined plurality of display modules define an outer periphery of the modular planter assembly. The outer periphery includes at least one plant aperture. In the embodiment described above, each module includes a plant aperture. The outer periphery defines (i.e., functions as) a display substrate, i.e., a surface for supporting a flexible display such as a banner. One or more compartments may be provided in the assembly. Each compartment includes an opening at the outer periphery. The opening leads to an interior space of the compartment. A support arm (i.e., at least one support arm) extends from the compartment, such as by pivoting and/or telescopic motion. A flexible display may cover and be attached to at least a portion of the outer periphery, provided that such portion is not then being used for plant growth.

Figures 108, 109, 110:
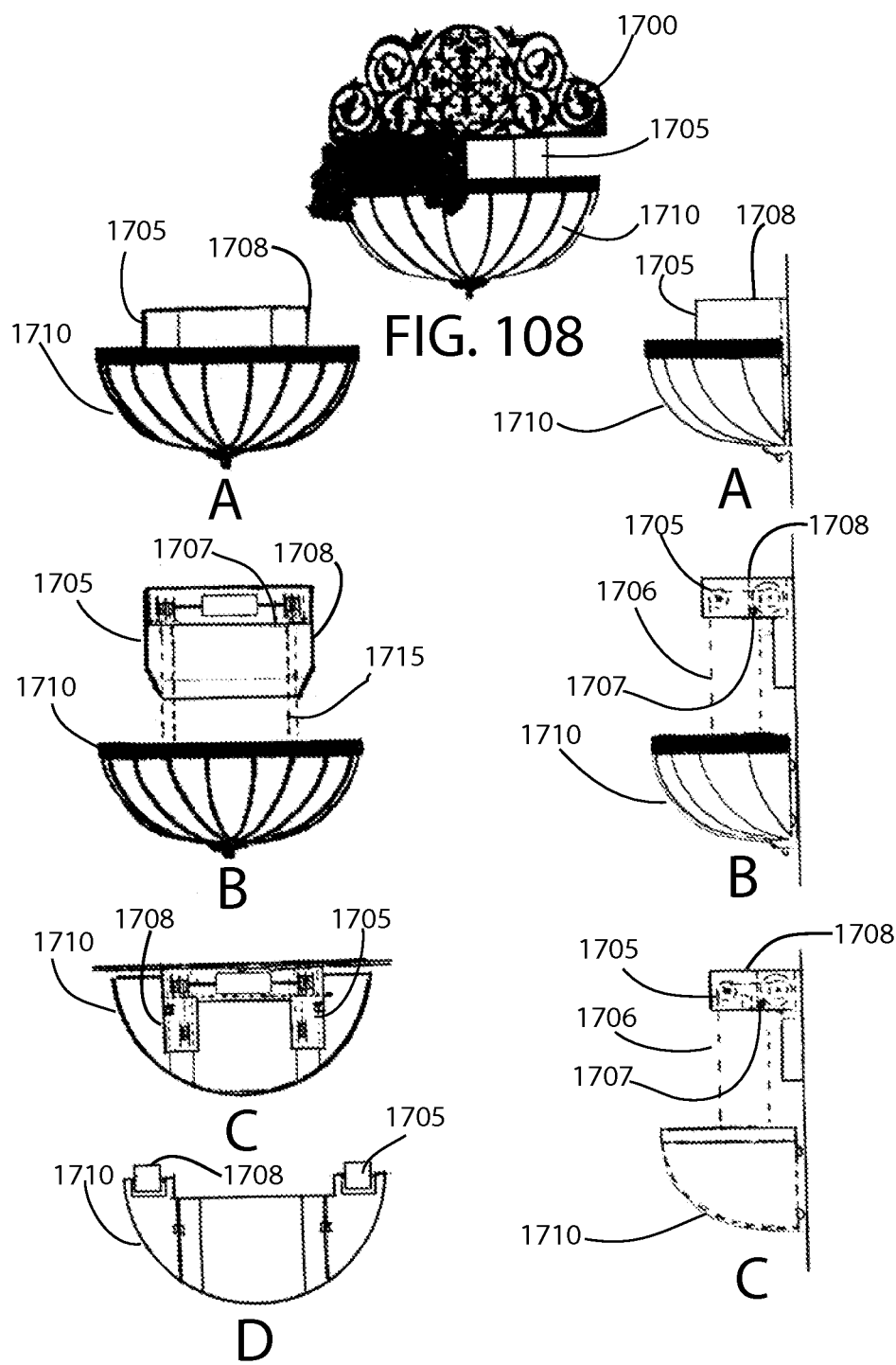
FIG. 108 provides a front view of a planter raised by a hoist attachable to a vertical support.
FIG. 109 provides a series of views of a planter raised and lowered by a hoist attachable to a vertical support.
FIG. 110 provides another series of views of a planter raised and lowered by a hoist attachable to a vertical support.

FIGS. 108 through 110 provide views of a planter 1710 raised by a hoist 1705 attachable to a vertical support, such as, but not limited to a wall. In steps A of FIGS. 109 and 110, the planter 1710 is raised. An optional decorative cover 1700 is shown in FIG. 108. In steps B of FIG. 109, 110, the planter 1710 is lowered and tethers (e.g., cables) 1715 are visible. Step C of FIG. 109 shows a top view of the planter 1710 relative to the hoist 1705. The hoist 1705 contains a raising and lowering mechanism that controllably winds and unwinds tether on and from a spool. Step D of FIG. 109 illustrates a bottom view including downwardly extending portions 1705 of the hoist 1705. Rollers or other guides may be provided to facilitate movement of the planter against the vertical support 1710. An irrigation system to the unit from the backside provides an irrigation line 1707 in the hoist housing and mounting structure 1708. Multiple means for latching and releasing can be used common to other planter systems that raise and lower.

Figure 111:
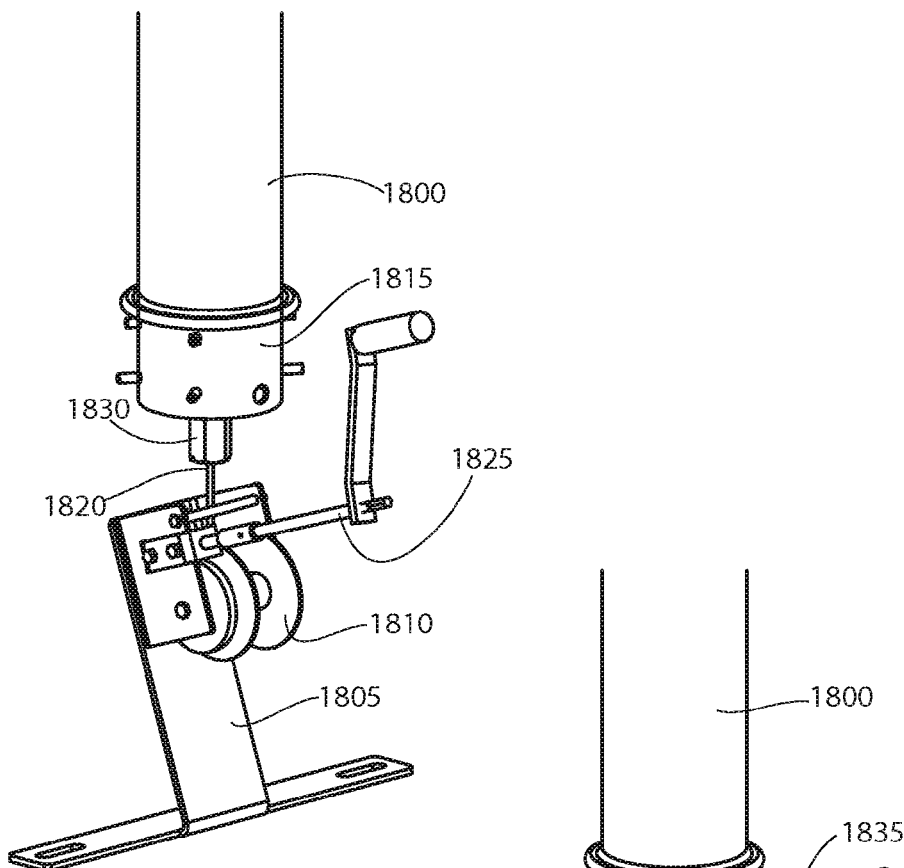
FIG. 111 provides a perspective view of components of a crank-powered mechanical winch assembly for a planter assembly according to principles of the invention.
Figure 112:
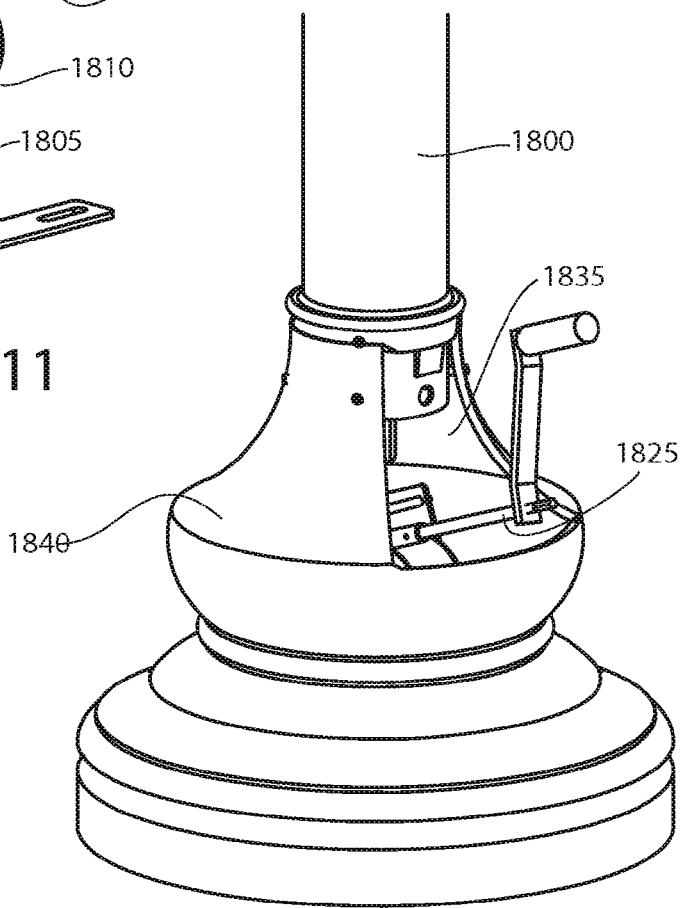
FIG. 112 provides a perspective view of components of a crank-powered winch assembly partially exposed through an opening in a base for a planter assembly according to principles of the invention.
Figures 116, 117:
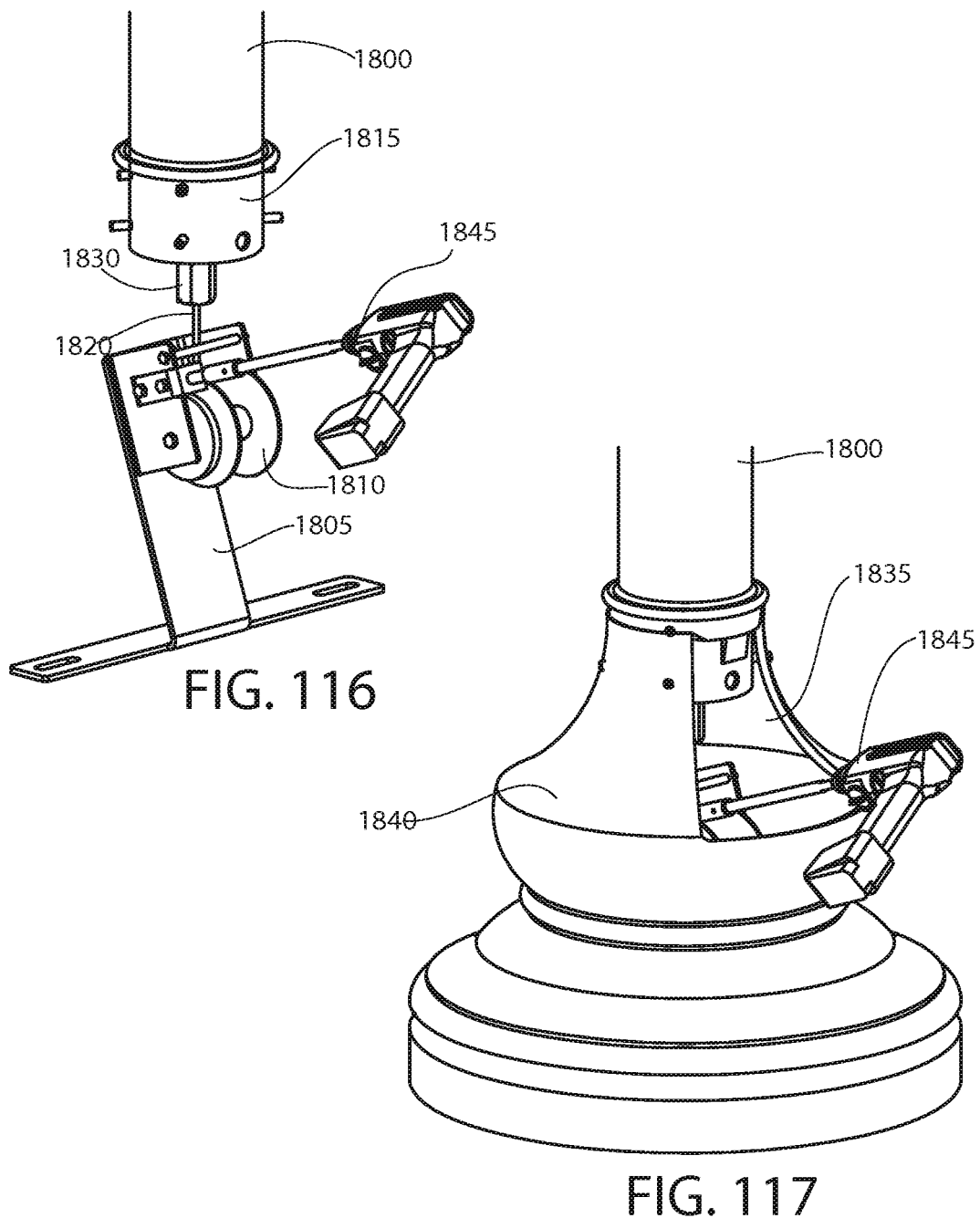
FIG. 116 provides a perspective view of components of a drill-powered mechanical winch assembly for a planter assembly according to principles of the invention.
FIG. 117 provides a perspective view of components of a drill-powered mechanical winch assembly partially exposed through an opening in a base for a planter assembly according to principles of the invention.

In FIGS. 111 and 112, an embodiment of a raising and lowering means comprising a manually cranked winch 1810 is shown. A tether (e.g., cable) 1820 extends from the winch 1810 to a yoke 600. A crank shaft 1825 with a handle extends from the winch. The crank shaft and handle may be removable and/or collapsible or foldable. A support bracket 1805 supports the winch 1810 in the base 1840 of the assembly. The slots on the bottom of the support bracket 1805 can be aligned with the anchor bolts securing the base and pole to a concrete foundation. The base includes a removable access panel that provides an access port 1830 for accessing the winch. In the alternative embodiment of FIGS. 113-117, a removable powered drill 1845 is shown engaging and driving the crank shaft upon removing the handle.

With reference now to FIGS. 113 through 115, embodiments with external removable raising and lowering means are shown. A winch 1860 on a platform 1865 with a leveling telescopic support pole 1875 and a connecting bracket 1850 engages the bottom 1815 of the pole 1800. One or more pulleys 1870 on the platform 1865 and/or bracket 1850 routes the tether 1855 to the winch 1860, which may be drill or manually operated. When the planter is raised to a locked position, the tether may be removed from the winch 1860 and the external removable raising and lowering means may be removed. When the planter has to be unlocked and lowered, the external removable raising and lowering means may be provided again. Alternative removable and portable systems can be used. One or more wheels 1876 may be provided to facilitate transportation.

Figure 118:
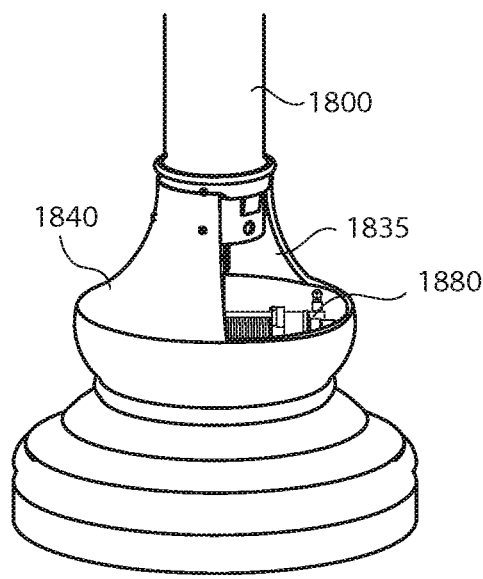
FIG. 118 provides a perspective view of components of an electrical winch assembly for a planter assembly according to principles of the invention.

In FIG. 118 an electrical winch 1880 is partially shown contained in the base. The winch 1880 may be remote controlled or controlled using switches and/or control panels provide on or near the winch 1880 or base 1840. Utility or battery electrical power may be used.

Figure 119:
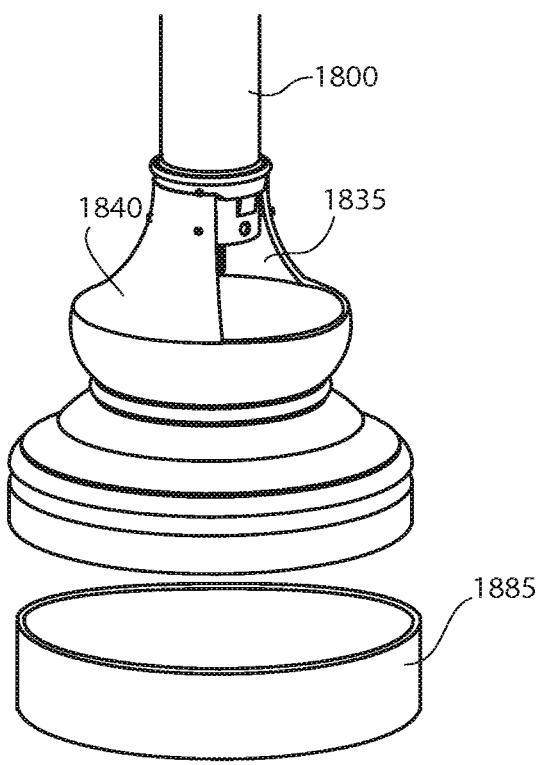
FIG. 119 provides a perspective view of components of an electrical winch assembly with an extended base for a planter assembly according to principles of the invention.

FIG. 119 provides an embodiment with a supplemental support base 1885. The supplemental support base 1885 increases the storage volume of the base 12656, which may be a standard inventoried base to accommodate alternative raising and lowering means and related items. Attachment to the standard base can be achieved via bolting, welding, initial forming or other means. Any variety of shapes can be used to enhance the aesthetics.

Figure 120:
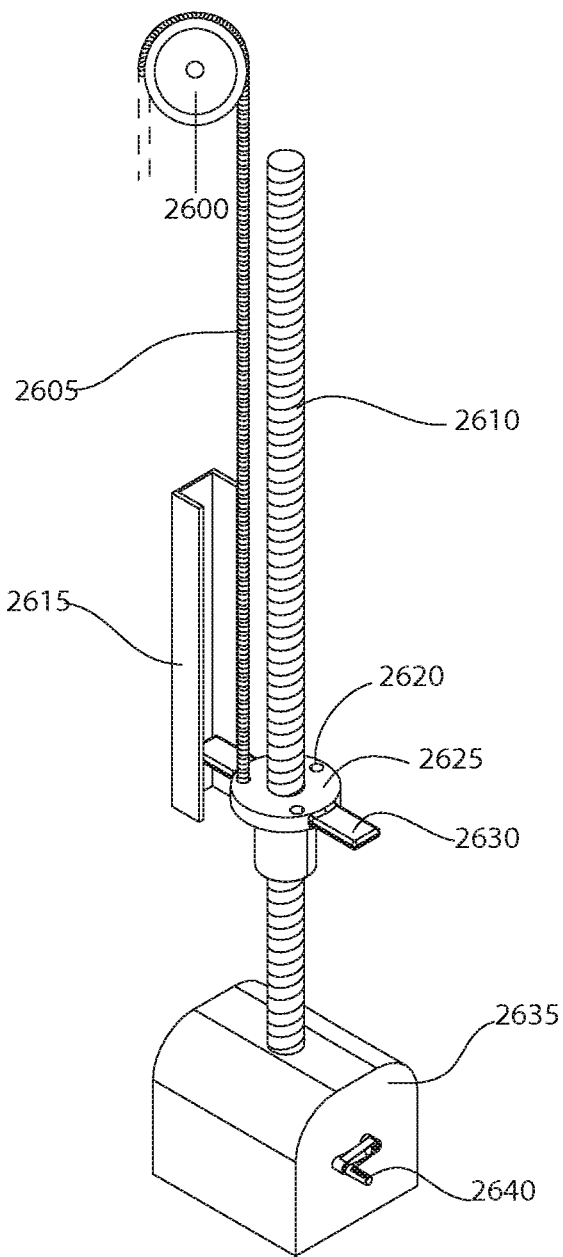
FIG. 120 provides a perspective view of a lead screw assembly for a planter assembly according to principles of the invention.

With reference now to FIG. 120, a raising and lowering means comprising a lead screw 2610 with a threaded yoke 2625 is shown. The yoke 2625 includes threaded joints 2620 for connecting one or more lanyards 2605 routed over a pulley 2600 to a planter assembly or carriage for a planter assembly. One or more u-shaped channel guide tracks 2615 is mounted to the interior of the vertical support (e.g., pole). An arm 2630 extends from the yoke 2625 to the guide track 2615. The guide track 2615 allows upward and downward movement of the yoke, but prevents twisting motion of yoke relative to the guide track. This is important to prevent twisting of the lanyards 2605. A generic gear box 2635 converts crank or motor revolutions to rotational input to the lead screw 2610. As the crank 2640 is turned, the lead screw turns. As the lead screw turns, the yoke either rises or descends, depending upon the direction of rotation. The gear box 2635 can be cranked by an electrical drill, or motor or other means.

Figure 121:
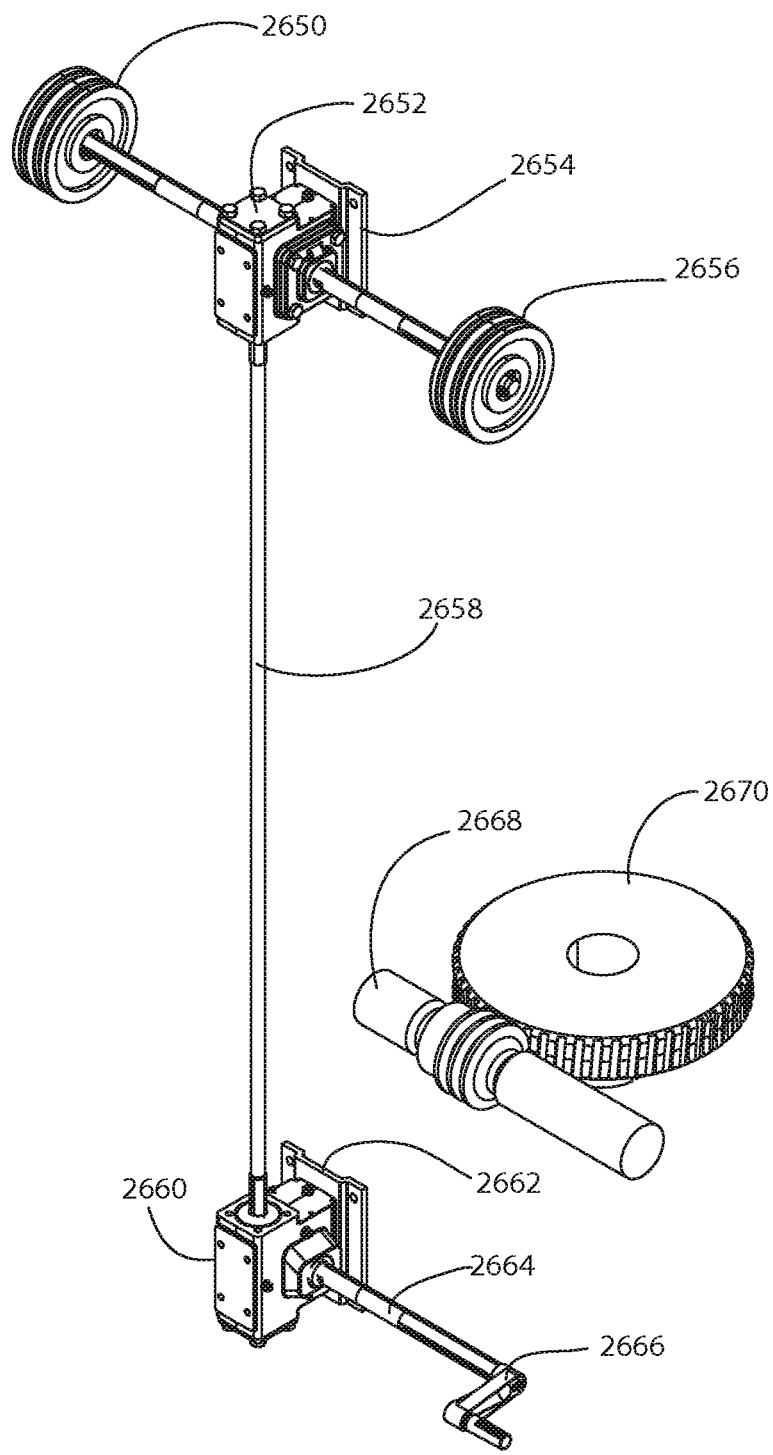
FIG. 121 provides a perspective view of a drive shaft and gear box assembly for a planter assembly according to principles of the invention.

Now referring to FIG. 121, a raising and lowering means comprising a drive shaft 2658 between gear boxes 2652, 2660 is shown. Each gear box may contain an input worm gear 2668 driving a circular gear 2670. Rotating the worm gear 2668, rotates the driven circular gear 2670 which is coupled to the drive shaft 2658. Thus, rotating the crank shaft 2664 using the handle 2666, causes the drive shaft 2658 to rotate which causes the spools 2650, 2656 connected by an axle to the top gear box 2652 to rotate. The top gear box and bottom gear box each include mounts 2654, 2662 for attachment to the interior vertical support. Causing the spools to rotate one direction raises the planter assembly by winding up supporting lanyards, while rotation in the opposite direction lowers the planter assembly.

Figure 122:
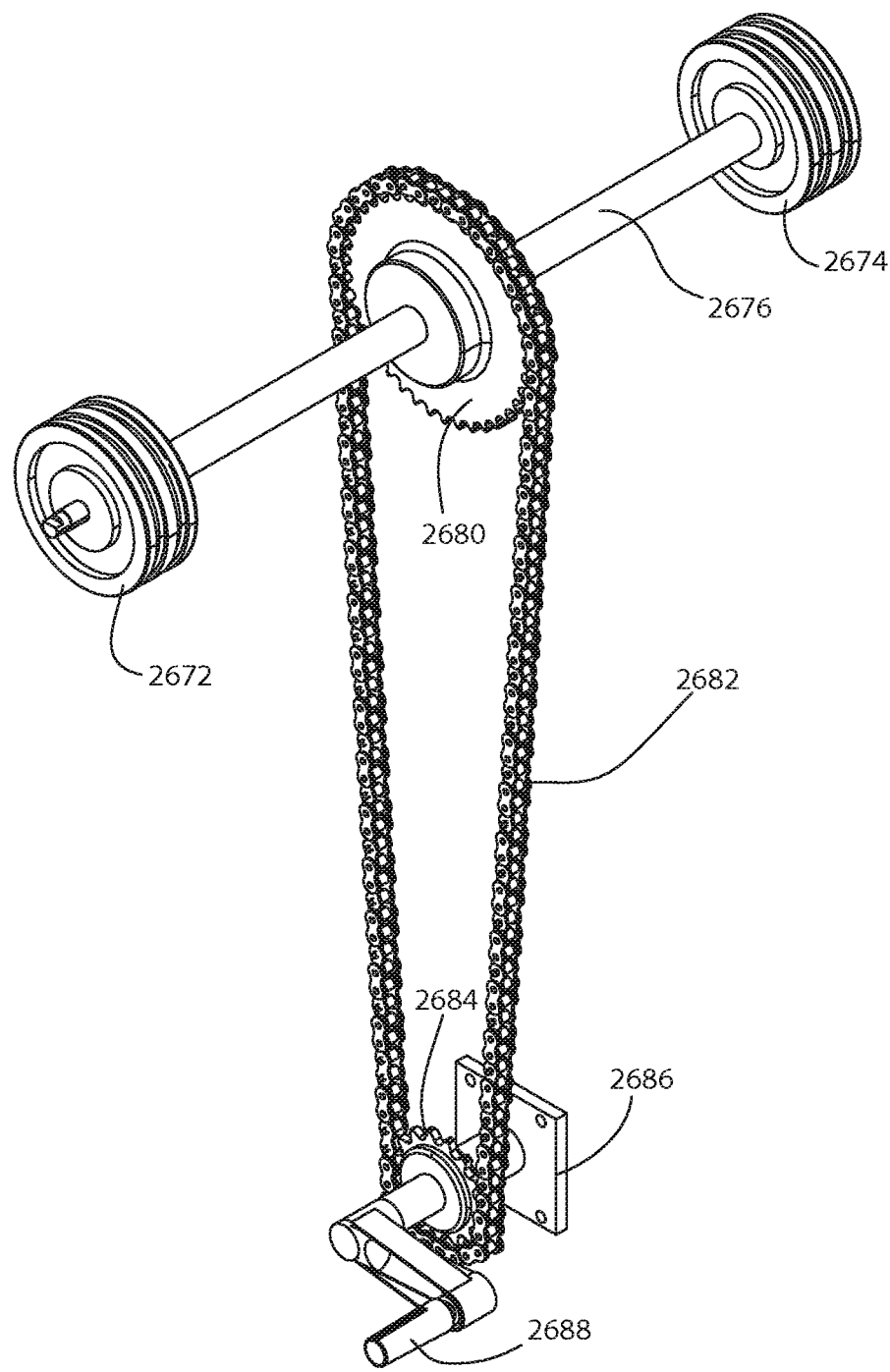
FIG. 122 provides a perspective view of a sprocket and chain drive assembly for a planter assembly according to principles of the invention.

Now referring to FIG. 122, a raising and lowering means comprising sprockets 2684, 2680 and a chain 2682 is shown. Rotating the crank 2688 rotates a sprocket 2684 rotatably mounted to the interior of the vertical support using a mounting pad 2686. The rotating sprocket drives the chain 2682. The driven chain drives the opposite sprocket 2680 which turns the coupled axle 2676, which rotates the spools 2672, 2674. Thus, rotating the crank 2688 causes the spools 2672, 2674 to rotate. Causing the spools to rotate one direction raises the planter assembly by winding up supporting lanyards, while rotation in the opposite direction lowers the planter assembly.

Various raising and lowering means may include, but are not limited to, a tether and pulley, a winch, a windlass, a block and tackle, a compression spring, an extension spring, a rack and pinion, a hydraulic cylinder, a pneumatic cylinder, a lead screw assembly, a beveled gear assembly, a worm gear assembly and a ballast etc. In each of the above exemplary embodiments of raising and lowering means, a hand crank may be replaced with a drive shaft powered by a motor; a motor may be AC or DC, powered by a battery or utility power, wirelessly activated or directly activated via a wired connection; a motor may be part of an accessory such as an electric drill; a manual winch may be replaced with an electric winch; various extensions and couplings may be provided to facilitate use; various gear trains, gear boxes, chains and sprockets, and belts and pulleys, may be provided to achieve raising and lowering.

While an exemplary embodiment of the invention has been described, it should be apparent that modifications and variations thereto are possible, all of which fall within the true spirit and scope of the invention. With respect to the above description then, it is to be realized that the optimum relationships for the components and steps of the invention, including variations in order, form, content, function and manner of operation, are deemed readily apparent and obvious to one skilled in the art, and all equivalent relationships to those illustrated in the drawings and described in the specification are intended to be encompassed by the present invention. The above description and drawings are illustrative of modifications that can be made without departing from the present invention, the scope of which is to be limited only by the following claims. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents are intended to fall within the scope of the invention as claimed.

What is claimed is:

1. A modular assembly comprising:
   a plurality of display modules, each display module including an interior compartment, and
   at least one module coupling joining the plurality of display modules in an annular configuration,
   a channel extending axially through the assembly, said channel being defined by and substantially surrounded by the plurality of display modules in the annular configuration, said channel being sized to receive a portion of an elongated support, and said channel being generally central to the assembly;
   said plurality of display modules in the annular configuration defining an outer periphery of the modular assembly, said outer periphery defining a display substrate; and
   a flexible display sheet removably applied to and substantially covering the outer periphery, at least one of said substrate and said display sheet visibly displaying at least one of a decoration and information;
   a cavity module between a pair of the display modules, the cavity module comprising a channel with a generally U-shaped cross section, the cavity module defining a cavity between the pair of display modules; and
   a support arm connected to the cavity module with a pivoting joint, said support arm being movable from a generally vertical position to a generally horizontal position extending from the cavity module.

2. The modular assembly according to claim 1, further comprising a planter suspended from the support arm.

3. The modular assembly according to claim 1, further comprising a plurality of apertures in the outer periphery, each aperture of the plurality of apertures leading to the interior compartment of at least one display module of the plurality of display modules.

4. The modular assembly according to claim 3, further comprising a planting medium within each interior compartment of each display module of the plurality of display modules that have one of the plurality of apertures in the outer periphery.

5. The modular assembly according to claim 3, further comprising a plant, said plant extending from the interior compartment of at least one display module of the plurality of display modules through at least one of the plurality of apertures in the outer periphery of at least one display module of the plurality of display modules, said plant being one of a natural plant and an artificial plant.

6. The modular assembly according to claim 1, the at least one module coupling comprising, on each display module, a male element and a female element, the male element of each display module mating with the female element of another display module in abutting alignment.

7. The modular assembly according to claim 1, each mating male element and female element comprising a dovetail joint.

8. The modular assembly according to claim 1, each mating male element and female element comprising a snap-fit coupling.

9. A modular assembly comprising:
   a plurality of display modules, including a first display module and a second display module each display module including an interior compartment, and
   at least one module coupling for joining the plurality of display modules in an annular configuration,
   a channel extending axially through the assembly, said channel being defined by and substantially surrounded by the plurality of display modules in the annular configuration, said channel being sized to receive a portion of an elongated support, and said channel being generally central to the assembly;
   said joined plurality of display modules joined in an annular configuration defining an outer periphery of the modular planter assembly; and
   a cavity module between the first display module and the second display module, the cavity module being separate from the first display module and separate from the second display module, the cavity module comprising a channel with a generally U-shaped cross section, the cavity module defining a cavity between the pair of display modules, the cavity including an opening at the outer periphery, the opening leading to an interior space of the cavity, and a support arm connected to the cavity module within the interior space and extending radially from the cavity.

10. The modular assembly according to claim 9, further comprising a banner attached to the support arm.

11. The modular assembly according to claim 9, the support arm connected to the cavity module with a pivoting joint, said support arm being movable from a generally vertical position to a generally horizontal position extending radially from the cavity module.

12. The modular assembly according to claim 9, further comprising a plurality of apertures in the outer periphery, each aperture of the plurality of apertures leading to the interior compartment of at least one display module.

13. The modular assembly according to claim 12, further comprising at least one plant extending from the interior compartment of at least one display module through the aperture for the at least one display module, said plant being one of a natural plant and an artificial plant.

14. The modular assembly according to claim 9, each display module and the cavity module comprising a module, the at least one module coupling comprising, on each module, a male element and a female element, the male element of each module mating with the female element of another module in abutting alignment.

15. The modular assembly according to claim 14, each mating male element and female element comprising a dovetail joint.

16. The modular assembly according to claim 14, each mating male element and female element comprising a snap-fit coupling.

17. The modular assembly according to claim 9, said outer periphery defining a display substrate, and said modular planter assembly further comprising a flexible display sheet removably applied to and substantially covering the outer periphery, at least one of said outer periphery and said display sheet visibly displaying at least one of a decoration and information.

18. A modular planter assembly comprising:
a carriage comprising a sleeve having a top end and a bottom end and a flanged base at the bottom end;
a plurality of display modules, each display module including an interior compartment for containing a planting medium, and
at least one module coupling for joining the plurality of display modules in an annular configuration around the sleeve of the carriage upon the flanged base,
a channel extending axially through the assembly, said channel being defined by and substantially surrounded by the plurality of display modules, said channel being sized to receive the sleeve of the carriage, and said channel being generally central to the assembly;
said plurality of display modules joined in an annular configuration defining an outer periphery of the modular planter assembly, said outer periphery being substantially vertical and including at least one plant aperture leading to at least one interior compartment for at least one of the plurality of display modules, the at least one plant aperture comprising a hole in the outer periphery through which a plant may extend; and
a cavity module between a pair of the display modules, the cavity module comprising a channel with a generally U-shaped cross section, the cavity module defining a cavity between the pair of display modules; and
a support arm connected to the cavity module with a pivoting joint, said support arm being movable from a generally vertical position to a generally horizontal position extending from the cavity module.

19. The modular assembly according to claim 18, further comprising a planting medium within each interior compartment of each display module of the plurality of display modules having one of the plurality of apertures in the outer periphery.

20. The modular assembly according to claim 18, the at least one module coupling comprising, formed on each display module, a male element and a female element, the male element of each display module mating with the female element of another display module of the plurality of display modules, in abutting alignment.

21. The modular assembly according to claim 20, each mating male element and female element comprising a dovetail joint.

22. The modular assembly according to claim 20, each mating male element and female element comprising a snap-fit coupling.

* * * * *